(12) United States Patent
Nicholas et al.

(10) Patent No.: US 11,080,760 B2
(45) Date of Patent: *Aug. 3, 2021

(54) METHOD AND SYSTEM FOR PROVIDING NETWORK BASED TARGET ADVERTISING AND ENCAPSULATION

(71) Applicant: Dizpersion Corporation, Evanston, IL (US)

(72) Inventors: Frank C. Nicholas, Wilmette, IL (US); Ian B. Carswell, Chicago, IL (US)

(73) Assignee: DIZPERSION CORPORATION, Evanston, IL (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/724,556

(22) Filed: Dec. 23, 2019

(65) Prior Publication Data

US 2020/0242663 A1 Jul. 30, 2020

Related U.S. Application Data

(63) Continuation of application No. 15/919,878, filed on Mar. 13, 2018, now Pat. No. 10,515,394, which is a
(Continued)

(51) Int. Cl.
*G06Q 30/00* (2012.01)
*G06Q 30/02* (2012.01)

(52) U.S. Cl.
CPC ......... *G06Q 30/0269* (2013.01); *G06Q 30/02* (2013.01); *G06Q 30/0254* (2013.01); *G06Q 30/0255* (2013.01)

(58) Field of Classification Search
CPC .... G06Q 30/02; G06Q 30/00; G06Q 30/0269; G06Q 30/0255; G06Q 30/0254
See application file for complete search history.

(56) References Cited

U.S. PATENT DOCUMENTS 5,724,521 A * 3/1998 Dedrick ................. G06Q 30/02
705/26.1
5,848,396 A * 12/1998 Gerace ................... G06Q 30/02
705/7.33
(Continued)

OTHER PUBLICATIONS

Rick Dedrick, Interactive Electronic Advertising, Jan. 1, 1994, IEEE, pp. 55-66.*

*Primary Examiner* — Arthur Duran
(74) *Attorney, Agent, or Firm* — Cardinal Law Group LLC

(57) ABSTRACT

A method and system for providing network based target advertising and encapsulation having a method for targeting advertising. When no ad in the inventory at the right of first refusal ad server is appropriate to the determined demographic, the method includes: identifying the content server at the right of first refusal ad server based on the ad request; determining a default ad server based on the identified content server, the default ad server being independent, separate, and distinct from the right of first refusal ad server; sending a pass request from the right of first refusal ad server to the default ad server; forwarding the ad request from the content server to the default ad server in response to the pass request; and serving a default ad service ad from the default ad server to the user node in response to the forwarded ad request.

12 Claims, 38 Drawing Sheets

Related U.S. Application Data continuation of application No. 14/018,111, filed on Sep. 4, 2013, now Pat. No. 9,916,597, which is a continuation of application No. 10/456,826, filed on Jun. 6, 2003, now Pat. No. 8,538,803, which is a continuation-in-part of application No. 10/172,492, filed on Jun. 14, 2002, now Pat. No. 8,131,585.

(60) Provisional application No. 60/298,329, filed on Jun. 14, 2001, provisional application No. 60/333,324, filed on Nov. 26, 2001, provisional application No. 60/362,297, filed on Mar. 7, 2002.

(56) References Cited

U.S. PATENT DOCUMENTS

| | | | | |
|---|---|---|---|---|
| 5,933,811 A * | 8/1999 | Angles | | G06Q 30/02 705/14.56 |
| 5,948,061 A * | 9/1999 | Merriman | | G06Q 30/02 705/14.53 |
| 6,141,010 A * | 10/2000 | Hoyle | | G06F 8/60 715/201 |
| 6,446,261 B1 * | 9/2002 | Rosser | | H04N 7/163 348/E7.061 |
| 6,857,024 B1 * | 2/2005 | Chen | | H04L 29/06 379/114.13 |
| 2001/0025274 A1 * | 9/2001 | Zehr | | G06Q 10/107 705/402 |
| 2001/0053999 A1 * | 12/2001 | Feinberg | | G06Q 30/02 705/14.58 |
| 2002/0069105 A1 * | 6/2002 | do Rosario Botelho | | G06Q 30/02 705/14.53 |
| 2002/0156677 A1 * | 10/2002 | Peters | | G06Q 30/02 705/14.64 |
| 2002/0161608 A1 * | 10/2002 | Loveland | | G06Q 10/06 705/4 |
| 2002/0161633 A1 * | 10/2002 | Jacob | | G06Q 20/3224 705/14.64 |
| 2003/0006911 A1 * | 1/2003 | Smith | | G06Q 30/02 340/988 |
| 2003/0149937 A1 * | 8/2003 | McElfresh | | G06Q 30/02 715/210 |
| 2003/0195927 A1 * | 10/2003 | Virine | | G09F 27/00 709/203 |
| 2005/0096988 A1 * | 5/2005 | Yanagisawa | | G06Q 20/20 705/16 |

* cited by examiner

METHOD AND SYSTEM FOR PROVIDING NETWORK BASED TARGET ADVERTISING AND ENCAPSULATION

CROSS-REFERENCE TO RELATED APPLICATIONS

This application is a continuation of U.S. patent application Ser. No. 15/919,878, filed on Mar. 13, 2018, which is a continuation of U.S. patent application Ser. No. 14/018,111, filed on Sep. 4, 2013, which is a continuation of U.S. patent application Ser. No. 10/456,826, filed on Jun. 6, 2003, which claims the benefit of U.S. patent application Ser. No. 10/172,492, filed Jun. 14, 2002, U.S. Provisional Application Ser. No. 60/298,329, filed Jun. 14, 2001, U.S. Provisional Application Ser. No. 60/333,324, filed Nov. 26, 2001, and U.S. Provisional Application Ser. No. 60/362,297, filed Mar. 7, 2002, all entitled "METHOD AND SYSTEM FOR PROVIDING NETWORK BASED TARGET ADVERTISING." The entirety of each application is hereby incorporated by reference.

FIELD OF THE INVENTION

The present invention generally relates to the advertising of goods and services. More specifically, the present invention relates to the targeted distribution of advertisements over a network.

BACKGROUND OF THE INVENTION

The networked world, particularly the Internet and World Wide Web (WWW), has provided numerous new opportunities, formats and mediums for the advertisement of product and services. Early forms of advertising were not based upon a geographic location or demographic profile of the viewers and listeners of the advertisements. Over the past several years, there has been a movement to target advertising toward viewers and listeners based on
their geographic location and demographic profile. The present invention is an advancement of this movement.

SUMMARY OF THE INVENTION

One aspect of the invention provides a method for targeting advertising over a network, including: requesting content at a user node from a content server; sending the content from the content server to the user node, the content including an ad request; sending the ad request from the user node to a right of first refusal ad server; determining a demographic corresponding to the user node; determining in response to the ad request whether an ad in inventory at the right of first refusal ad server is appropriate to the determined demographic. When no ad in the inventory at the right of first refusal ad server is appropriate to the determined demographic, the method further includes: identifying the content server at the right of first refusal ad server based on the ad request; determining a default ad server based on the identified content server, the default ad server being independent, separate, and distinct from the right of first refusal ad server; sending a pass request from the right of first refusal ad server to the default ad server; forwarding the ad request from the content server to the default ad server in response to the pass request; and serving a default ad service ad from the default ad server to the user node in response to the forwarded ad request.

Another aspect of the invention provides a system for providing targeted ads over a network, including: a user node; a content server in communication with the user node via a network; a right of first refusal ad server in communication with the user node and the content server via the network; and a default ad server in communication with the user node, the content server, and the right of first refusal ad server via a network, the default ad server being independent, separate, and distinct from the right of first refusal ad server. The user node, the content server, the right of first refusal ad server, and the default ad server are operable in combination to: request content at the user node from the content server; send the content from the content server to the user node, the content including an ad request; send the ad request from the user node to the right of first refusal ad server; determine a demographic corresponding to the user node at the right of first refusal ad server; determine in response to the ad request whether an ad in inventory at the right of first refusal ad server is appropriate to the determined demographic. When no ad in the inventory at the right of first refusal ad server is appropriate to the determined demographic, the system is further operable to: identify the content server at the right of first refusal ad server based on the ad request; determine a default ad server based on the identified content server, the default ad server being independent, separate, and distinct from the right of first refusal ad server; send a pass request from the right of first refusal ad server to the default ad server; forward the ad request from the content server to the default ad server in response to the pass request; and serve a default ad service ad from the default ad server to the user node in response to the forwarded ad request.

Another aspect of the invention provides a non-transitory computer readable storage medium comprising computer executable instructions which, when executed by a processor, cause the processor to perform a method of targeting advertising over a network, including: requesting content at a user node from a content server; sending the content from the content server to the user node, the content including an ad request; sending the ad request from the user node to a right of first refusal ad server; determining a demographic corresponding to the user node; determining in response to the ad request whether an ad in inventory at the right of first refusal ad server is appropriate to the determined demographic. When no ad in the inventory at the right of first refusal ad server is appropriate to the determined demographic, the method further includes: identifying the content server at the right of first refusal ad server based on the ad request; determining a default ad server based on the identified content server, the default ad server being independent, separate, and distinct from the right of first refusal ad server; sending a pass request from the right of first refusal ad server to the default ad server; forwarding the ad request from the content server to the default ad server in response to the pass request; and serving a default ad service ad from the default ad server to the user node in response to the forwarded ad request.

DETAILED DESCRIPTION OF A PRESENTLY PREFERRED EMBODIMENT

Figure 1:
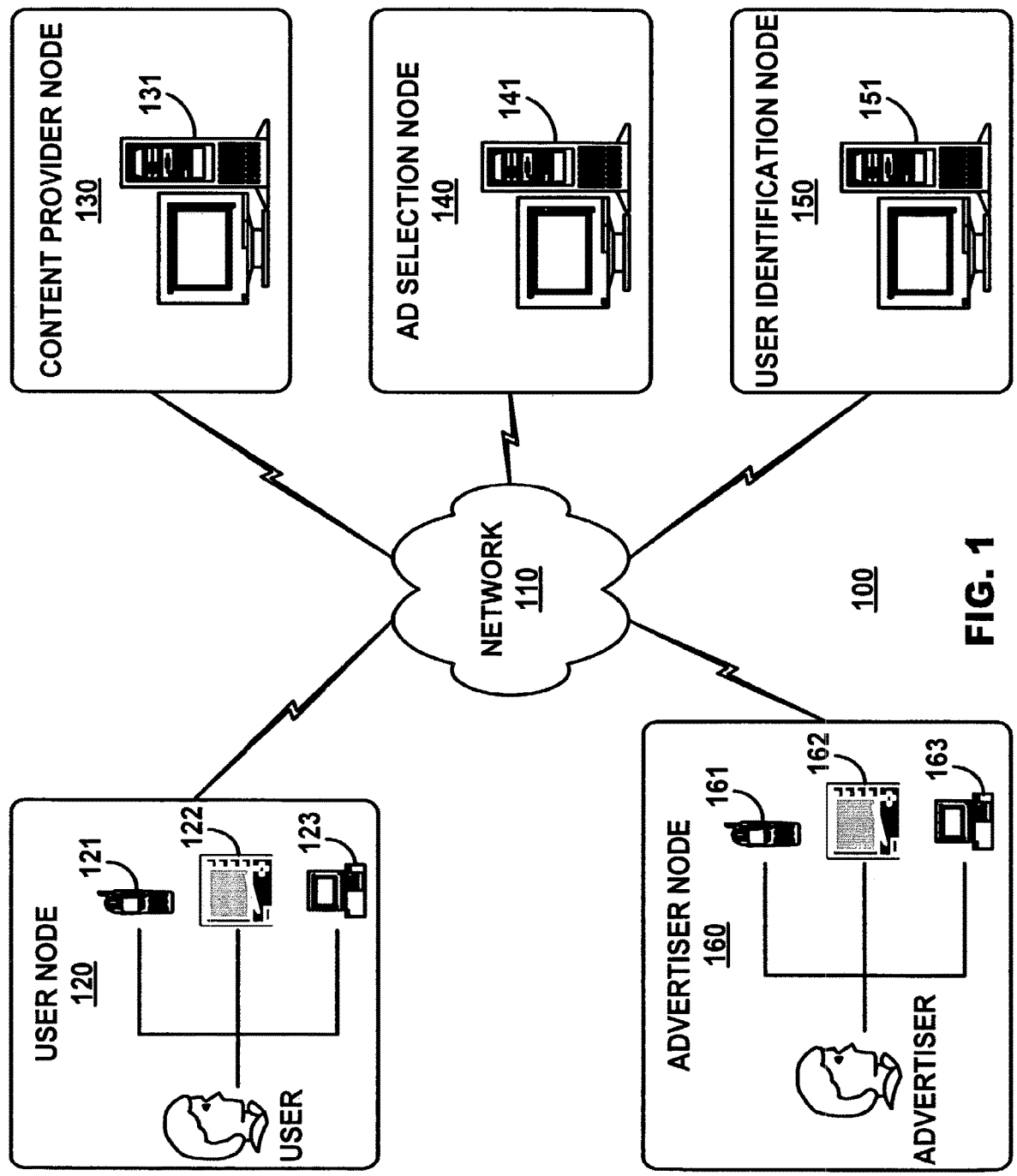
FIG. 1 illustrates a schematic diagram of one embodiment of a telecommunication system of the present invention.

Referring to FIG. 1, a telecommunication system 100 of the present invention is shown. Telecommunication system 100 comprises a network 110 which is the media used to provide communications links between the various nodes of telecommunication system 100. Links through network 110 may include permanent connections (e.g., wire or fiber optic cables), temporary connections made through telephone or wireless communications, or various nodes of telecommunication system 100 may actually be hosted on the same physical hardware platform removing the necessity of a network link altogether. Network 110 may be in the form of public or private connections available over the Internet, an extranet, an intranet, a hard-wired local area network (LAN), a hard-wired wide area network (WAN), a wireless LAN a wireless WAN, and/or other forms as would occur to those having ordinary skill in the art.

A user node 120 of telecommunication system 100 operates to facilitate communications of requested information in audio form and/or visual form between a user of user node 120 and one of the other nodes of telecommunication system 100. Conventional devices, apparatuses and systems, such as for example, a cell phone 121, a personal digital assistant 122, and a personal computer 123 as illustrated, can be utilized within user node 120 to establish such communications. Other suitable conventional devices, apparatuses and systems not illustrated include networked household appliances (e.g., televisions, refrigerators, etc.), digital or satellite radio systems, and others as would occur to those having ordinary skill in the art.

Figure 2:
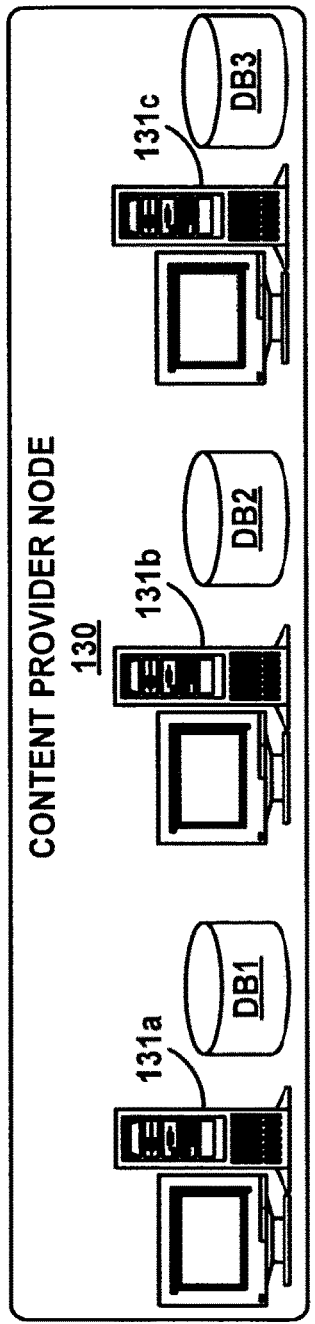
FIG. 2 illustrates a schematic diagram of one embodiment of a content provider node of the FIG. 1 telecommunication system.

A content provider node 130 includes one or more servers 131 for conventionally communicating with the other nodes of telecommunication system 100. In one embodiment, content provider node 130 includes a conventional content server 131a and an associated database DBI as illustrated in FIG. 2 for providing requested information to user node 130. The requested information can be in a variety of forms, such as, for example, a static or dynamic web page, a radio or video broadcast or narrowcast, a page or segment of wireless application protocol (WAP) content, a short messaging service (SMS) message, or other forms of network information as known in the art. Accordingly, content server 131a can include suitable hardware platforms and software modules to operate as a web site server, a radio broadcast server, etc.

Content provider node 131 can further operate to communicate one or more advertisements with or as the requested information to user node 120 as directed by an ad selection node 140. These advertisements can be managed by conventional content server 131a and associated database DBI, a third party ad server 131b and an associated database DB2 as illustrated in FIG. 2 (e.g., a commercially accessible server by Double Click), or a distributed media server 131c and an associated database DB3 as illustrated in FIG. 2 (e.g., a commercially available server by Akamai).

Figure 3:
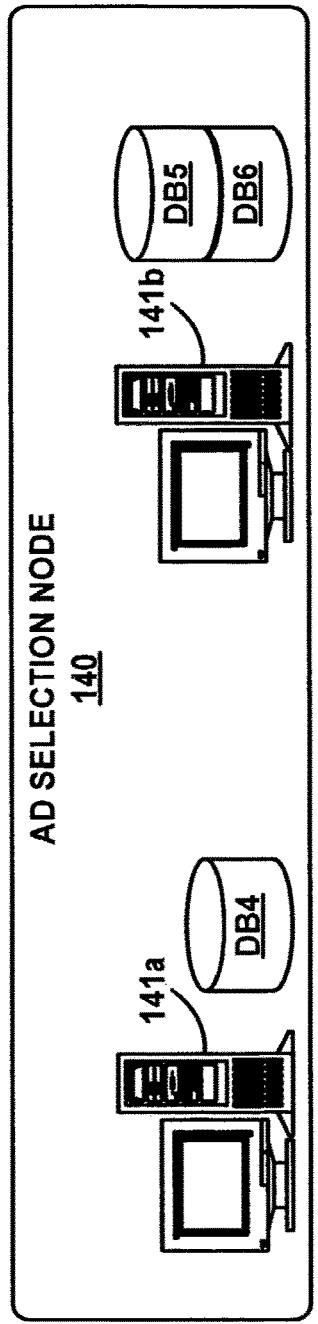
FIG. 3 illustrates a schematic diagram of one embodiment of an ad selection node of the FIG. 1 telecommunication system.

Referring again to FIG. 1, ad selection node 140 includes one or more servers 141 for conventionally communicating with the other nodes of telecommunication system 10. In one embodiment, ad selection node 140 includes a targeted ad server 141a and an associated database DB4 as illustrated in FIG. 3 for managing a selection of which advertisement or advertisements are to be communicated with the requested information from content provider node 131 to user node 120 in accordance with the present invention. Accordingly, targeted ad server 141a includes conventional hardware platforms and software modules for a network operation of targeted ad server 141a as well as additional hardware platforms and software modules for implementing various methods of the present invention as will subsequently described herein.

Concurrent with or alternative to content provider node 131 (e.g., third party ad server 131b and distributed media server 131c shown in FIG. 2), ad selection node 140 can further operate to communicate one or more advertisements with the requested information to user node 120. These advertisements can be managed by a conventional database server 141b and associated databases DBS and DB6 as illustrated in FIG. 3. In one embodiment, database DBS contains information related to advertisers and their ads. Individual ads are associated with the zip codes in which they are to be served. Advertisers can purchase the advertising space for the individual advertisements based on a region of commercial or political influence. In one embodiment, zip codes, or other specified geographical area, within a selected region can be identified as part of the advertising area for that particular advertiser. For example, as exemplary shown in FIG. S, a business vishing to introduce a new product or service campaign in the state of Illinois may wish to do so within a region of commercial influence (RCI) of a fictitious newspaper. The business would then have one or more related digitized advertisements designated to be served into zip codes within the RCI (e.g., 60200, 60203, 60204, 60206, 60208, and 60210). Also by example, an ad agency wishing to introduce a series of ads in the state of Illinois Within a region of residential districts (RRD) such as the greater Chicago area would have one or more related digitized advertisements designated to be served into zip codes within the RRD. By further example, a political campaign wishing to introduce a series of campaign ads in the state of Illinois within a corresponding political district (PD) would have one or more related digitized advertisements designated to be served into zip codes within political district PD.

For every zip code in the United States, the databases maintain records identifying the advertisers that have purchased some number of impressions in that zip code, where an impression is defined as the distribution of an advertising package to user node 120 (FIG. 1) through their interaction with a content provider node 130 (FIG. 1). Each advertiser record includes a unique identifier for the advertiser, keys relating them to sold advertising packages, the date and time of each ad impression, the number of impressions that should be served in each recognized timeframe, and the maximum number of impressions that may be served in each recognized timeframe. A timeframe mentioned may include any span of time one wishes to distinguish. A timeframe may be a month, week, day, hour, etc. The advertisers are simply mapped into not only each zip code or other geographical area of importance, but also each time frame in which they would like to distribute impressions.

In one embodiment, database DB6 contains data gathered by the most recent U.S. census. This information is organized in records associated with each zip code in the United States. Each record within database DB6 includes several columns of information about each zip code. A first set of columns includes information related to the percentage of the total population within the zip code that has an ethnic designation of Wllite, Black, Asian/Pacific, or Hispanic Origin. A second set of columns includes information related to the percentage of the total population within the zip code that falls into the following age categories: 0-4; 5-9; 10-14; 15-19; 20-24; 25-44; 45-64; 65-84; 85; and older. Another column of information is related to the median age of the population within the zip code. An additional column includes information related to the male/female ratio within the zip code. A further column includes information related to the per capita income within the zip code. Another group of columns includes information related to the percentage of the total population within the zip code that falls into each of the following annual income categories: less than $15,000; $15,000 to $24,000; $25,000 to $49,999; $50,000 to $99,999: $100,000 to $149,999; and $150,000 or more. And a further group of columns includes information related to the percentage of the total population within the zip code making use of financial services such as home loans, automobile loans, investments, and retirement plans.

Referring again to FIG. 1, a user identification node 150 includes one or more servers 151 for conventionally communicating with the other nodes of telecommunication system 10. In one embodiment, user identification node 150 includes a conventional geographic location server 151a and associated database DB7 for providing information indicative of a geographic location of the user to ad selection node 140 (e.g., a commercially available server by Quova, a global positioning system (GPS) enabled user node, or using cellular triangulation). In another embodiment, user identification node further includes a conventional demographic profile server 151b and associated database DBS for providing additional information indicative of a demographic profile of the geographic location to ad selection node 140 (e.g., a commercially available server containing the most recent U.S. Census or the like).

An advertiser node 160 of telecommunication system 100 operates to facilitate communications of advertisements in audio form and/or visual form between an advertiser and the ad selection node 140. Conventional devices, apparatuses and systems, such as for example, a cell phone 161, a personal digital assistant 162, and a personal computer 163 as illustrated, can be utilized within advertiser node 160 to establish such communications. Other suitable conventional devices, apparatuses and systems not illustrated include networked household appliances (e.g., televisions, refrigerators, etc.), digital or satellite radio systems, and others as would occur to those having ordinary skill in the art.

The advertiser may be the end advertiser of a product or service, a marketer, a publicist, a politician, any other similar party, or any party acting as an agent of the advertiser such as a media company, public relations company, advertising agency, or traditional publication. While the nodes of FIG.

1 are illustrated and described as solely communicating using network 110, this is only to be considered a best mode, and not limiting. Various nodes, where possible, may communicate using other forms of communication including phone, fax, in-person meetings, mail, and other forms known in the art. Further, while the nodes, and further their components make-up (e.g. servers, databases), are described as operating independently and on separate platforms, it should be well understood by one skilled in the art that various functions of the node or functions of the multiple nodes may be performed on the same physical hardware, or spread in different configurations, arrangements and architectures among the various nodes.

Extranet Interfaces for Advertisers

Ad selection node 140 (FIG. 1), in particular targeted ad server 141a (FIG. 3) may include various interfaces for facilitating a communication of an advertisement to ad selection node 140 by an advertiser (FIG. 1) or its agent. The advertiser may be a traditional publication, such as The Glenview Announcements, which is a local newspaper for Glenview, Ill. The Glenview Announcements may be found to have a particular area of commercial influence. The region of commercial influence may be any combination of zip codes, cities, counties, states, or other geographical region. In one embodiment, the distribution area of the traditional media version of a publication may define the area of commercial influence for that publication. Commercial influence may be some region other than the distribution area of traditional media version of a publication as determined by market conditions, geographic preferences, or other business and economic factors. The Glenview Announcements may have, for example, an area of commercial influence of zip code 60025. Using various interfaces with ad selection node 140, personnel at the Glenview Announcements may create a digitized version of an advertisement that may appear in the traditional media version of its publication. The Glenview Announcements may also define that this advertisement should only be shown within its area of influence. In one embodiment, the advertiser may also define what sites or category of sites an advertisement may appear on. For example, the advertisement may only appear on news sites and the user (FIG. 1) may then access content provider node 130 (e.g., content server 131a) via user node 120. One example might be viewing the cnn.com website using a web browser on personal computer 123 (FIG. 1). lfuser identification node 150 (FIG. 1) determines that user is accessing the system from within zip code 60025, the digitized advertisement created by the Glenview Announcements may be served. This system may allow traditional publications to sell and broadcast network advertisements that may be displayed only within its region of influence.

The following FIGS. 6-11 illustrate various interfaces for creating a network-based advertisement. The illustrated interfaces may be omitted, rearranged, or added in a system of the present invention without straying from the intent of defining the properties necessary or useful for distributing an advertisement online. Advertisements may be directly entered into a database or software program, may be entered via web interface, or any other means known in the art.

Figure 6:
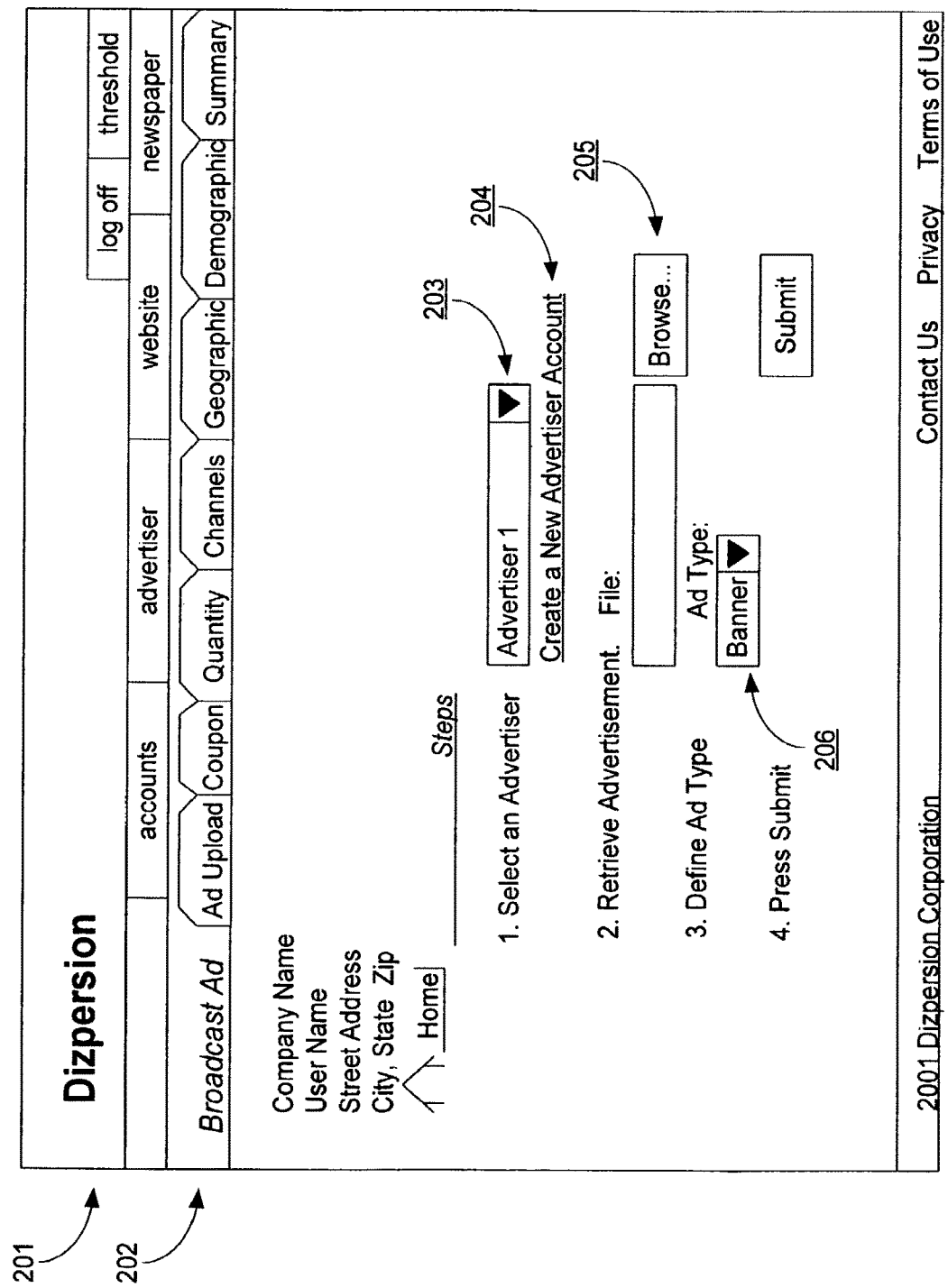
FIG. 6 illustrates one embodiment of an advertisement definition page.

FIG. 6 illustrates one embodiment of a web browser-based interface 200 for beginning the process of defining an advertisement. Below main header 201 is subheader and navigation system 202. Main header 201 and subheader and navigation system 202 may be shared throughout the advertisement definition process. Subheader and navigation system 202 may include of text or image based hypertext links to each step of the advertisement definition process. The link's color, shading, shape, or some other feature may indicate the active page of the process. During the advertisement definition process, a user of the system may wish to change a selection or setting from a previous page, or skip ahead in the process. Subheader and navigation system 202 may allow the user to move to any portion of the process the user may edit. In one embodiment, some portions of the process may not be edited before others. A similar scheme to that indicating which page is active may be employed to indicate the steps of the process to which the user may navigate.

Below navigation system 202, an HTML form may present the user with options for defining an advertisement. Form input 203 may allow the user to select an advertiser for the advertisement being created. If an advertiser has not been defined in the system, and is not held in a database of advertisers in ad selection node 140, the user may be provided with a link 204, or some other means, to navigate to a form for the creation of a new advertiser. After the advertiser for the advertisement being created has been selected in form input 203, the user may define a file for use as, or in creation of, the advertisement in form input 205. A file may be specified directly in text, or a standard file-browsing dialog box may be employed. Files used may include images of the graphics interchange (GIF), joint photograph experts group (JPEG), or any other image file format known in the art. Files used may also include an HTML page, a portion of an HTML page such as a form, Flash executable, some form of streaming media, or any other file format that may be served over a network. After a file has been specified in form input 205, the user may define what type of advertisement they are creating by selecting from form input 206. Advertisement types may include banner, tower, pop-up, pop-under, SMS message, or any other type of advertisement known in the alt. After the advertisement type is selected, the user may proceed to the next step of the advertisement definition process. Some form of client-side scripting, such as javascript, and/or server-side scripting may be employed to ensure that all required form inputs 204-206 contain some legitimate value. Similar client and/or server-side scripting may be employed throughout the advertisement definition process, and throughout any portion of the user interface employed in interaction with ad selection node 140.

Figure 7:
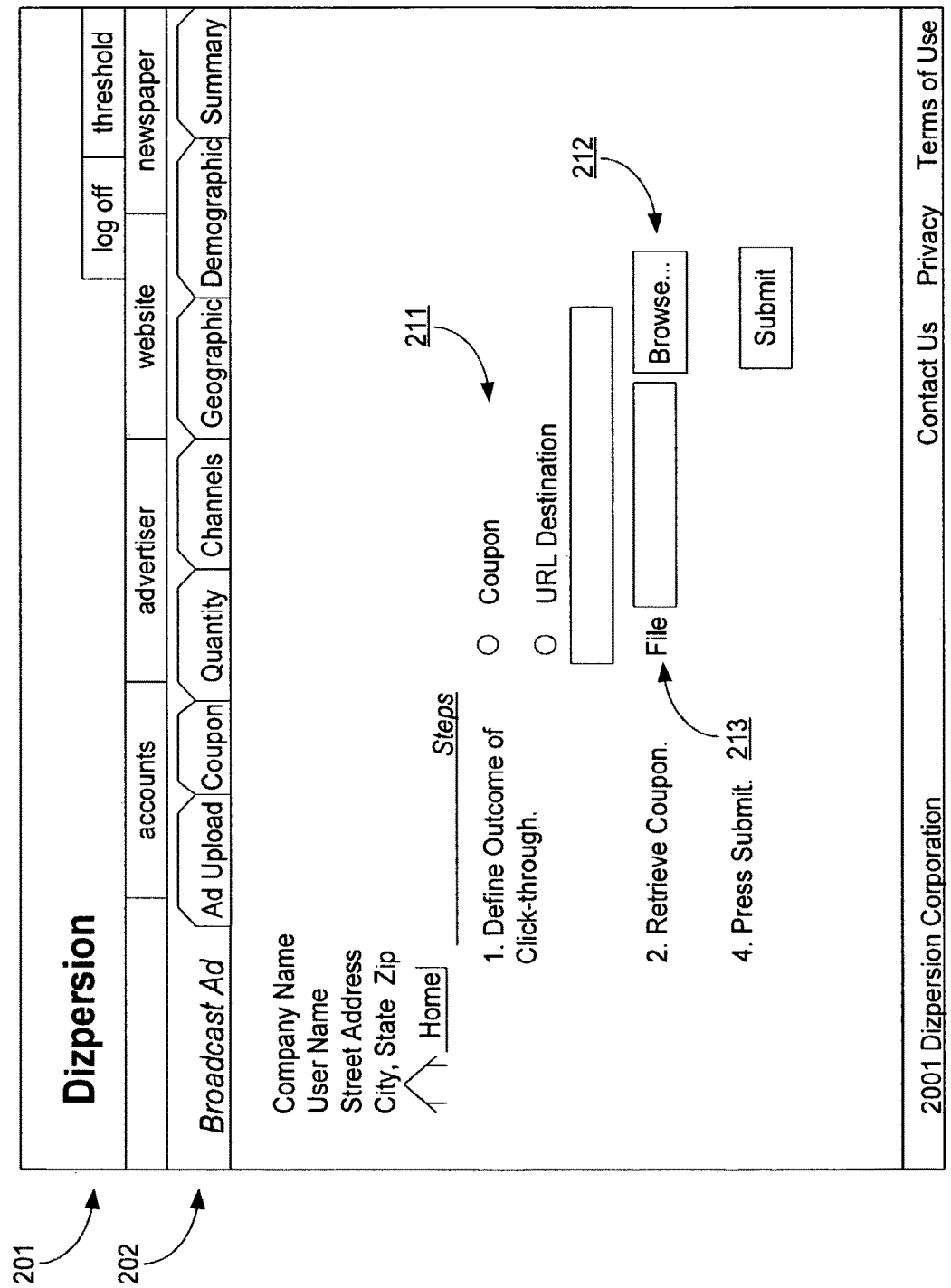
FIG. 7 illustrates one embodiment of an advertisement destination definition page.

FIG. 7 illustrates one embodiment of a web-based interface 210 for defining the destination of the advertisement. An advertisement may contain a hyperlink, may in some way redirect a user, or in some way provide a means for the user to be directed, to another network resource. This other network resource is the advertisement's destination. In one embodiment, the user may select that the advertisement has no destination. Other destinations may include a web page on the advertisers site, a web page on ad selection node 140, a web page on some other site, an email link, or any other network resource known in the art. One embodiment allows a coupon to be defined, which is a configurable page on ad selection node 140 the details of which will be discussed hereafter. On web-interface, the user may select the type of network resource for the destination with form element 211. If the user selects a URL destination, the user may specify that destination in form element 212. If the user selects a coupon destination, the user may specify an image, or any other file type known in the art, for use in creating the coupon using form element 213. After the destination has been specified, the user may proceed to the next step of the advertisement definition process.

Figure 8:
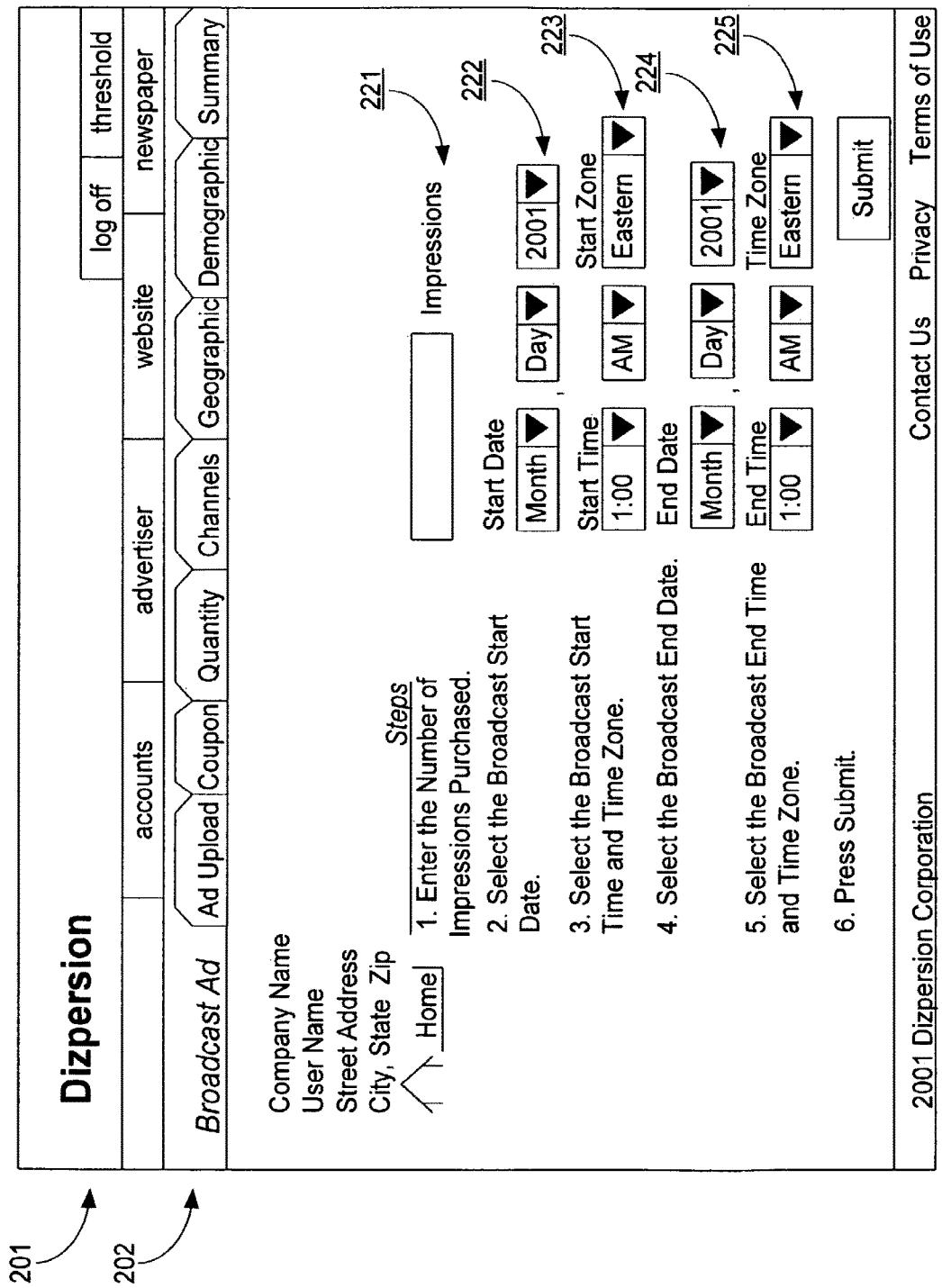
FIG. 8 illustrates one embodiment of an advertisement quantity and duration definition page.

FIG. 8 illustrates one embodiment of a web-interface 220 for defining the quantity and/or duration that an ad should be displayed on ad selection node 140. A standard method for defining the quantity and/or duration of a network advertisement is to specify a number of impressions, or the number of times the advertisement will be delivered. The user may specify the number of impressions in form input 221. In one embodiment of the present invention the user may select a start date, which is the date on which the advertisement will begin its broadcast on ad selection node 140. The start date may be entered using date selection form elements 222. In one embodiment the user may specify a start time, which is the time of day an advertisement will begin its broadcast on ad selection node 140. The start time may be entered using time selection form elements 223. In one embodiment of the present invention the user may select an end date, which is the date on which the advertisement will end its broadcast on ad selection node 140. The end date may be entered using date selection form elements 224. In one embodiment the user may specify an end time, which is the time of day an advertisement will end its broadcast on ad selection node 140. The start time may be entered using time selection form elements 225. In one embodiment, a time zone may be specified with the start time and end time so that those times reflect the selected time zone. In one embodiment the user may select that the start time and end time be relative to the time zone the ad may be served in. In this embodiment, if the advertisement may be served in multiple time zones, the ad may actually have multiple start and end times. This Would, in effect, cascade the start and end times in accordance with the selected time zones. In one embodiment, the user may specify only the number of impressions. In one embodiment the user may specify only a start and end time timing which an ad will be broadcast. In one embodiment the user may select both the number of impressions and the start and end times. In this embodiment, should the advertisement be served up to the number of impressions prior to the end time, it may automatically stop being served.

Figure 9:
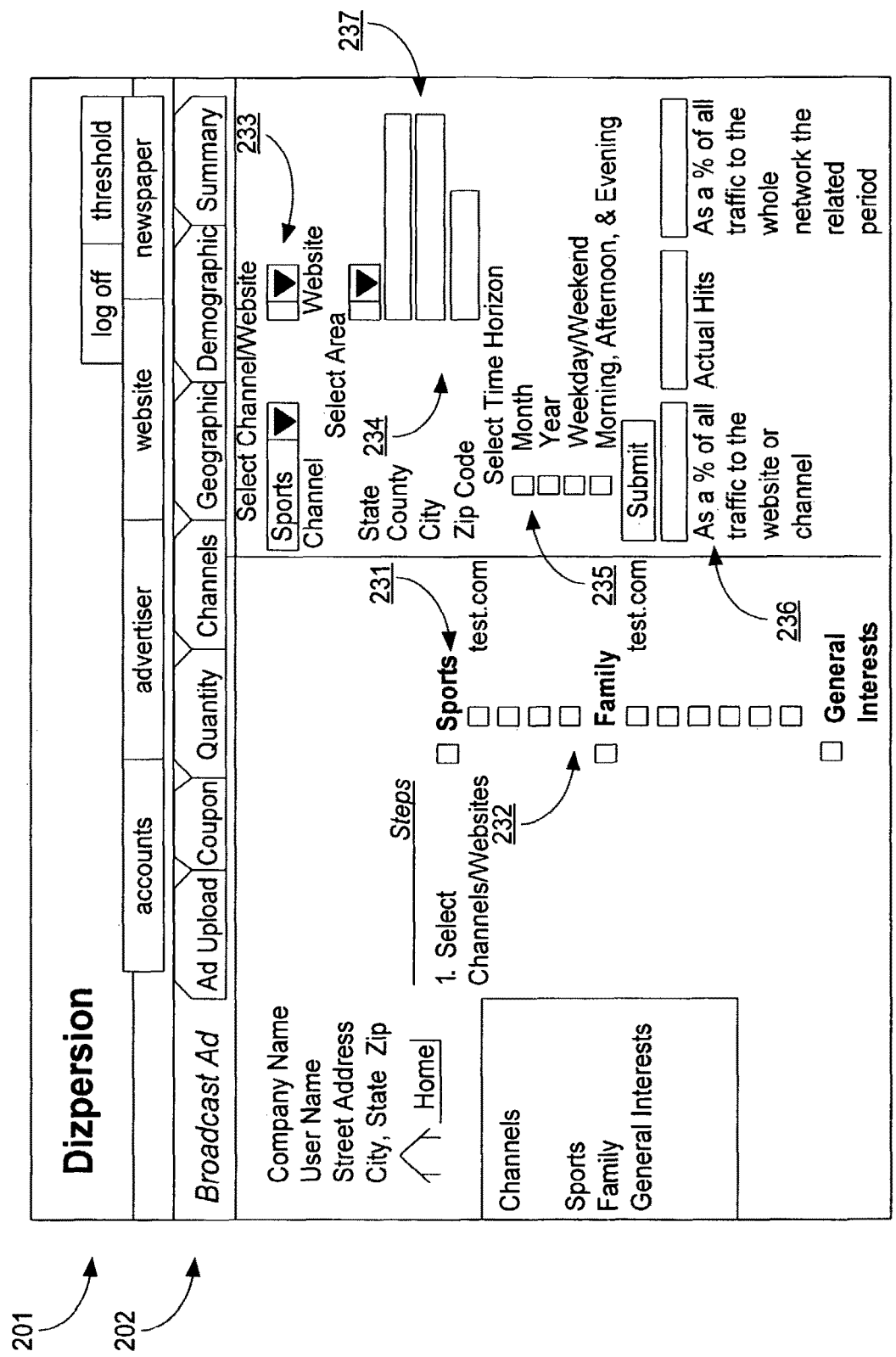
FIG. 9 illustrates one embodiment of an advertisement web site and category definition page.

FIG. 9 illustrates one embodiment of a web-interface 230 for defining the web sites or other network channels over which the advertisement may be displayed. In one embodiment the user may select any combination of sites and network channels available to ad selection node 140. In one embodiment only the sites and network channels that support the type of advertisement specified on web-interface 200 (FIG. 6) will be displayed. In one embodiment, web sites or network channels may be organized into categories based upon subject matter, user demographic, or some other method of categorization. The user may specify that all sites or network channels in a category may display the advertisement by selecting category form element 231. For example, the user may specify that their advertisement be displayed on all sports sites, or all sites relating to women, or all news sites. In one embodiment, selecting category form element 231 may cause individual web site and network channel form elements 232 to be selected. In one embodiment the user may deselect those websites and network channels of form elements 232 on which she does not wish to display the advertisement. When specifying the web sites, network channels, and categories over which an advertisement should display, it may be useful to have some means of estimating the anticipated traffic over those web sites, channels, and categories. In one embodiment, web-based interface 230 may contain or link to a web-based sub-interface 237 for estimating impression traffic levels on web sites, network channels, or categories. In one embodiment, sub-interface 237 may display a traffic level based upon the sites, channels, or categories selected on web-based interface 230. In one embodiment the user may specify the sites, channels or categories for the traffic report based on those selected in form elements 233. In one embodiment, the traffic report may be more narrowly defined to a specific geographic area. In one embodiment the geographic area may be that defined for the advertisement's distribution, the details of which will be discussed hereafter. In one embodiment the geographic area may be defined using form elements 234. In one embodiment the user may select the time period for which the traffic report should display using form elements 235. In one embodiment the traffic report may include one or all of the following statistics as shown, for example, in form elements 236: total number of impressions, percent of the total site, channel, or category impressions over the defined time period that are displayed in the defined geographic area, and percent of total impressions served on ad selection node 140 that fit the criteria defined in sub-interface 237.

Figure 10:
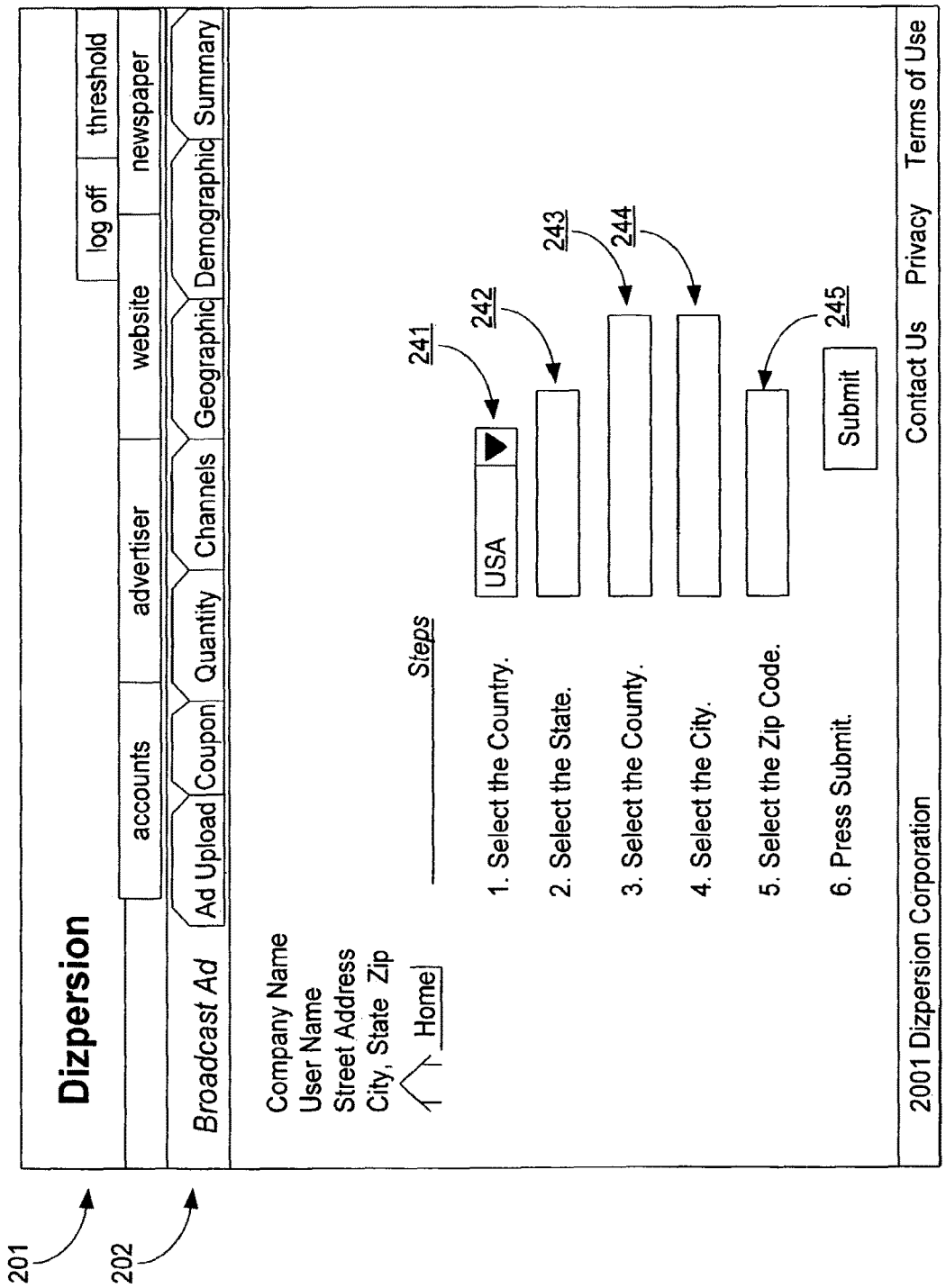
FIG. 10 illustrates a first embodiment of an advertisement geographic location definition page.

FIG. 10 illustrates one embodiment of a web-interface 240 for defining the geographic area over which the advertisement may be displayed. In one embodiment the user may select the country in which they wish to serve the advertisement using form element 241. Depending upon the country selected in form element 242, web-interface 240 may display in form element 242 the appropriate states, provinces, or other geographic regions contained within the country selected in form element 242. Again depending on the region selected in form element 242, web-interface 240 may display the next appropriate level of geographic regions within the area specified in form element 242. These may be displayed in form element 243. In one embodiment, the regions displayed in element 243 may be counties. This process may continue in a like manner to form element 244 which may display the appropriate cities, and to form element 245 that may display the appropriate postal or zip codes. In one embodiment, multiple elements may be selected at each of the form element levels 241-245. In one embodiment only multiple zip or postal codes may be selected. In one embodiment the user may stop at any point and the system will use the greatest level of geographic specificity indicated. In one embodiment the user may specify an area and then choose to add another different area to the area already specified. In one embodiment the user may save a defined area for use in later advertisement definitions. These defined areas may be made available on web-based interface 240. In one embodiment web-interface 240 will only display the geographic areas the user may serve the advertisement into. These allowed areas may be based upon the primary or secondary status of the user's organization, or any other rules established on ad selection node 140.

Figure 11:
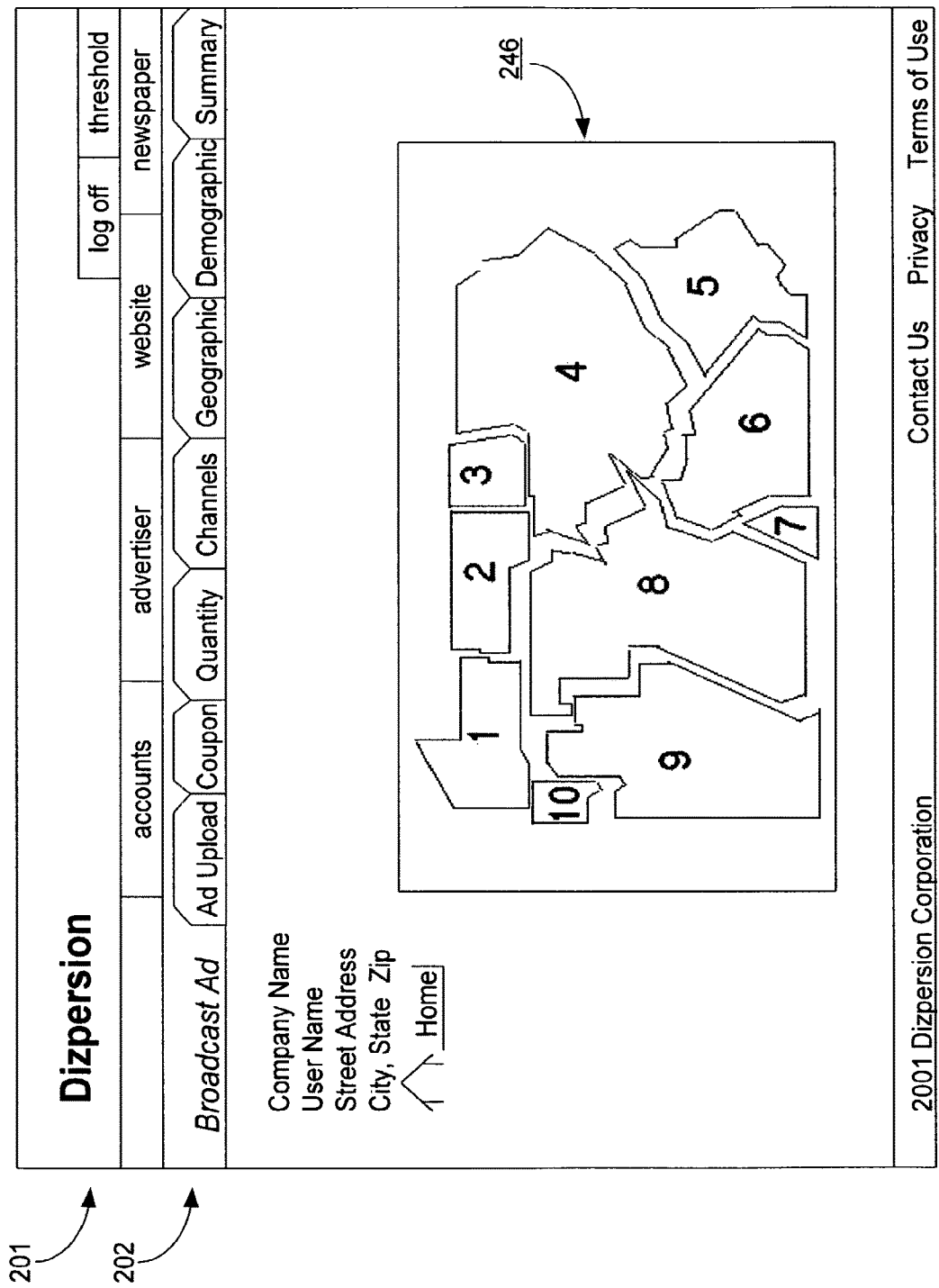
FIG. 11 illustrates a second embodiment of an advertisement geographic location definition page.

FIG. 11 illustrates an alternative embodiment of a web-interface 240' for defining the geographic area over which the advertisement may be displayed. This embodiment is designed to the specific needs of an agent of the advertiser in the form of an advertising agency. Advertising agencies may specify the geographic area over which the ad may be displayed using an interface that breaks a region into Designated Market Areas (DM s). DMA, a convention of the Nielson Media Research, is defined by television viewing patterns, and is a commonly used geographic definition by advertising agencies. It is common practice in advertising to run a copy test of a particular advertising campaign in a designated geographic area, providing a mix of direct mail, television, radio, and other advertising mediums to gauge consumer response prior to a national or global rollout of the campaign. Often the designated geographic areas for the copy test are defined by DMA. Without the capability to geographically target networked advertising, advertising agencies have been unable to include this medium effectively in their copy testing. By providing a geographically targeted ad server along with an interface breaking geography down into DMAs, advertising agencies not only are able to include networked advertising in their copy testing, but may do so in a manner that more closely and easily maps to their current practices. Accordingly, interface 240' may be provided, supplying a graphical method, which may be in the form of a clickable map 246, of specifying the DMAs over which their advertisements should be displayed. Alternatively, a clickable area may include campuses, airports, or within a certain proximity of business or other types of locations.

Figure 12:
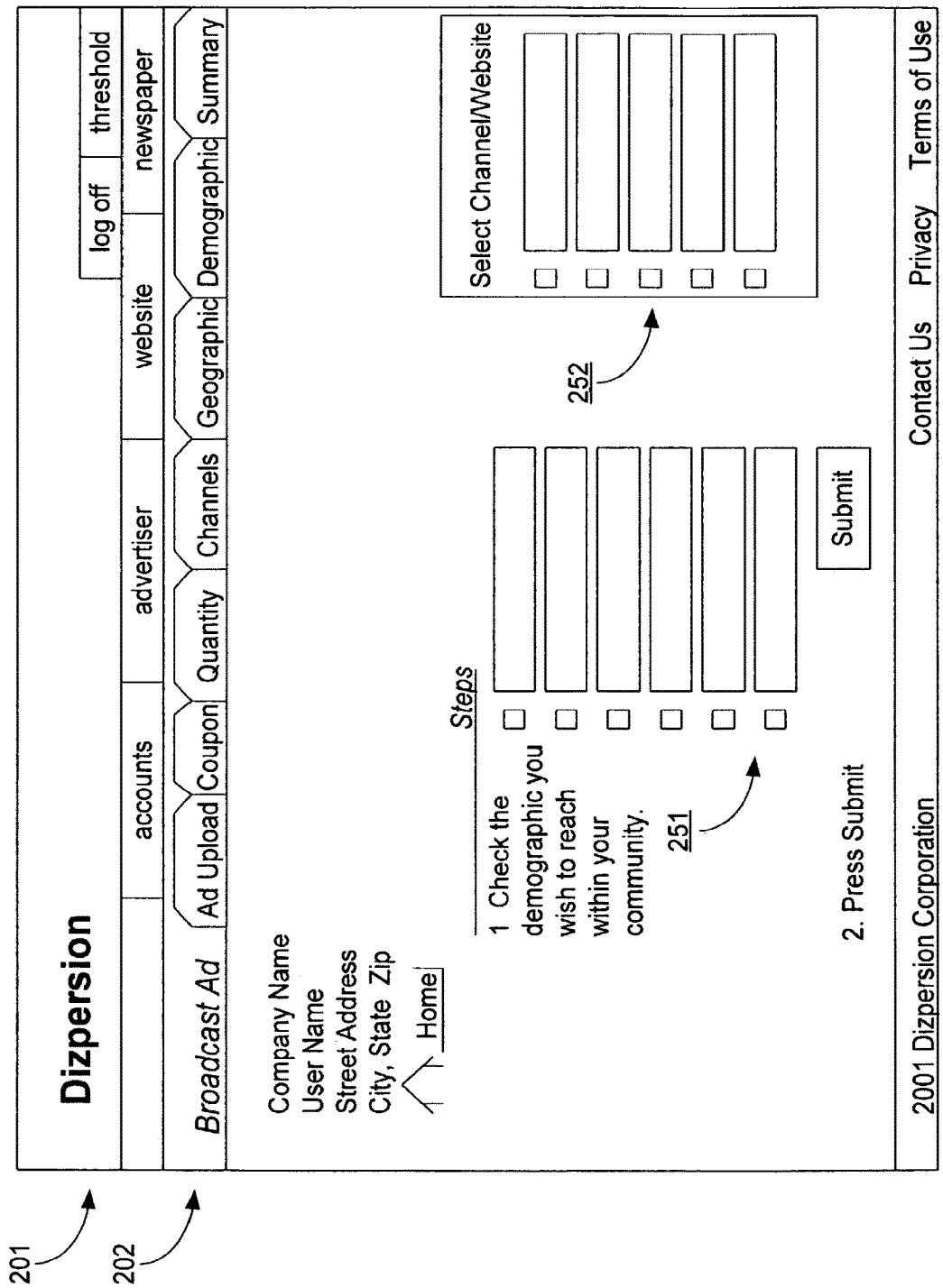
FIG. 12 illustrates one embodiment of an advertisement demographic definition page.

FIG. 12 illustrates one embodiment of a web-interface 250 for defining the end user demographics over which the advertisement may be displayed. The United States Census Bureau (USCB), among other similar international bodies, and certain commercial entIlllises collect and distribute demographic information. In one embodiment, ad selection node 140 may hold demographic information, such as the USCB census data, and may make it available to the user. This data may be used during the definition of an advertisement to specify the demographics over which the advertisement may be displayed. In one embodiment the user may specify the demographics they wish to target for the advertisement under inputs 251, and ad selection node 140 may use the USCB census data to select for the user the geographic areas in which the selected demographics are prevalent. In one embodiment these selected demographics may narrow the geographic area defined on web-based interface 240. In one embodiment the user may choose not to indicate a geographic area specifically, but may only select the demographics they wish to target. Web-interface 250 may contain or link to a web-based sub-interface 252 that may display the demographics associated with selected web sites, channels, or categories such as those in web-based interface 230.

Many of the advertisers using telecommunication system 250 may not have an active network presence. Advertisers may wish to specify some network location as the destination for their advertisement even in the case that they do not have an active network presence. In one embodiment of the present invention the user defining the advertisement may wish to specify a coupon as the destination of the advertisement as shown in form elements 605,615 on web-based interface 210 of FIG. 7.

Figure 13:
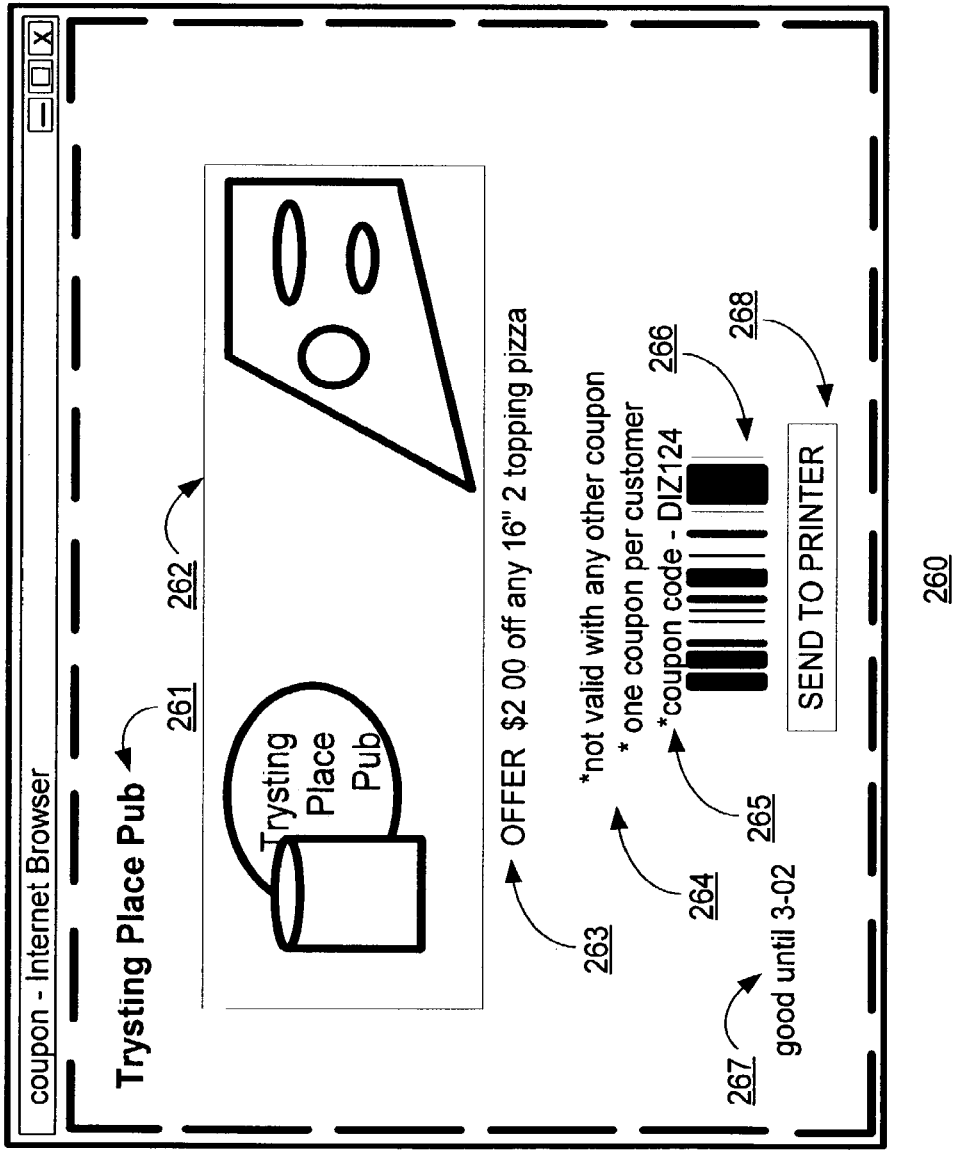
FIG. 13 illustrates one embodiment of an advertisement coupon page.

One embodiment of a coupon 260, is illustrated in FIG. 13. In one embodiment, a coupon may contain any combination of elements including; the advertiser's company name 261; an image or multimedia file 262; a specific offer from the advertiser 263; restrictions 264 such as "not valid with other coupons," or "one coupon per customer"; a coupon code 265 or a bar code 266 that may be used by the advertiser for general campaign tracking or the for tracking the specific use of that coupon; a valid or expiration date 267; a link or print image 268 that may cause the coupon to be printed. In one embodiment, ad selection node 140 may track and record data relating to what advertisements are served, what advertisements are clicked on, and in the case of coupons, what advertisements are printed out. In one embodiment, the tracking data may include a timestamp representing when the advertisement was served, clicked on, printed, etc. The timestamp may be used to determine the most effective times to display advertisements, where effectiveness is measured by response level.

Figure 14:
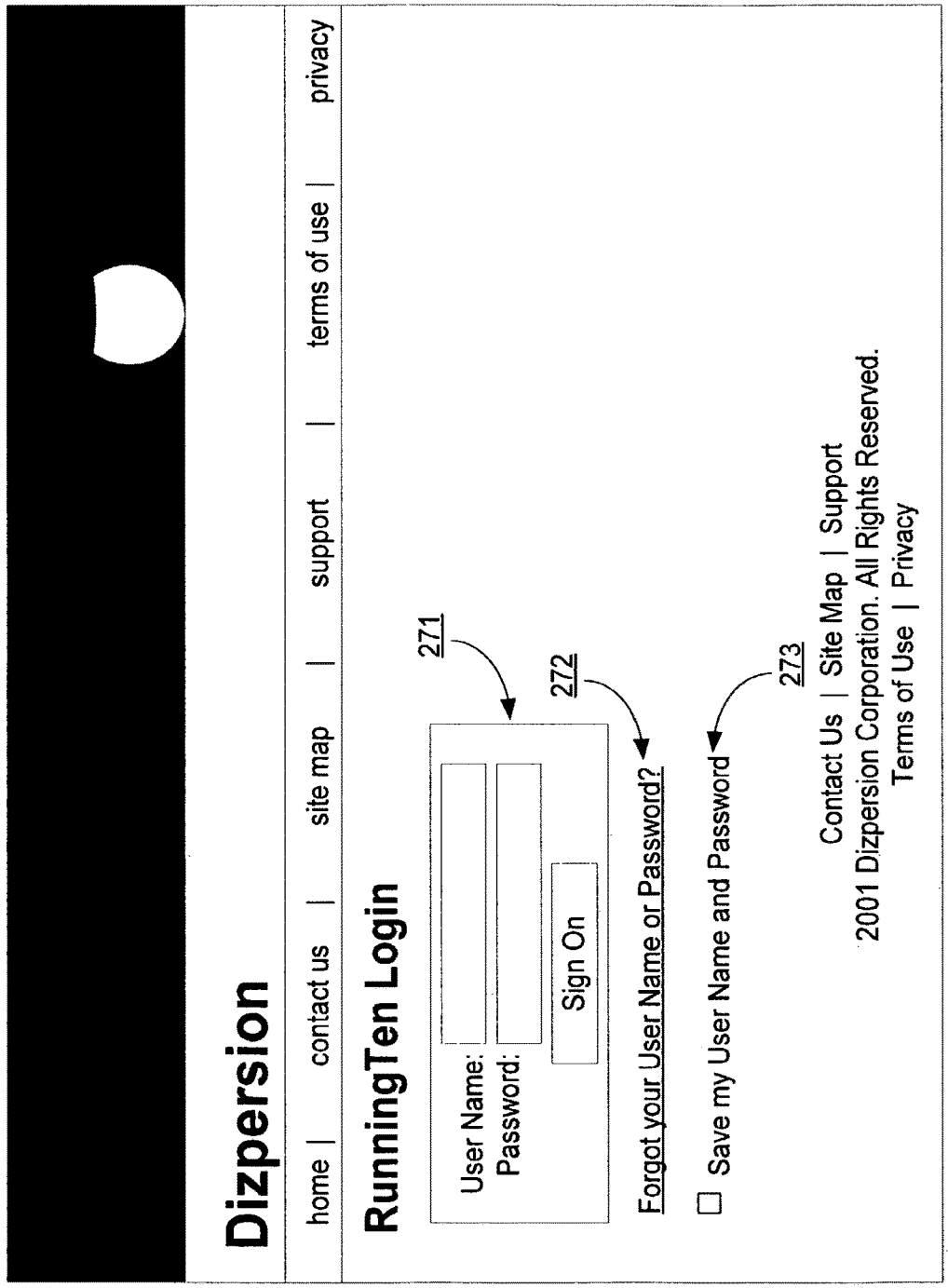
FIG. 14 illustrates one embodiment of a client extranet login page.

Several types of end-user may access ad selection node 140. Administrators or employees of consumer web sites, or any other source of content being served to the end user node of telecommunication system 100, may wish to create, update or view information relating to their participation in the system. Administrators or employees of media companies, publications, or advertisers may wish to create, update or view information relating to their participation in the system. Administrators or employees of ad selection node 140 may wish to create, update or view information relating to their participation in the system. End users may wish to create, update or view information relating to their participation in the system. Many means may be provided allowing full or restricted access to information on ad selection node 140 including software application, direct access to the command line or operating system interface, web-based interface, or any other means of interaction or interfacing known in the art. FIGS. 6-12 illustrated web-based interfaces, all of which may be collectively gathered into a secure web-based client extranet. In one embodiment, this may be a collection of HTfV[L pages, accessible only when an appropriate user name and password combination is supplied. FIG. 14 illustrates a web-interface 270 that may act as a log in page to the web-based client extranet. Web-interface 270 may include form elements 271 where the user may submit a user name and password. A user name and password recollection link 272 may be provided to help the user remember her user name and password. In one embodiment, ad selection node 140 may email the user name and password to the user. Web-interface 270 may also allow the user to specify that the system automatically log them in on following occasions by selecting form element 273.

As noted previously, various individuals, companies or other entities may be allowed access to the ad server to define ads for network publication. In addition to the interfaces described for the newspapers and other traditional media companies, an interface may be provided specifically for promotional or image and branding advertising agencies, individual branches of companies such as franchise owners or dealership owners, and any of these interfaces may be provided or accessed through an in-house website, or by portal sites such as Yahoo.com and AOL. Access may be granted and interfaces to the ad server may be provided to all of the above, any combination of the above, or none of the above. Advantages may be gained by specializing the interfaces to any or all of these entities.

One such specialized interface may include a design for use in the political or government arena. A page that may be implemented in a different manner, for use in the political or government arena, is web-interface 240 for defining the geographic area over which the advertisement may be displayed. For example, a congressional candidate may be presented with a web-interface that allows her to select the geographic area for an ad based on congressional district. In one embodiment, the geographic selection and other selections may be more graphically based, so as to ease the user definition process. The geographic selection may be done by selecting regions on a map. The map may be broken down into the appropriate regions based upon the user-state, congressional district, MSA, etc. As another example of a specialized interface, web-interface 250 for defining end user demographics may especially focus on key political demographic information such as political party affiliation.

Other special needs may be associated with ads for political candidates, or other advertisers. For example, the calls to action for user might be to donate money, volunteer, or find out more information regarding the advertisers view or opinion on an issue. Interfaces and processes may be in place as part of ad selection node 140 that allow an advertiser to set up predefined or custom pages that achieve such ends as contact information collection for volunteers, credit card processing for donations, or audio or video feeds. Continuing with the political candidate example, templates for a web page, portion of a web page, or whole site may be supplied to the advertiser along with the ability to input, edit, and delete information regarding themselves, their parties, or their candidacy.

The interface and process of selecting site, geographic and demographic targeting information may be done separately, or in some degree of conjunction. In one embodiment, the user may simply provide a demographic selection through demographic interface. Using census data and/or demographics associated with websites, the geographic area in which to serve ads may be determined. For example, a user might not be presented with the opportunity to specifically select the content sites they wish to have their ad appear on, but ad selection node 140 may select these sites based on the demographics of the desired audience, or based on the geographic selection and what sites most consistently have heavy traffic from that geographic area. In another embodiment, geographic information might not be specifically defined, but ad selection node 140 may select the geography based on the selected demographics and demographic data associated with various geographic regions. The more information ad selection node 140 holds, gathers, receives, or gleans regarding the relationships between sites, geography, and demographics, the more powerful the interface may become. Demographic information regarding a site's visitors may be determined, through survey, poll, subscription information or other means. Demographic information regarding a geographic location may be determined through use and analysis of census information, poll data, or other sources. As ad selection node 140 collects impression logs it may also develop further information stores relating to the relationship between individual site traffic and the geographic origination of the ad requests. This geographic information relating to site traffic may be analyzed in conjunction with the previously mentioned census information, etc. Each of these relationships may be used to expand, refine, or define the audience for a particular advertisement.

For example, a political candidate may be more familiar with the demographics of the audience she wishes to reach, and the geographic area of her constituency, rather than the sites on which she wishes to have her message displayed. For the purpose of this example we will say the message relates to "a Woman's right to choose" and is geared toward a female audience. In this embodiment, the candidate may specify the geographic area of her constituency, and specify that the ad should be targeted towards women. Ad selection node 140 may then specify that this ad should be served on sites such as iParenting.com, as iParenting.com has collected demographic information relating to their audience that suggests that 98% of their audience is female. A more complicated decision regarding the audience for this message might be including in the audience a geographic location outside of the area of constituency based on information such as the fact that an all-women's college exists in that geographic location, and based on the assumption that it is close enough to the specified geographic location that it may be considered likely that some of the women there actually live in the area of the constituency or may have some influence over someone who does live in the constituency. \\Then making recommendations or decisions such as these wherein the advertiser has not specified some aspect of the ad serving parameters, the recommendations or decisions may either take place without the advertiser's knowledge or control, or may be presented as suggestions, or available for editing to the advertiser.

By way of another example, consider a branch of the Hispanic Dental Association (HDA) wishing to advertise the availability of Hispanic dentists in their region. An interface may be provided on which the branch of HDA specifies only their geographic region and that they wish to target Hispanics. Ad selection node 140 may narrow the geographic region covered based upon a set or advertiser defined population concentration of Hispanics. In other words, the ad might only be served into zip codes with a population consisting of at least 10% Hispanics. The sites on which the ad will be broadcast may be selected in a manner similar to that described above, specified by the advertiser, or in any other manner as would occur to one of ordinary skill in the art.

Interfaces may also be defined that allow the advertiser or agent of the advertiser to specify predefined areas of particular note. For example, they may be allowed to select geographic regions surrounding points of note such as college campuses or airline hubs. Using such information a political candidate, for example, might specify that they wish to have a request for volunteers message sent out around the college campuses in their area. Other areas may be defined for specific advertisers such as for the areas surrounding each of their stores, outlets, or franchise locations. For example, an interface might be created for Subway giving them the option to advertise surrounding individual restaurant locations or groups of locations.

Various arrangements may also be implemented between the company holding ad selection node 140 and potential advertisers. Examples of potential advertisers may include: publications, media companies, web sites, advertising agencies, government bodies, corporations, franchisees of companies, divisions of companies, individual locations of a larger company, single location companies, organizations, charities, clubs, local retailers or service providers, or even individuals not in any direct affiliation with a commercial or political venture. In one embodiment the company holding ad selection node 140 may maintain all interfaces for these potential advertisers. In another embodiment some or all of the interface may be held and or maintained by other internet sites, such as portals like yahoo.com, or they may be managed by advertising agencies, or managed by franchised companies for their franchisees, or by companies for their use or use by their subsidiaries, individual divisions, branches or locations. Accounts on any of these interfaces may be automatically created at the request of the potential advertiser, or may be configured by an administrator of ad selection node 140 or an administrator of any service supporting interfaces with ad selection node 140, by advertising agencies for their clients.

The process and interfaces described above for defining advertisements may allow for the party defining the ad to identify very specific terms under which the ad may be served, and also may specify with a level of acuity other aspects of the desired audience. In one embodiment a local owner of a franchise, for example McDonald's®, may have access to a site for creating ads held directly on ad selection node 140 and configured by its administration, or in another embodiment the site may be available via a site run by an advertising agency or a section of ad selection node 140 configured by an advertising agency. The advertising agency may have no affiliation with said franchise, may be their advertiser of record, or may be employed specifically for their capacity to set up such interfaces to ad selection node 140 for franchisees. The local O'Nner of a McDonald's may wish to advertise a new sandwich we will term the McCrispy. Using an interface to ad selection node 140 the local franchise owner may select to only advertise in the immediate geographic area. This may be based upon zip codes, city names, may be a predefined area for that particular local franchise location, or any other means of specifying that area. In order to reach consumers when they are most interested in the McCrispy, it may be specified that the ad run, for example, only between 10:00 am and 2:00 pm, to attract a lunch crowd. The time of advertisement may be based on a situation such as this where it caters to consumer needs, directly opposed to consumer needs in order to speed up slow times, by the local franchise owner based upon internal factors such as availability of employees to handle any additional customer traffic, or any other reason. In one embodiment the local franchise owner may also create a coupon destination for the McCrispy ad that may be printed out and brought to that franchise only, or it may be a coupon usable at all participating McDonald's locations. To further encourage a time specific response the coupon might have a time limitation on it. For example, good between 10:00 am and 2:00 pm on the following dates, 2/4-211I.

In another embodiment a company such as a commercial airline may have access to an interface for ad selection node 140. Some means for advertising "last-minute" availability of seats may be found in the art, such as on the airline's web site, or via promotional emails. These both require consumers to have interacted•with the airline previously. One means for overcoming this disadvantage would be for the airline to be able to advertise last-minute availability of seats using standard internet advertisements on a variety of sites. Previously this would have been a shotgun approach, the message reaching only a very few of the consumers who might take advantage of such availability. Using an interface to ad selection node 140 the airline may specify that an advertisement only be broadcast in the origination and destination cities for the available flight. In addition to this, the airline may wish to specify websites or categories of websites on which their advertisement may be broadcast. This selection may be based on historical demographics of the site's or category of site's users, or whatever other basis chosen by the company creating the ad. As noted, commercial airlines may have last-minute fares they wish to advertise, or business class specials, or frequent flier miles specials. Continuing the example, the airline might wish to advertise the last-minute fares or business class specials not only to the origination and destination cities, but may also wish to advertise only to a business crowd demographic. Using an interface on ad selection node 140 the airline may view historical demographics of various sites and categories and may for example select to advertise on news sites and stock information sites based upon the information available on said interface indicating that these sites are primarily viewed by working people ages 25-40. In another embodiment the airline may wish to create a coupon destination for their advertisement. This coupon may be, for example, a voucher for a free beverage, a class upgrade, may have a specially generated code required to redeem the offer on the airline's site, or whatever the airline chooses to create.

In another embodiment, companies with disperse locations may wish to advertise on the Internet. This may be companies such as health clubs (e.g. Bally Fitness), or vehicle manufacturers (e.g. Ford, GM). A company such as Ford holds sales both at the manufacturer level and at the dealership level. Using an interface to ad selection node 140 Ford may specify the distribution areas covered by each of their dealerships as well as then aggregate the area over which all their dealerships are easily accessible. These area definitions may be preloaded by an administrator of ad selection node 140, may be loaded by an advertising agency working on behalf of Ford, or any other entity. Using these defined areas Ford may then advertise sales at specific dealerships, or allow their dealerships to access ad selection node 140 and advertise the sales themselves. Advertisements with a dynamic portion may be created on which an area indicating the closest dealership is generated specifically based upon the determined location of the person viewing the advertisement. A coupon destination may also be employed for such purposes.

Any variety of interfaces may be designed, making most easily available to the particular business user the features of ad selection node 140 most valuable to them. These features may include or exclude any of the ad definition pages described previously. When used in concert the various capabilities may allow for extremely targeted advertising in the online arena. For example a day care center in Evanston, Ill. may wish to advertise their services. Using an interface for local advertisers this company might select to advertise only in zip code 60201, and then might also select to only advertise on iParenting.com, a site that has historically been trafficked 98% of the time by women. Selecting only these two factors the day care center has essentially narrowed the advertisements audience to women in Evanston.

Figure 15:
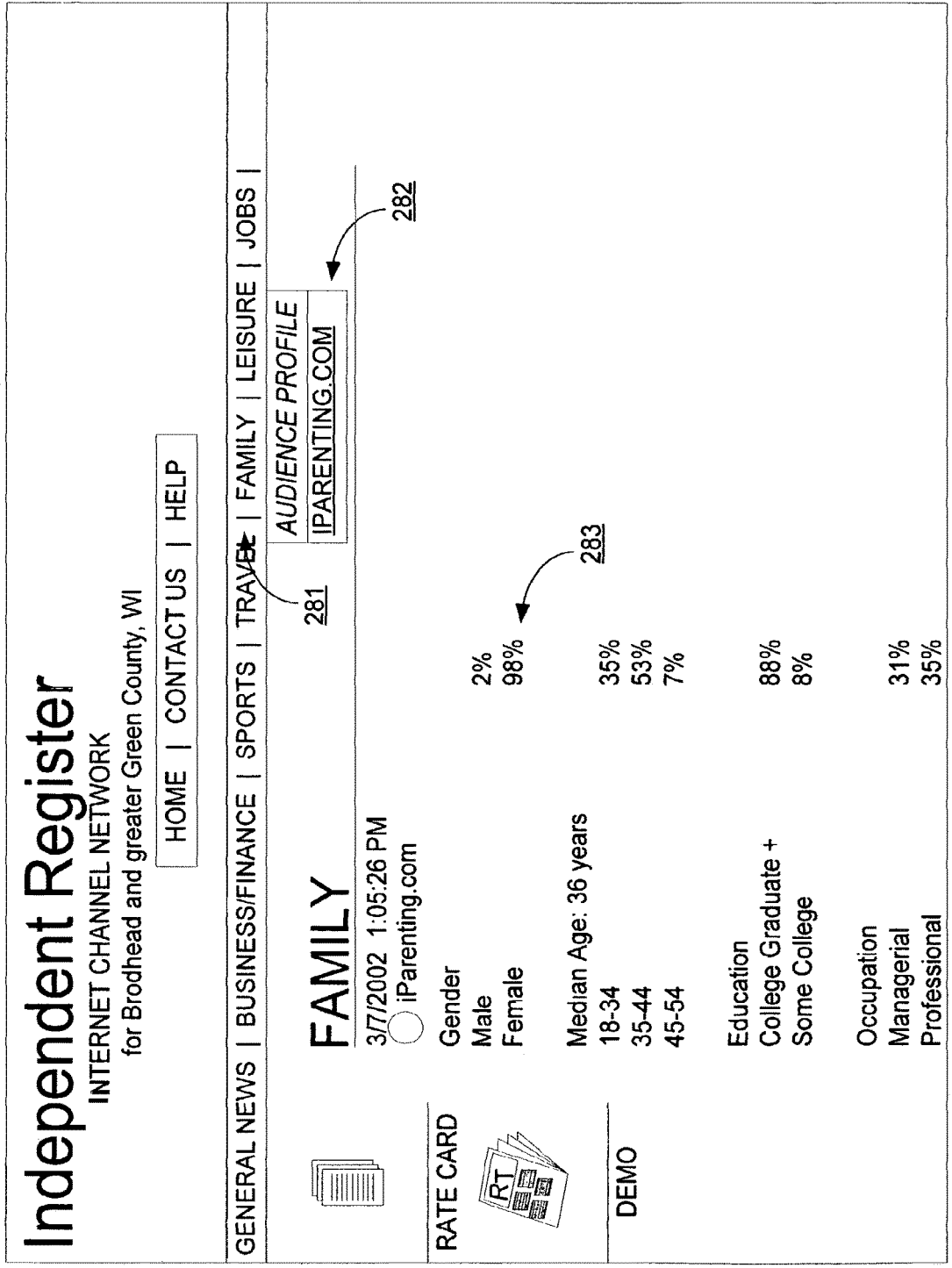
FIG. 15 illustrates one embodiment of a web site category and demographic interface.

FIG. 15 illustrates one embodiment of a site and category selection interface 280 for helping advertisers determine which site or category of sites they may wish to advertise on. The available sites may be broken down into categories such as family 281, in which an individual site 282 or sites may be listed such as iParenting.com. If one clicks on one of the available sites 282, the historical demographics 283 for that site may be displayed, such as the gender distribution, median age, education level, occupation, or others. Again, these demographics may be used in conjunction With time specificity and geographic location to finely identify and target a desired audience.

In one embodiment, access to an advertisement definition section, as illustrated in FIGS. 6-11, may only be given to advertisers, publications or media companies registered with ad selection node 140. In one embodiment, advertisers may be given access to the advertisement definition section. In one embodiment, if an advertiser is given access to the advertisement definition section, an administrator of ad selection node 140 may approve or reject an advertisement before it is activated on ad selection node 140. It may be useful, in the event that advertisers are given access to the advertisement definition section, to provide a simplified or more graphical interface for this section. In one embodiment the interface may include a map displaying the regions in which an advertisement may be served. A user may be allowed to select different ways in which the map may be broken down. In one embodiment, the user may select to view the map from different focus levels, zooming in to state or city levels or zooming out to a global view. In one embodiment, the user may select to have the map broken down into regions representing demographics that may allow them to, for example, select the regions in which there is a concentration of senior citizens, or the regions in which there is a strong Hispanic population. Other aspects of advertisement definition, such as the selection of time zone, may be simplified using graphical representations. In one embodiment these interfaces may be made available to the advertisers, publication and media companies as well.

Extranet Interfaces for Administrators

FIGS. 16-23 illustrate an administrative extranet may be provided for the administrator of ad selection node 140.

Figure 16:
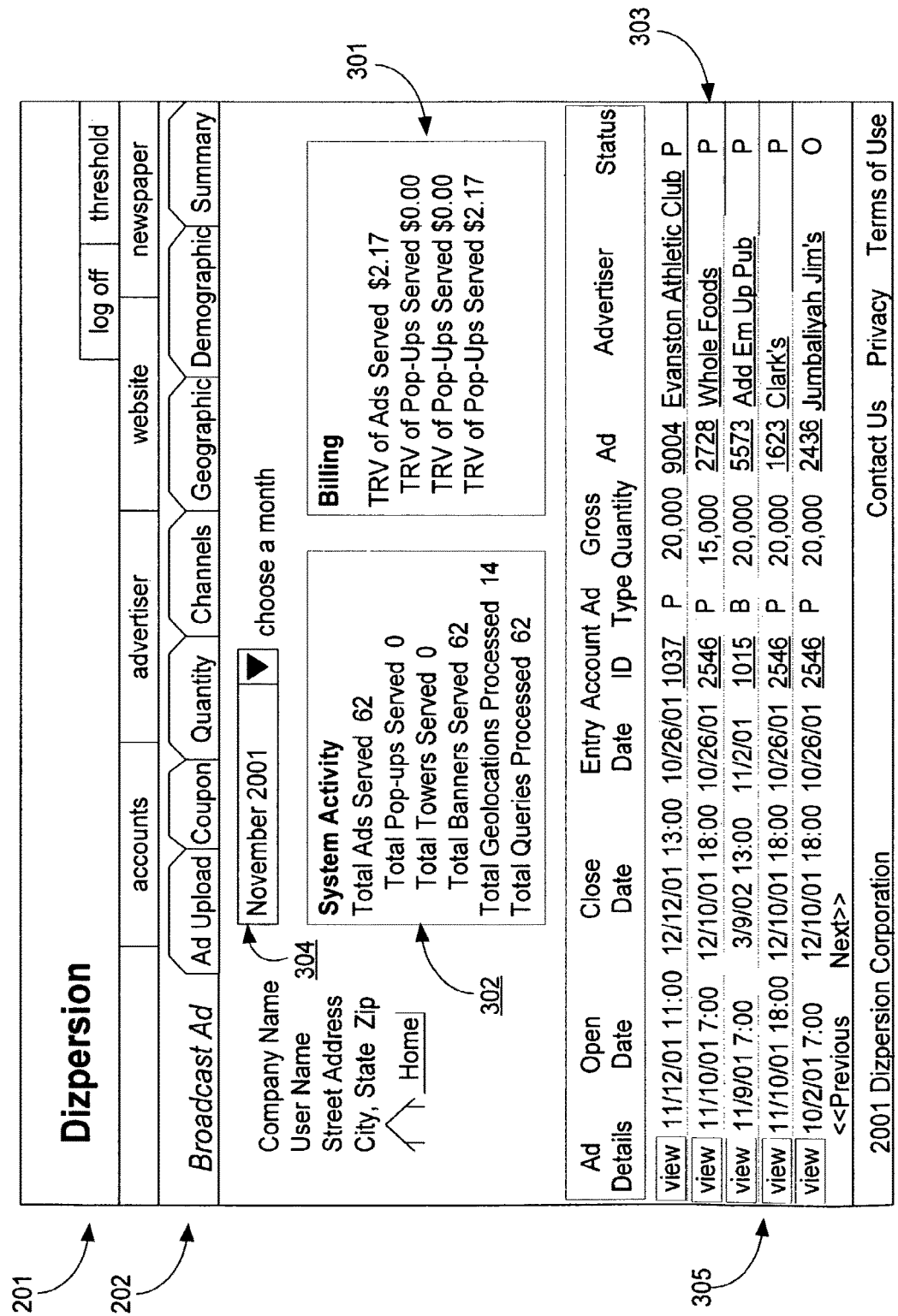
FIG. 16 illustrates one embodiment of an administrative extranet home page.

FIG. 16 illustrates one embodiment of an administrative extranet home page 300. In one embodiment the administrator may view the following: system activity 301 such as total ads served, ads served by category, geolocations processed, or similar such information; billing information 302 such as the total retail value (TRV) of all ads served, the TRV of ads served by category, or similar such information; advertisement records 303 that may include information such as open date and time, close date and time, entry date and time, advertisement type, impressions purchased, advertiser company name, advertisement status, or any similar such information. In one embodiment the advertisement records 303 may contain an advertisement details link 305 to view further information about the advertisement, including ad impression details. In one embodiment the extranet home page 300 may only display system activity that relates to the current month or to a month selected in form element 304.

Figure 17:
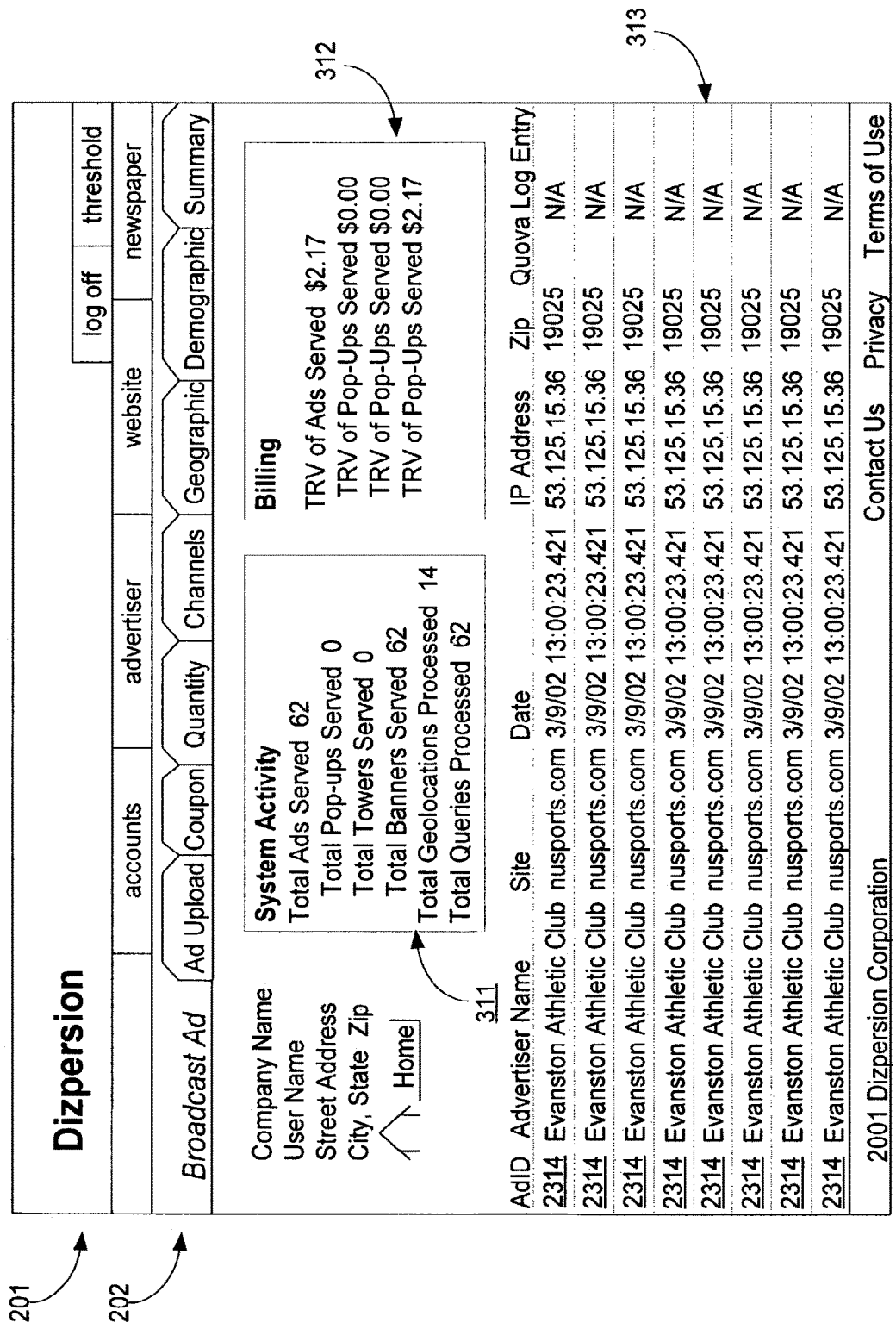
FIG. 17 illustrates one embodiment of an advertisement details page.

FIG. 17 illustrates one embodiment of an advertisement details page 310 as may be reached through the advertisement details link 305. In one embodiment advertisement activity information 311 similar to that of system activity 301 may be displayed, but relating only to the selected advertisement. In one embodiment advertisement billing information 312 similar to that of billing information 302 may be displayed, but relating only to the selected advertisement. In one embodiment ad impression records 313 may be listed including information relating to individual impressions served such as: advertiser name, the site on which the advertisement was served, the date and time the advertisement was served, the IP address to which the ad was served, location information such as zip code relating to where the ad was served, and a link to further details (if available) relating to the processed geolocation information. In one embodiment a page similar to advertisement details page 310 may be available with geolocation information including any or all details returned from a request to geolocation server 135.

Figure 18:
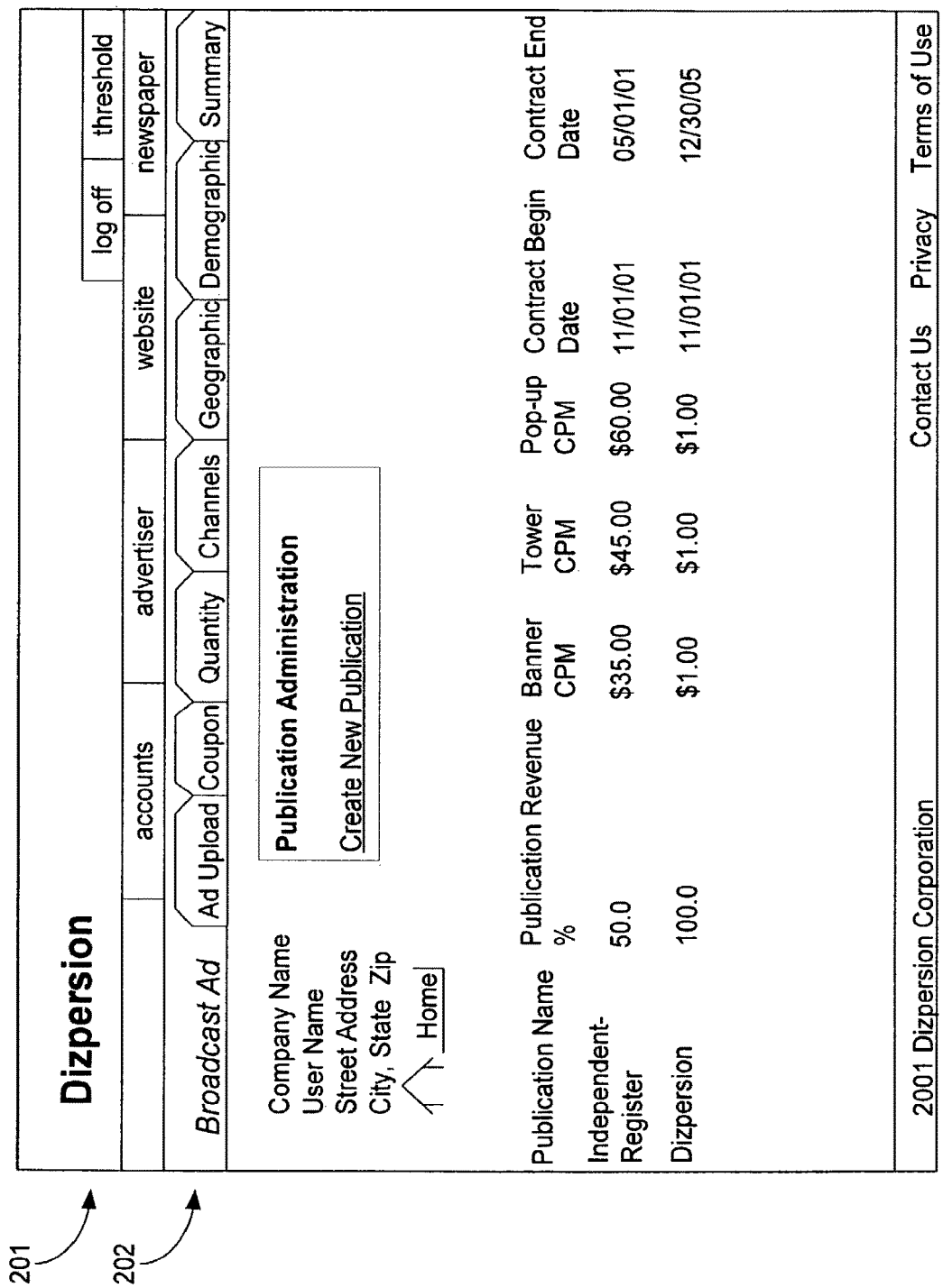
FIG. 18 illustrates one embodiment of a publication details page.

FIG. 18 illustrates one embodiment of a publication details page 320. Publication details page 320 may provide the administrator with information relating to the advertisers, publications or media companies having access to ad selection node 140. This information may include contract information such as the determined revenue split cost per thousand impressions (CPM), and beginning and end dates. Publication details page 320 may contain or link to a page for viewing further information, editing information, or inserting new information relating to publications.

Figure 19:
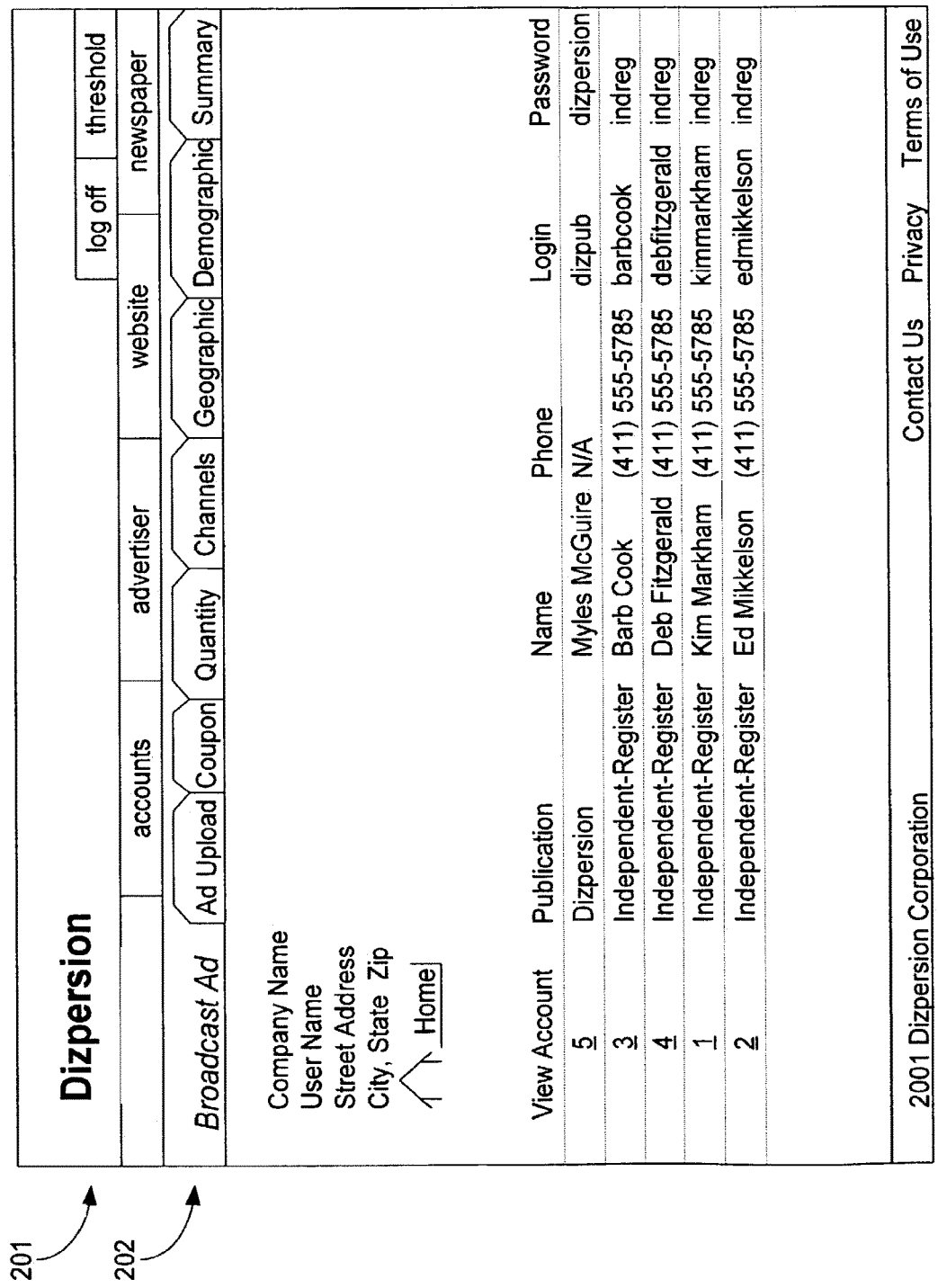
FIG. 19 illustrates one embodiment of an account details page.

FIG. 19 illustrates one embodiment of an account details page 330. Account details page 330 may provide the administrator with information relating to the advertiser users, publication users, media company users, website administrative users, or any other users who have login name and password access to view, update or edit information on ad selection node 140. The information displayed may include the affiliated company name, the user's name, user contact information, login name, password, and other information relating to the account. Account details page 330 may contain or link to a page for viewing further information, editing information, or inserting new information relating to user accounts.

Figure 20:
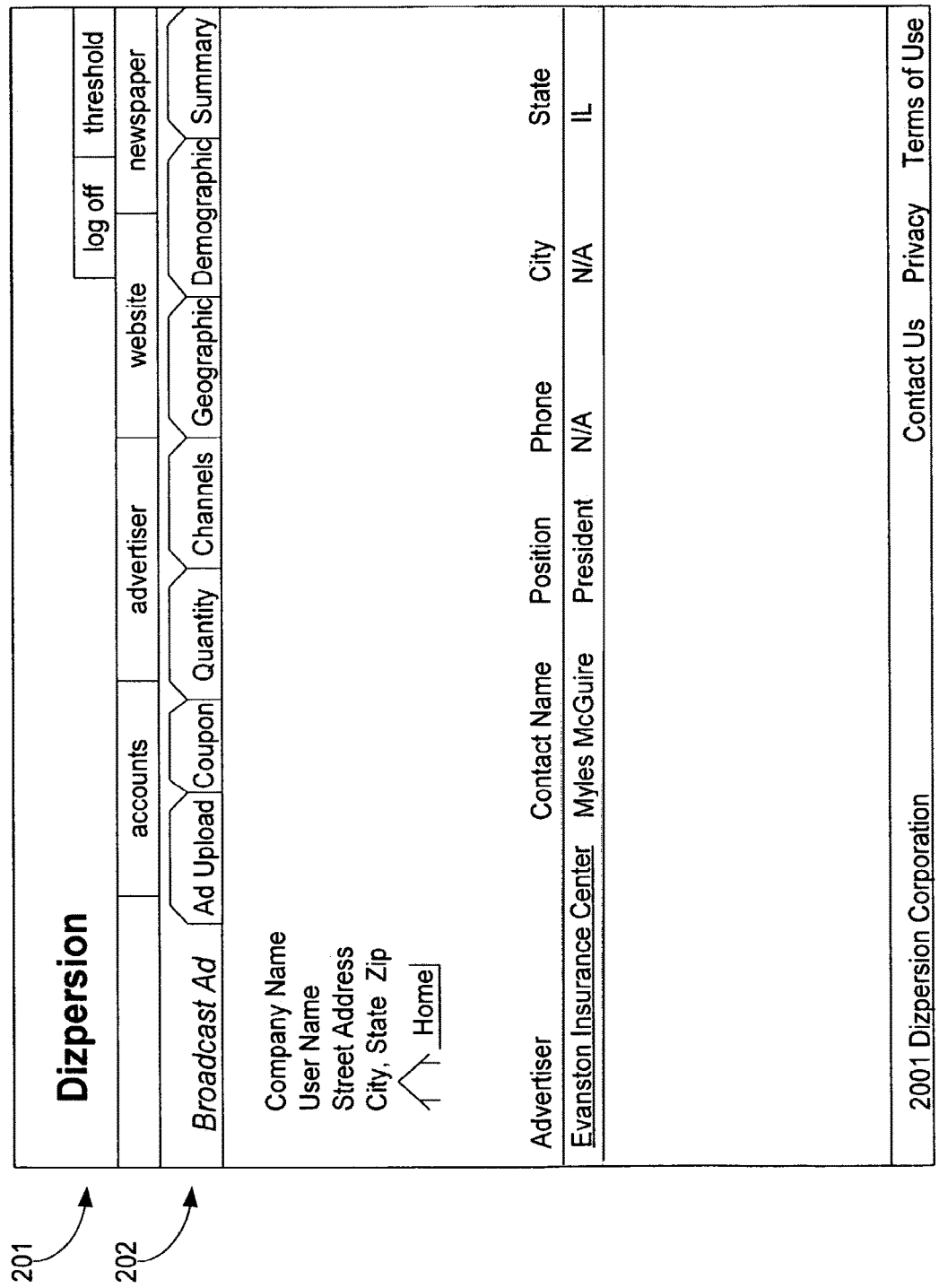
FIG. 20 illustrates one embodiment of an advertiser details page.

FIG. 20 illustrates one embodiment of an advertiser details page 340. Advertiser details page 340 may provide the administrator with information relating to the advertisers registered on ad selection node 140. Information displayed may include advertiser company name, contact information, advertising history, or other such advertiser details. Advertiser details page 340 may contain or link to a page for viewing further information, editing information, or inserting new information relating to registered advertisers.

Figure 21:
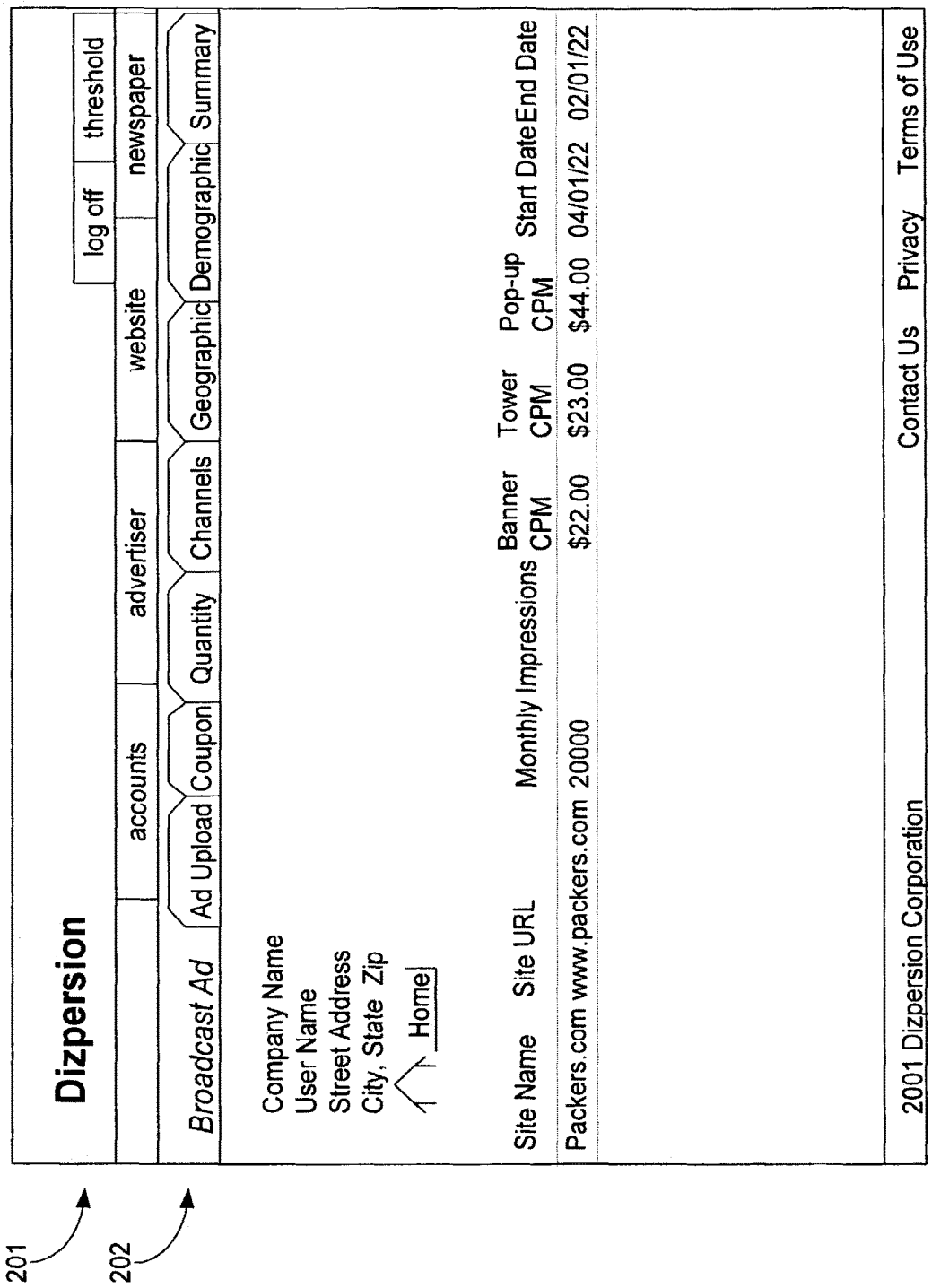
FIG. 21 illustrates one embodiment of a web site details page.

FIG. 21 illustrates one embodiment of a web site details page 350. Web site details page 350 may provide the administrator with information relating to the web sites registered on ad selection node 140. Information displayed may include company name, web site URL, monthly impressions contracted, contracted CPM prices for different ad types, and other company, impression record, or contract details. Web site details page 350 may contain or link to a page for viewing further information, editing information, or insetting information relating to registered web sites.

Figure 22:
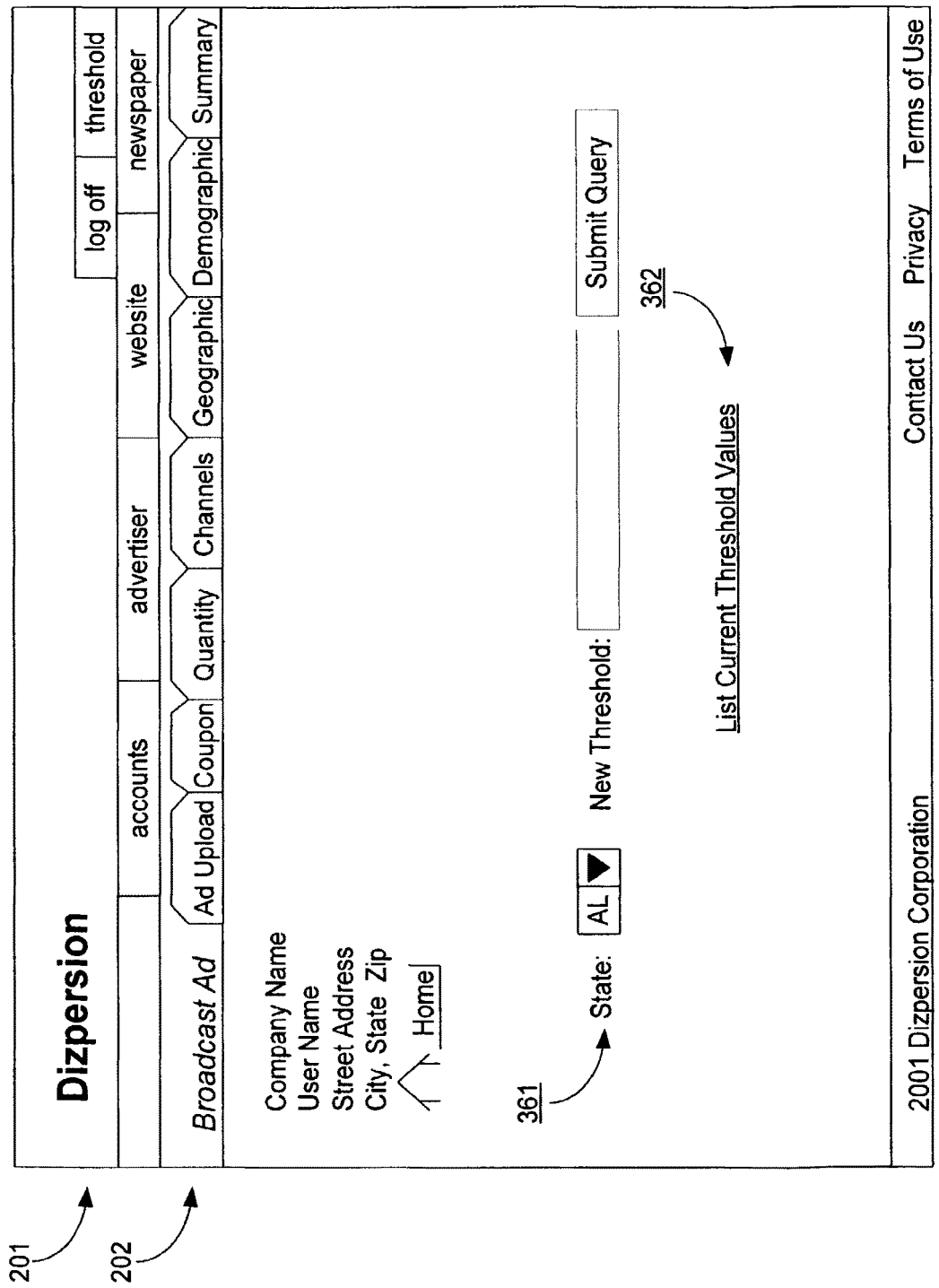
FIG. 22 illustrates one embodiment of an administrative utility page.

FIG. 22 illustrates on embodiment of an administrative utility page 360. Ad selection node 140 may contain many settings relating to its function, such as rules for its interaction with geolocation server 140. Geolocation server 140 may return confidence levels associated with the geolocations it provides, these confidence levels indicating the level of confidence geolocation server 140 has that it is providing accurate geolocation information. Different levels of confidence may be deemed acceptable, and a means of setting and editing past settings of required threshold levels of confidence may be required. Administrative utility page 360 may contain form elements 361 that may allow an administrator to set and edit the threshold levels of confidence. Link 362 may provide a page for viewing all current setting for threshold levels. Similar administrative utility pages may be employed for any of the various settings involved in the operation of ad selection node 140.

Much of the information contained in FIGS. 14-22 may be useful not only to the administrator of ad selection node 140, but also to other users. Similar pages and interfaces may be used in the design of extranets for publications, media companies, advertisers, or any other user of the system.

Figure 23:
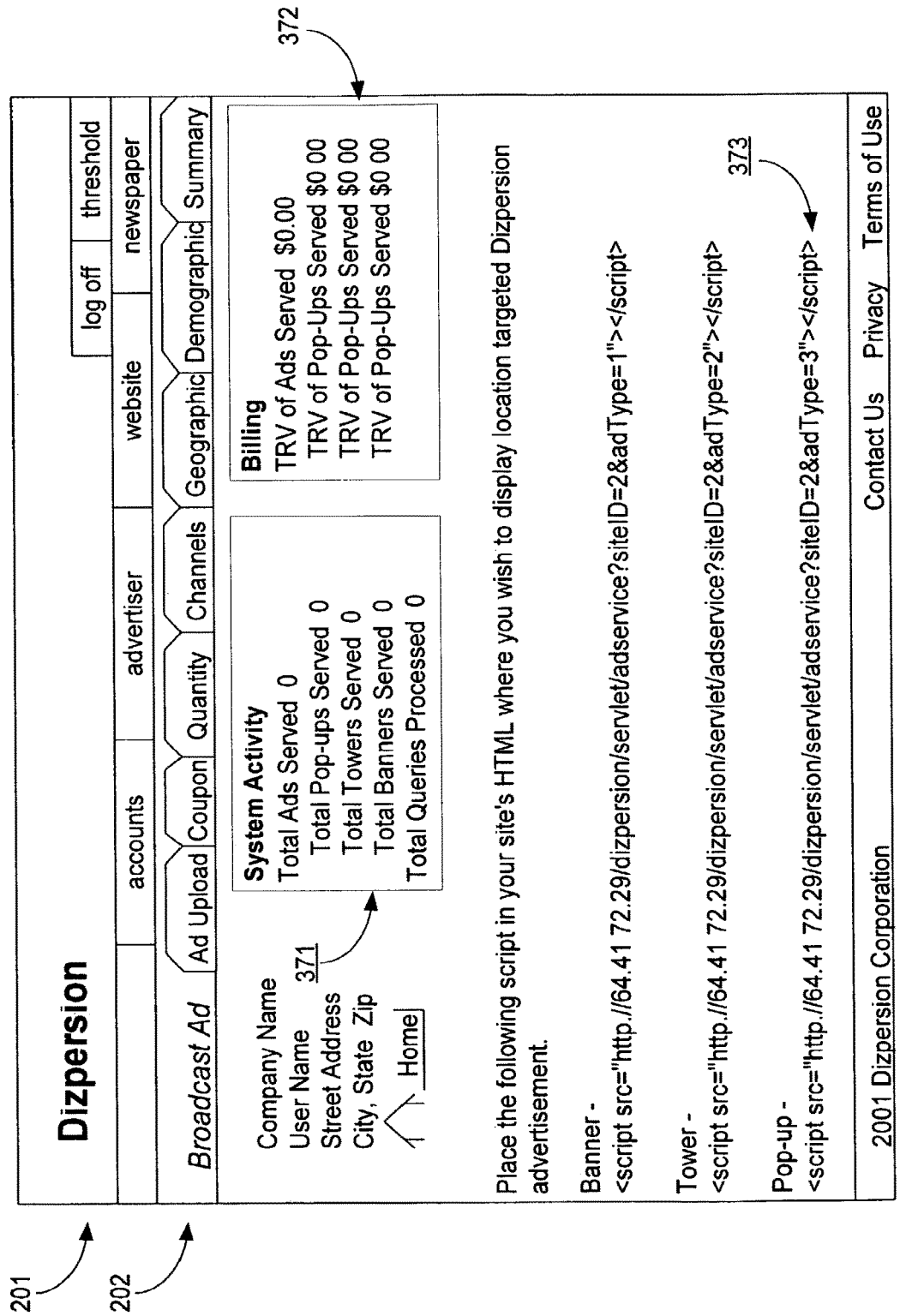
FIG. 23 illustrates one embodiment of a web site administrator's page.

FIG. 23 illustrates one embodiment of a web site administrator page 370. Web site administrator page may be designed specifically for use in an extranet provided for the consumer web sites in content provider node 130 of telecommunication system 100. Web site administrator page 370 may include system activity 371, such as total ads served or ads served broken down by ad type, or billing information 372, such as the TRV of ads served or TRV broken down by ad type. Web site administrator page 370 may also include instructions and/or insertable code 373 to demonstrate to the website administrator how to utilize ad selection node 140 on their consumer web site.

Base Advertisement Delivery Method

Figure 24:
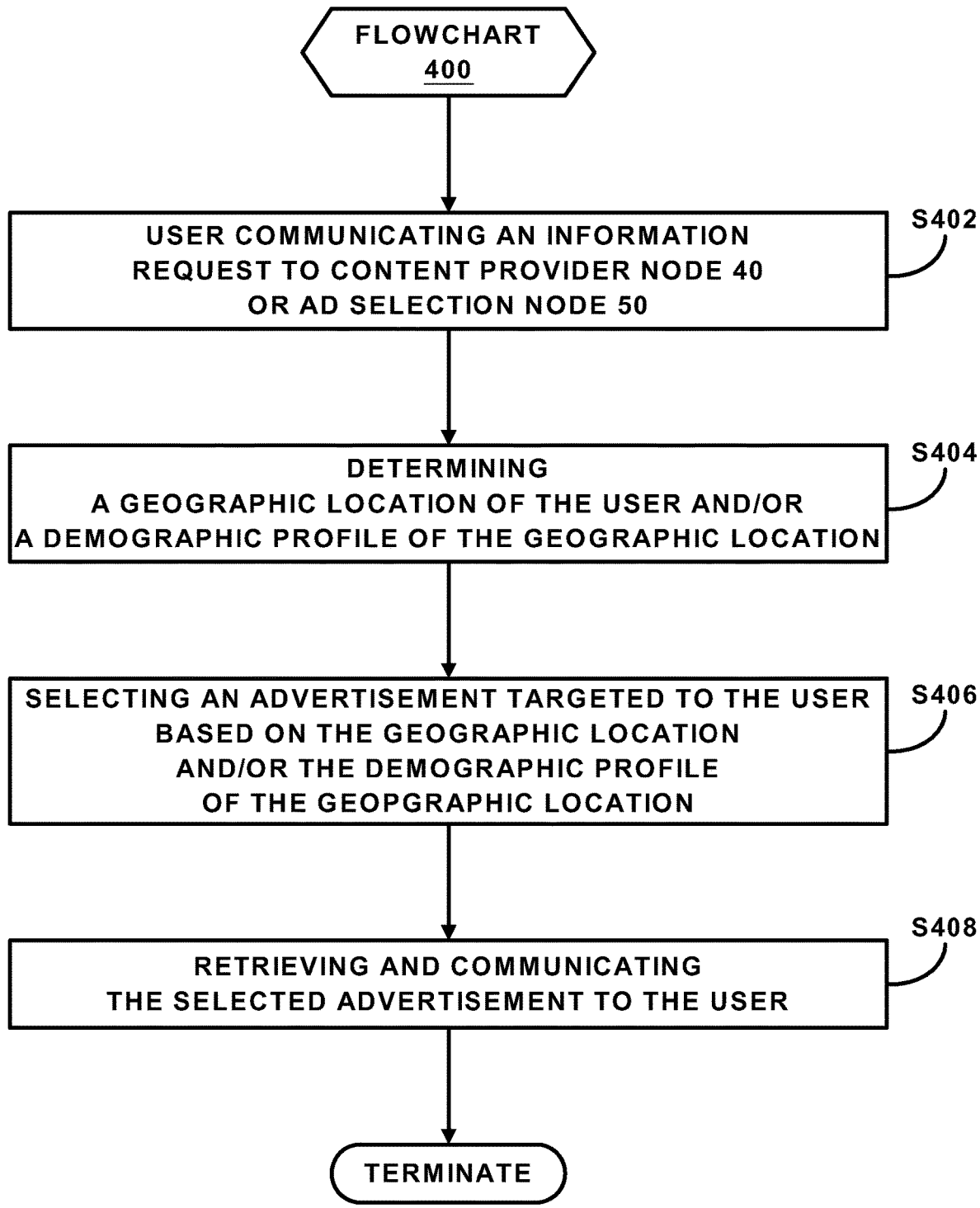
FIG. 24 illustrates a flowchart representative of a base advertisement delivery method of the present invention as implemented by the FIG. 1 telecommunication system.

FIG. 24 illustrates a flowchart 400 representative of a base advertisement delivery method of the telecommunication system 100 in accordance With the present invention. During a stage S462 of the flowchart 400, the user (FIG. 1) utilizes one of the devices, apparatuses or systems of user node 120 (FIG. 1) to conventionally communicate an infor mation request to content provider node 130 (FIG. 1) and/or to ad selection node 140 (FIG. 1). As previously stated, the information request can be in a variety of forms.

received from content provider node 130 is code that represents a request for a banner ad during a stage S414 of the flowchart 410, such as:

```
<iframe height=60 src="http://ads.dizpersion.com/adservice.aspx?sid=9&at=9" width=468
frameborder=O marginwidth=O marginheight=O hspace=O vspace=O scrolling="no"
bordercolor="#OOOOOO"><irng src="/images/default.gif '></iframe>
```

Figure 4:
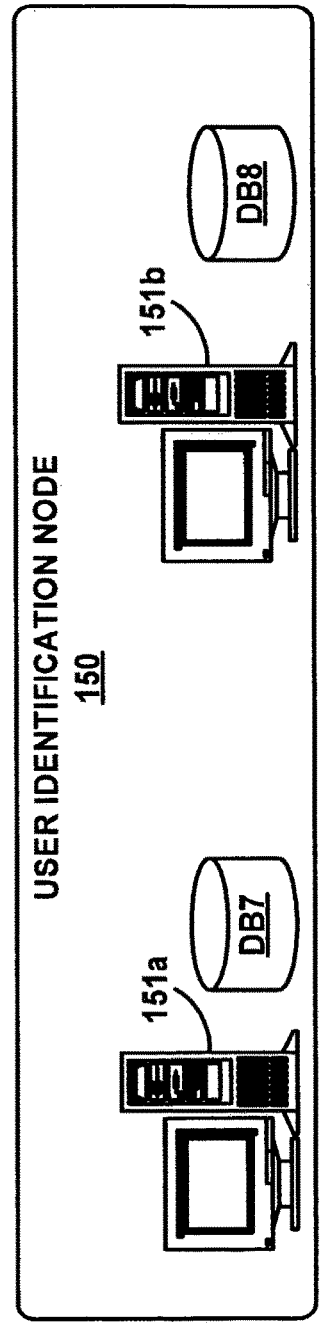
FIG. 4 illustrates a schematic diagram of one embodiment of a user identification node of the FIG. 1 telecommunication system.

Upon completion of stage S402, telecommunication system 100 proceeds to a stage S402 of the flowchart 400 where ad selection node 140 manages a determination of a geographic location of the user and/or a demographic profile of the geographic location. Data serving as a basis for such a determination can be stored within ad selection node 140 (e.g., databases DB5 and DB6) and/or in user identification node 150 (e.g., databases DB7 and DBS). In one embodiment, targeted ad server 141a (FIG. 3) conventionally communicates with database server 141b (FIG. 3), geographic location server 151a (FIG. 4) and/or demographic profile server 151b (FIG. 4) to obtain the required data.

Upon completion of stage S404, telecommunication system 100 proceeds to a stage S406 of the flowchart 400 where ad selection node 140 manages a selection of one or more advertisements targeted to the user based on the determination of the geographic location of the user and/or the demographic profile of the geographic location. Ad selection node 140 may use any number of algorithms to select what advertisement is to be communicated to user node 120.

Upon completion of stage S406, telecommunication system 100 proceeds to a stage S408 of the flowchart 400 where ad selection node 140 manages a retrieval and a communication of the targeted advertisement to the user via user node 120. The advertisement retrieval can be performed by content provider node 130 and/or the ad selection node 140. Ad selection node 140 may employ any means communicating the ad to user node 120.

One embodiment includes communicating the ad information to a java server page (JSP), an active server page (ASP), or any other such dynamically generated web page, resource, or service known in the art.

Telecommunication system 100 terminates flowchart 400 upon a completion of the stage S408. While the description of stages S402-S408 herein is based on a sequential execution of stages S402-S408, an execution of stages S402-S408 can be performed in an order including concurrent execution of two or more stages.

Embodiments of Flowchart 400

Figure 25:
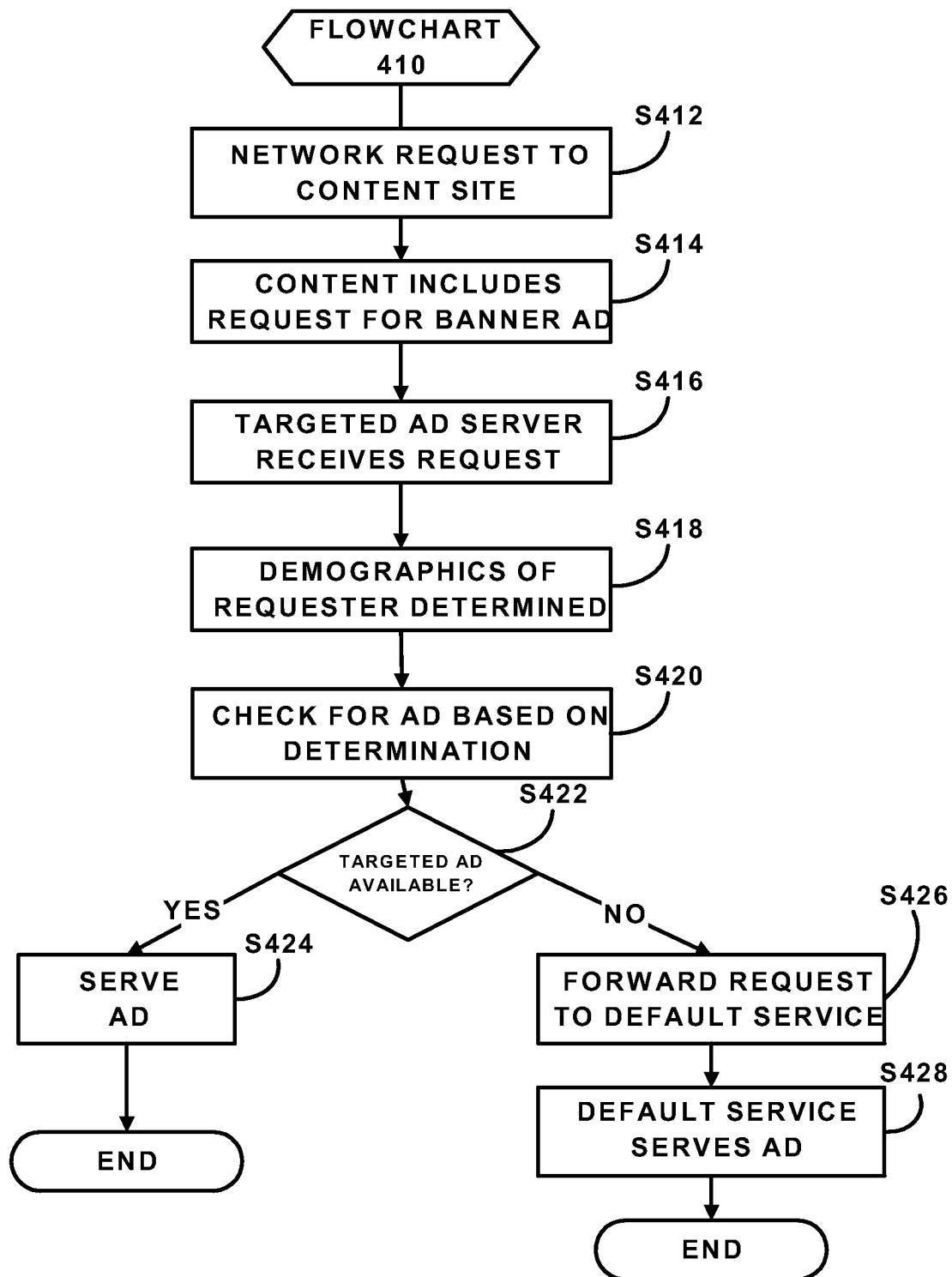
FIG. 25 illustrates a flowchart representative of a web-based advertisement delivery method of the present invention as implemented by the FIG. 1 telecommunication system.

FIG. 25 illustrates a flowchart 410 representative of a method in accordance with the present invention for serving an ad when the content is requested from content provider node 130 (FIG. 1). One example of such a process would include accessing a web page over the Internet. User accesses a website on the Internet by making a network request to content provider node 130 during a stage S412 of the flowchart 410. This may be achieved using a personal computer 123 (FIG. 1) and entering a universal resource locator (URL) in a standard browser such as Microsoft's Internet Explorer, or Netscape Navigator. In the content This code requests an ad from an ad selection node 140 found at the network address represented by http://ads.dizpersion.com. The page adservice.aspx receives the request during a stage S416 of the flowchart 410. A determination of demographic information related to user is then made during a stage S418 of the flowchart 410. More will be discussed relating to the determination of demographic information later. Based on the demographic determination, ad selection node 140 checks for an ad based on the demographic information during a stage S420 of the flowchart 410. During a stage S422 of the flowchart 400, a search of the targeted add within an inventory of ad selection node 140 is accomplished. If an appropriate targeted ad exists in the inventory for ad selection node 140, the ad may be served during a stage S424 of the flowchart 410. If an appropriate targeted ad does not exist in the inventory, ad selection node 140 may forward the request for an ad to a default service from content provider node 130 during a stage S426 of the flowchart 410. Ad selection node 140 may allow the request to pass to a default service by outputting code such as:

```
<iframe height=60 src="http://ads.tpas.net/adservice.html" width=468 frameborder=O
margimvidth=O marginheight=O hspace=O vspace=O scrolling="no"
bordercolor="#OOOOOO"><img src="/images/default.gif'></iframe>
```

Again, an iframe may be used to provide content from a different server, service, or different page on the same server. In this example code, the default ad service is a TPAS accessed via network address http://ads.tpas.net/adservice.html. Alternatively, ad selection node 140 may directly connect to the default ad source and display the content, as opposed to sending code instructing the client, or node in use by user, to connect to the source. As was discussed previously the control over which default service is selected to serve the ad, or from where the default ad Will be served, will vary based upon the embodiment of system 100 that is employed. In one embodiment, if an ad does not exist in the ad selection node 140 inventory, no ad will be served into content provider node 130. If a default service is specified, this default ad service may serve an ad during a stage S428 of the flowchart 410.

while this embodiment was described as a request for a web page, it will be apparent to one skilled in the art that similar processes may be used in the delivery of an ad sent over WAP or any other network protocols based on content requests.

An example of one possible implementation of the ad serving mechanism of ad selection node 140 and its relationship with a content provider node 130 is in the form of a consumer web site on content server 131a (FIG. 1), which can be a standard web site made up of HTML pages accessible on the Internet by web browsers such as those commercially available by Netscape, Microsoft, and Opera.

An example of the HTML surrounding and including an ad, the request for which may appear as follows:

```
<table width="490" align="center" border="O">
  <tr>
    <td>
      <center>
      <script src="http://diz.com/adservice?S=1&A=l">
      </script>
      </center><br>
    <ltd>
  </tr>
</table>
```

The ad request to ad selection node 140 begins and ends in the standard HTML "script tag." All other HTML may be presentational material of consumer web site.

One embodiment may include passing values With the ad request for an ad identifying the consumer web site, as demonstrated above in the HTML get method included in the portion of the uniform resource locator (URL), "S=1". This may indicate that the request for an ad originates from a content provider node 130 that has been assigned an identification number of "1" by database server 141*b*, or some other portion of the ad selection node 140. In FIG. 1, various servers 131 of content provider node 130 may be assigned different identification numbers, or non-numerical identifiers. Alternatively, various pages or sections of content of servers 131 may be assigned different identification numbers, or non-numerical identifiers, or even multiple identifiers. Using the HTML get method and identifiers is just one example of how information may be passed with the ad request and should not be viewed as limiting. Any means known in the art may be employed to pass such information.

The content served by ad selection node 140 may be in the form of a portion of or a complete hypertext markup language (HTML) web page, a portion of or a complete web page containing dynamic content as might be provided by a technology such as Flash, an advertising tag or banner for a networked service such as instant messaging, a portion of or a complete short messaging service (SMS) advertising message, a portion of or a complete wireless application protocol (WAP) site or service, or any other form of advertising on a consumer networked site or service known in the art.

Another example involves a distribution of targeted ads when the user selects to receive broadcast information from content provider node 130. One example of such a process would include receiving audio content and an audio ad, sent over satellite radio, broadcast into a mobile vehicle. In one embodiment, a multiplexing scheme may be employed to send multiple different signals representing advertisements over the same radio channel. One such multiplexing scheme might include TDMA. Using this scheme a variety of time slots may be specified, each intended for a specific demographic. If a targeted ad exists for one of the demographic slots, ad selection node 140 may send it on that slot. If no targeted ad exists, ad selection node 140 may pass on serving into that slot, allowing a general or default ad to be sent. User at some point times in to the broadcast channel on which this system 100 is running. The broadcast includes a segment in which an advertisement will be played, and the broadcast signal may indicate that an ad is to be served. Alternatively, and potentially based upon the multiplexing scheme employed, the radio receiver used by user may automatically determine that an ad is being served without it being specifically indicated in the broadcast signal. The radio receiver, or a device available to the radio receiver then determines the current demographics associated with the network node it represents. This demographic determination might include information about user taken at the time of subscription to the satellite radio service that is stored or programmed into the receiver or associated device. Also, the receiver or associated device may include global positioning system (GPS) capability, and a determination of current location may be used in part or solely in the demographic determination. Based on the demographic determination, the radio receiver or associated device can select the appropriate signal out of the multiplexed signal, decoding a particular ad signal. The user may then receive the decoded ad signal as an ad.

While this embodiment was described as a satellite radio broadcast, it will be apparent to one skilled in the art that similar processes may be used in the delivery of an ad sent over digital television, or any other network broadcast.

Figure 5:
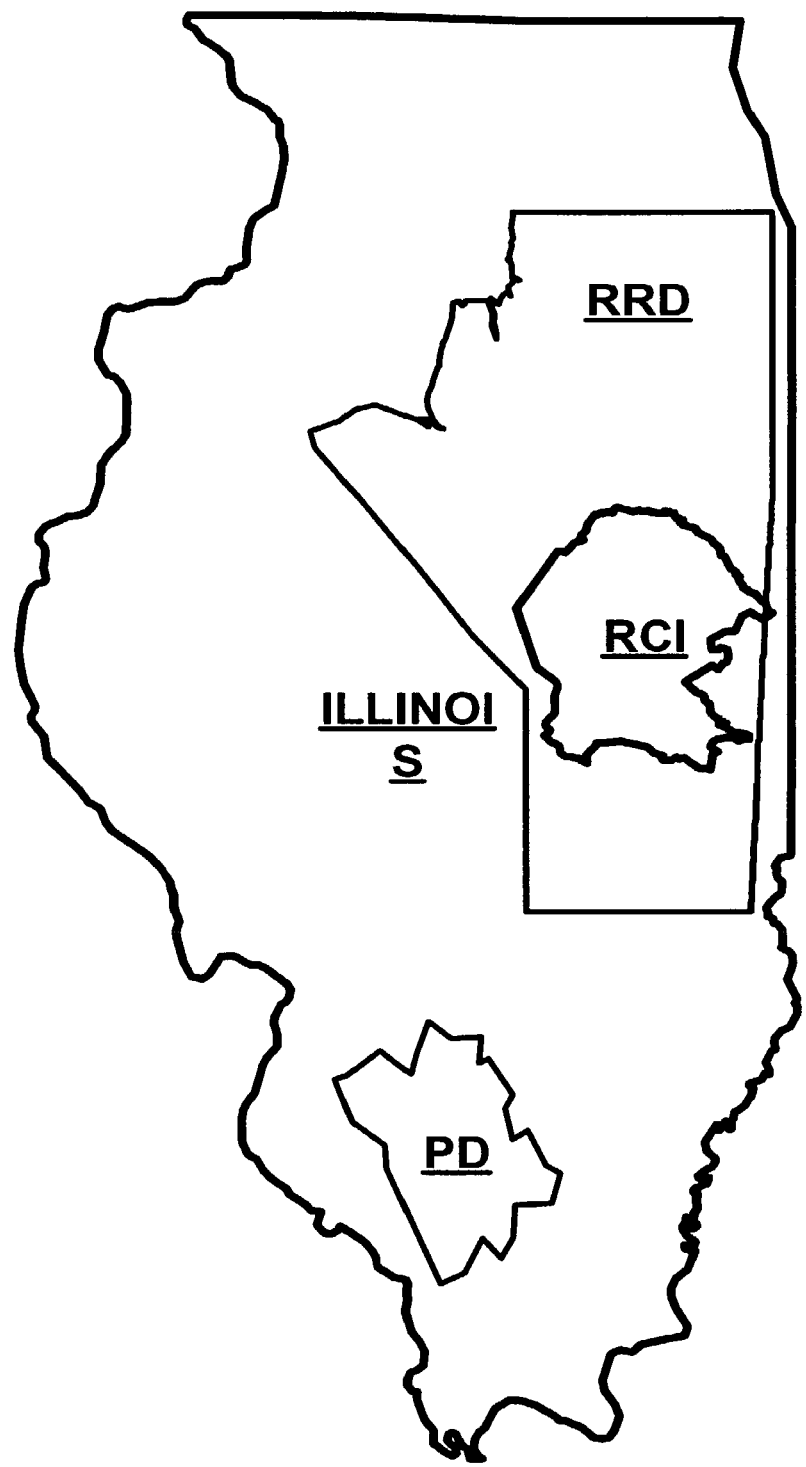
FIG. 5 illustrates fictitious advertising regions within the state of Illinois.
Figure 26:
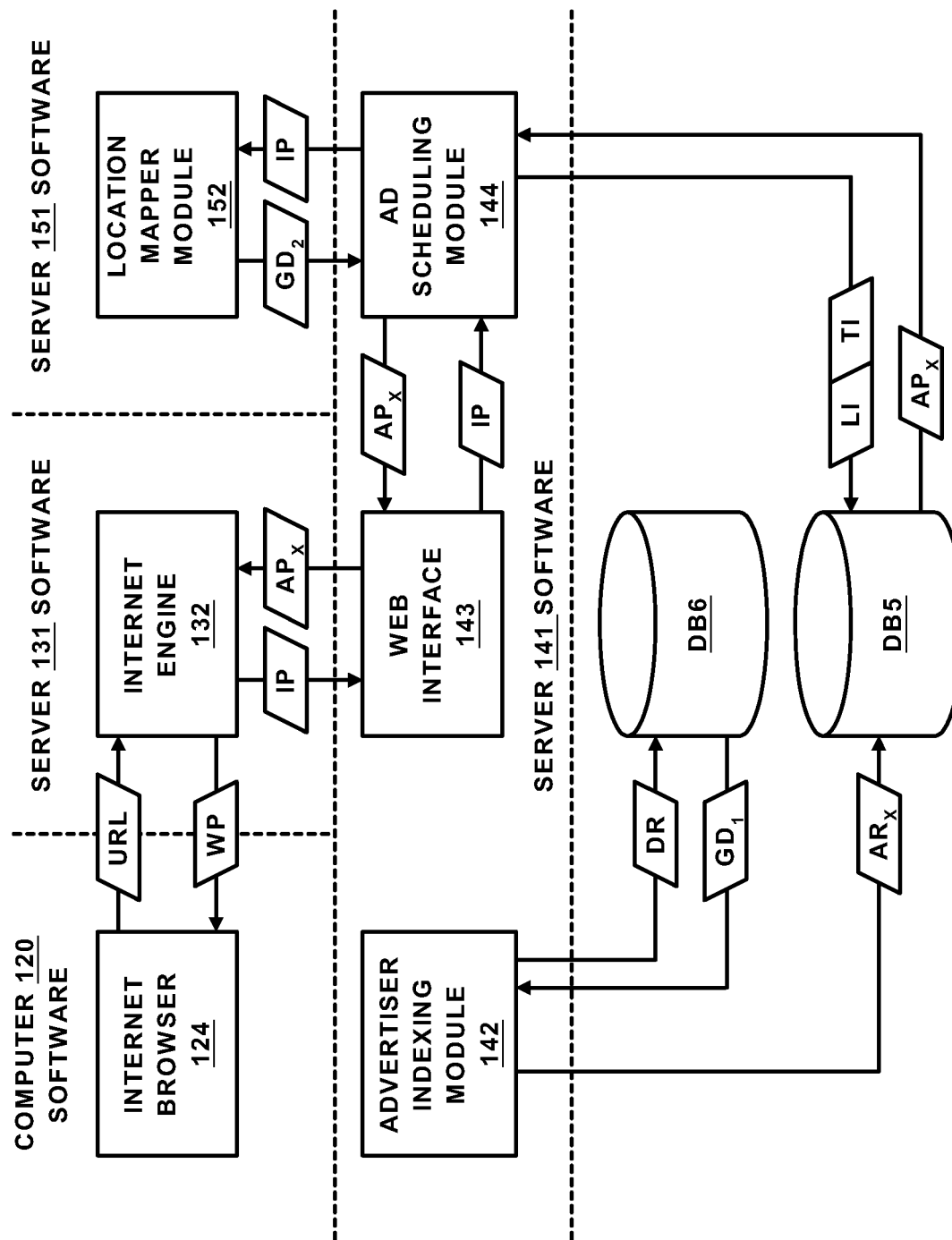
FIG. 26 is a block diagram of one embodiment in accordance with the present invention of computer software employed in the FIG. 1 telecommunication system.
Figure 27:
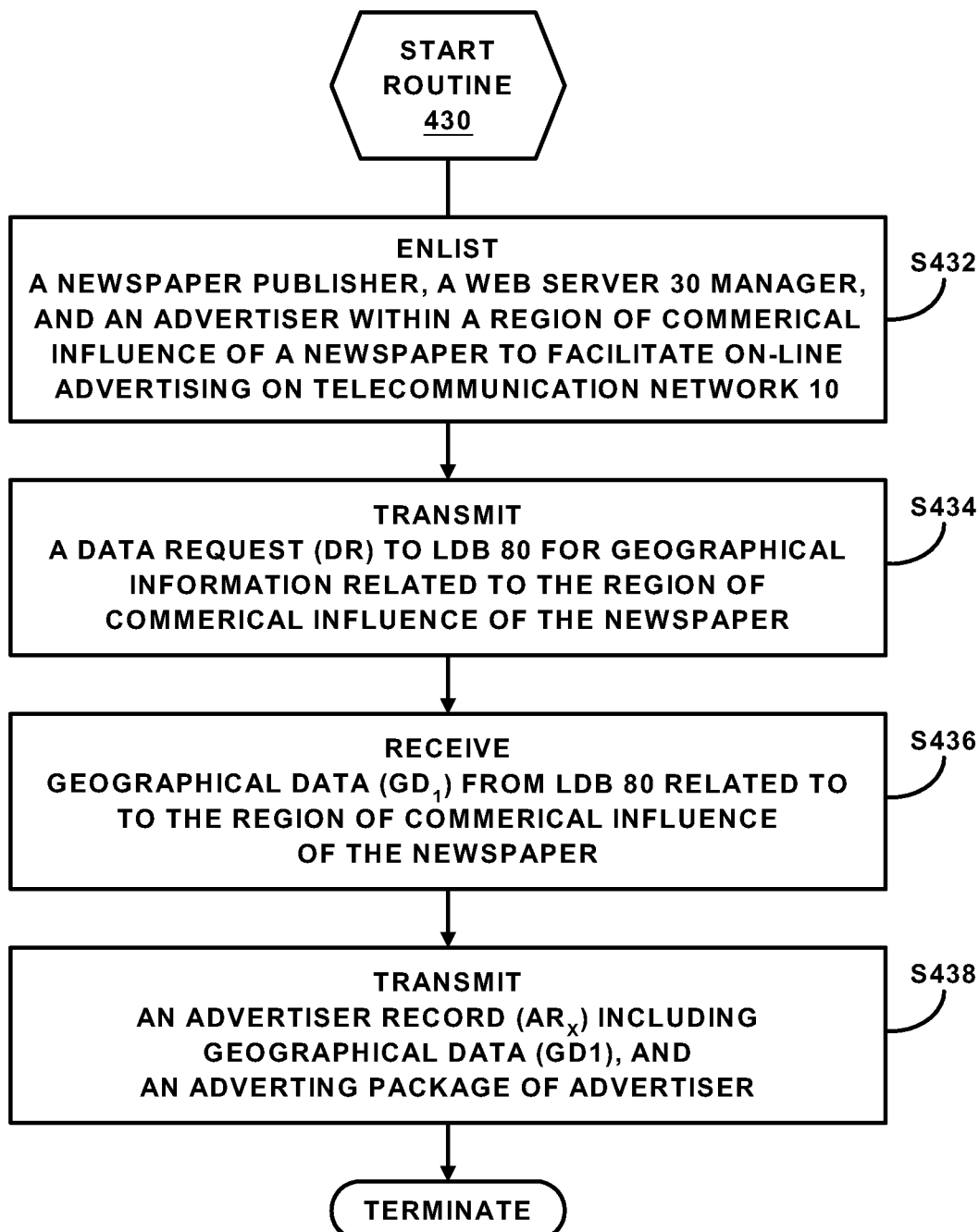
FIG. 27 illustrates a flow chart of a first embodiment of an advertiser indexing routine in accordance with the present invention.

FIG. 26 illustrates computer software employed in the telecommunication system 430 of FIG. 1. An advertiser indexing module 142 is a unique software package of server 141 for implementing several stages of an advertiser indexing routine 430 as shown in FIG. 27. During a stage S432 of routine 430, a newspaper publisher of a newspaper having a region of commercial influence (e.g., region RCI in FIG. 5), a manager of web server 131, and ad advertiser of the newspaper are enlisted to facilitate an on-line advertising of one or more advertisements of the advertiser on telecommunication system 100. In one embodiment of stage S432, the newspaper publisher contacts each advertiser of the newspaper to ascertain any interest in advertising on web pages of content providers of telecommunication system 100 such as web site server 20.

During a stage S434 of routine 430, module 142 transmits a data request DR to DB6 seeking geographical information related to the region of commercial influence of the newspaper. In one embodiment of stage S434, the data request DR specifically seeks all zip codes within the region of commercial influence of the newspaper. During a stage S436 of routine 430, module 142 receives geographical data GD from DB6 that is related to the region of commercial influence of the newspaper. In one embodiment of stage S434, the geographical data GD1 includes all zip codes within the region of commercial influence of the newspaper.

During a stage S438 of routine 430, module 142 transmits an advertiser record ARx to DB6 that includes geographical data GD i and an advertising package of the advertiser to be displayed in telecommunication system 430. In one embodiment of stage S438, advertiser record ARx further includes a unique identifier for the advertiser, a pointer to the appropriate advertising package, the date and time of the last impression, the number of impressions made in this timeframe, the minimum number of impressions that should be made in each recognized timeframe, and the maximum number of impressions that may be made in each recognized timeframe. Module 142 terminates routine 430 upon completion of stage S438. Those having ordinary skill in the art will appreciate the efficiency, convenience, and cost benefits of routine 430 to newspapers, web site servers such as server 131, and advertisers involved with the display of ads on telecommunication system 430.

Figure 28:
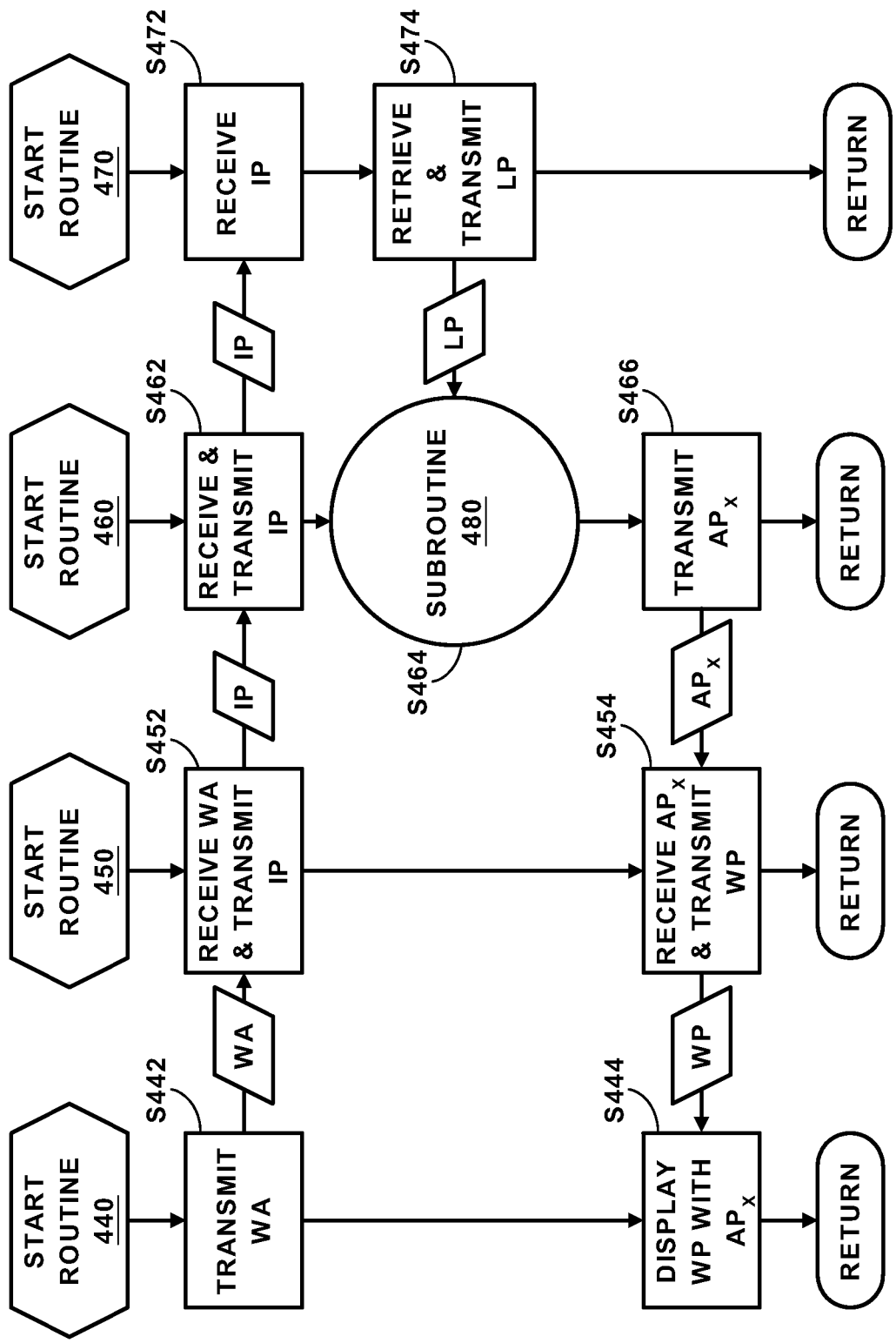
FIG. 28 illustrates various flow charts of a first embodiment in accordance with the present invention for displaying advertisements within the FIG. 1 telecommunication system.

Referring again to FIG. 26, an Internet browser 124 is a conventional software package of workstation 123 for implementing a routine 440 (FIG. 28) that enables consumer to provide a web address in the form of a Uniform Resource Locator (URL) corresponding to Website server 131 during a stage S442 of routine 440 whereby the consumer can download information over a web page WP from website server 131 running a stage S444 of routine 440. An Internet engine 132 is a conventional software package of website server 131 for implementing a routine 450 (FIG. 28) that provides a user signal in the form of an Internet Protocol address IP to server 141 in response to a reception of Uniform Resource Locator (URL) during a stage S122 of routine 120 whereby web site server 131 can transmit a web page WP having an advertisement package APx therein during a stage S124 of routine 120.

A web interface 143 and ad scheduling module 144 may be unique software packages of server 141 for implementing a routine 460 (FIG. 28) that provides the Internet Protocol address IP to server 151 in response to a reception of the Internet Protocol address IP during a stage S462 of routine 460 whereby module 144 can transmits advertising package APx in digitized form including images, animations, videos, text, software, and/or sounds during a stage S466 of routine 4S0. Location mapper module 1S2 is a conventional software package such as that provided by Quova, Inc., for implementing a routine 470 (FIG. 28) that maps Internet Protocol address IP to corresponding geographical information to thereby return geographical data GD2 including a description of a presumed geographical location of personal computer 123 during a stage S474 of routine 470 in response to a reception of Internet Protocol address IP during a stage S472 of routine 470. In one embodiment of module 1S2, geographical data GD2 includes information related to the presumed geographical location of personal computer 123 such as the continent, the time zone, the U.S. state (if appropriate), the city, the latitude, the longitude, the U.S. zip code (if appropriate), the Designated Market Area (DMA), the Metropolitan Statistical Area (MSA), and the Primaly Metropolitan Statistical Area (PSMA).

Figure 29:
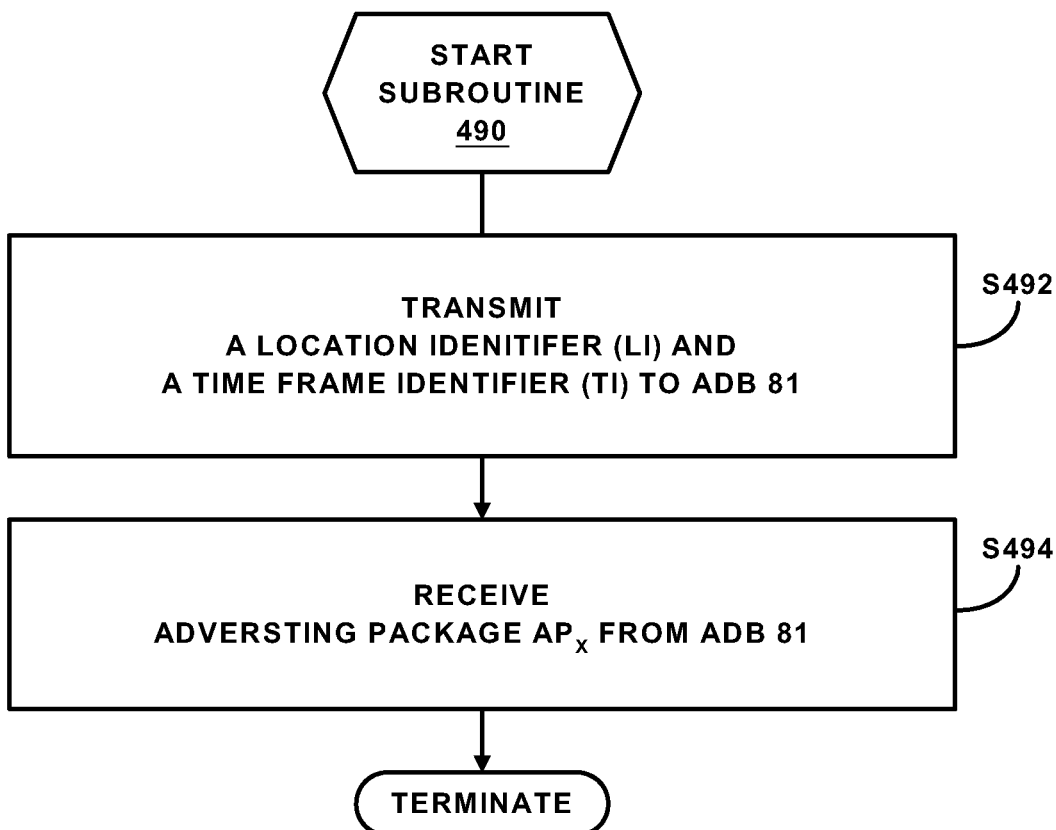
FIG. 29 illustrates a flow chart of a first embodiment of advertisement selection routine in accordance with the present invention.

Module 144 implements a subroutine 480 during a stage S464 of routine 470 in response to a reception of the geographical data GD2 from server 1S1 to identify and retrieve advertising package APx from DB6. One embodiment of subroutine 480 is shown as subroutine 490 in FIG. 29. During a stage S492 of subroutine 160, module 144 transmits a location identifier LI and a timeframe identifier TI to DB6. In one embodiment of stage S492, location identifier LI identifies all zip codes contained within geographical data GD2 as received by module 144. Additionally, timeframe identifier TI identifies the timeframe (e.g., a day and an hour) upon which interface 143 and module 144 received Internet Protocol address AP from server 131.

During a stage S494 of subroutine 490, module 144 receives advertising package APx from DBS. In one embodiment of stage S494, one or more advertiser records corresponding to identifier LI and timeframe identifier TI are listed within DBS with a marking indicating the date and time of the last impression. As a result, advertising package APx is retrieved from an advertising record that is marked as the next record to be displayed. Module 144 terminates subroutine 490 upon completion of stage 164. Those having ordinary skill in the art will appreciate the efficiency, convenience, and cost benefits of routine 440, routine 4S 0, routine 460, and routine 470 to consumers, newspapers, web site servers such as server 131, and advertisers involved with the display of ads on telecommunication system 100.

In one embodiment, content provider node 130 may continue to serve advertisements of their choosing if ad selection node 140 cannot ascertain the location of the end user node 120 or if ad selection node 140 does not contain an advertisement for the location of the end user node 120. In one embodiment, the default advertisement, that which is chosen by content provider node 130, will be served automatically by ad selection node 140. In one embodiment, ad selection node 140 may select a non-location based advertisement in the event that ad selection node 140 cannot ascertain the location of the end user node, or if ad selection node 140 does not contain an advertisement for the location of the end user node. In one embodiment, no advertisement may be served in the event that ad selection node 140 cannot ascertain the location of the end user node, or if ad selection node 140 does not contain an advertisement for the location of the end user node.

In one embodiment, multiple advertisements may be available in ad selection node 140 for a web site and location combination. In one embodiment, all available advertisements for a web site and location combination may be served in a round robin manner. In one embodiment, the round robin will be over all impressions entering the system. In one embodiment, the round robin may be over only impressions served to an individual end user node. In one embodiment, statistical weights, or numbers associated with a greater or smaller statistical likelihood that an advertisement will be served, may be assigned to each advertisement. When multiple advertisements are available for a web site and location combination, the statistical weights of all available advertisements may be used in conjunction with a random number generator to choose which advertisement may be served. In one embodiment, advertisements sold by a primary may be given a higher statistical weight than that of a secondary. In one embodiment, advertisements sold by a primary may be given a higher statistical weight when being served inside of that primary's area of commercial influence. In one embodiment, advertisements that are to be served within a defined time frame may be given heavy statistical weight to provide greater probability that the advertisement will be served during the defined time even if other advertisements are available. In one embodiment, an advertisement may be given different statistical weights on different web sites or web site categories. In one embodiment combinations of defined time and primary status may be given higher statistical weight than one without primary status. Many algorithms and statistical weight assignments may be employed to give priority to preferred advertisements, be that preferment based on advertiser, broker of the advertisement sale, location, time sensitivity, or any combination of these or other factors.

For example, ad selection node 140 may hold the following advertisements: an advertisement AO, sold on a total number of impressions basis, to be served anywhere; an advertisement A1 sold by a secondary, sold on a total number of impressions basis, to be served in Chicago, Ill.; an advertisement A2, sold by a primary, sold on a total number of impressions basis, to be served in Chicago, Ill.; an advertisement A3 sold by a secondary, sold on a total number of impressions basis, to be served in zip code 60614 only; an advertisement A4 sold by a primary, sold into a particular time block, to be served in Chicago, Ill.; and an advertisement AS sold by a primary, sold into a particular time block, to be served in zip code 60614 only. When a user node hits the system from zip code 60614 any of the above listed ads may be served. The statistical weighting may be handled in the following manner. AO may be assigned a weight of 1, as it is at a global level and sold by a secondary. A1 may be assigned the higher weight of 3, as it is sold at the city level, which is a more precise location than required by AO. A2 may be assigned a weight of 6, as it is both at the city level and sold by a primary as opposed to a secondary. In this example, advertisements sold by a primary may receive a multiplier of 2 over the weight they would receive as sold by a secondary. A3 may be assigned a weight of S, accounting for greater precision than A1, but lower than A2 as it was not sold by a primary. A4 may be assigned a weight of 600, as it must be served only within a particular time frame it must be heavily weighted. In this example, time sensitive advertisements may receive a multiplier of 100 over the weight they would receive if sold on a number of impressions basis. AS may be assigned a weight of 28 0 as it is both time sensitive and requires a high level of location precision. All of these weights may be added together (1+3+6+S+600+2SO) to create the total statistical pool, or the size of the advertisement lottery so to speak. The total size in this case is 161S. On a statistical basis this means that over time AS may be served 2S0 out of every 161S times, or almost 62% of the time. A4 may be served 600 out of every 1618 times, or approximately 37% of the time. And so on for the other advertisements. All of this statistical weighting may be based on a defined set of adjustable business rules and may be automatically and dynamically assigned before or during the ad serving process.

In another embodiment, the statistical weighting may take into account the price paid for the advertisements. For example, an advertisement that was purchased at a $S CPM would not be as likely to be served as one purchased at $10 CPM. In another embodiment, the pricing for the individual advertisement may be calculated based solely or in part on the statistical weighting associated with it. For example, an advertisement that is only able to be served into a single zip code and only during a one hour period on a single site would cost significantly more than an advertisement that could be broadcast anywhere in an entire state, or over a period of weeks.

The concept of preferential serving into geographic locations was discussed previously. Another embodiment of the invention allows for preferential serving to any of the other definable characteristics of an advertisement. A company might be given preferential placement on an individual site or category of sites, such as the Green Bay Packers website, www.packers.com. In another embodiment, a company might be given preferential placement based on a time, such as ESPN requesting late night preferential placement of a Sports Center advertisement. In another embodiment, a company might be given preferential placement based on one or more demographics, such as the NAACP may be given preferential placement in geographic locations with higher concentrations of African Americans. Combinations of these factors may also describe a preferential placement, such as Comedy Central requesting preferential placement on the Green Bay Packers and other NFL websites, during the hours preceding and during the Super Bowl to advertise an alternative halftime show on their channel. Preferential placement arrangements may be handled on an individual ad basis using some statistical method, such as the ones described above. Preferential placement arrangements may be also granted on a larger scale for advertisers, in a manner similar to primary area classifications, such as those described above.

As has been previously noted, there are a variety of business relationship and network configuration possibilities in terms of the implementation of ad selection node 140. Several embodiments have been described in which the code requesting an ad from ad selection node 140 is hardcoded into the pages on content provider node 130. Ad selection node 140, regardless of whether an ad is in inventory, must handle the request. In another embodiment, some determination as to the availability of a targeted ad may be made prior to the request being passed to ad selection node 140.

For example, an XML service may be enabled that allows code on content provider node 130 to check the availability of an ad at ad selection node 140 for a received request. This may be achieved by making a direct request for this information with each ad request received at content provider node 130. Alternatively, some or all of the information relating to the availability of ads may be stored locally at content provider node 130. This information may be stored in memory, held on disk in a variety of formats, stored in a local database table, or any other method as would occur to one of ordinary skill in the art. This information may also be cached in memory on ad selection node 140 to speed retrieval. This information may be updated based on either a time period passing, a number of impressions occurring, a rate at which impressions are occurring, a combination of these, or none of these.

In one embodiment, data transfers, such as with XML and perhaps using SOAP or another protocol, may be employed to transfer information regarding demographics, advertisements, and the availability of advertisements between the TPAS, targeted ad server and content site nodes. Exemplary data transfer models would enable previously described portions of the business logic to be pushed to these various nodes. Hardware, software and platform specific packages may be designed such that it is unnecessary to pass each request to the primary targeted ad serving node. In one embodiment, a client application package on a content site could access a data package representing the availability of geographically and/or demographically targeted ads for a partial or complete set of the possible geographic and demographic combinations. This data package may represent those ads available only for that particular content site, limiting the size of the data package that must be transferred and held by the client application package on the content site. In one embodiment, the targeted advertisements, or references to the targeted advertisements may be additionally stored on the client application package. In one embodiment, the client application package may be installed on the content site's servers. In an alternative embodiment, targeted ad server may supply the content site with a package to be run on a separate server local or at least dedicated to that content site. The separate server may be owned and operated by either the targeted ad server, the content site, or managed in conjunction.

In the embodiment that enables such data transfers, a pull and push system for information updates may be defined by an API, and implemented using any variety of business rules. In one embodiment, a data push and/or pull of the availability of advertisements, and possibly a record of impressions received by the content site, are performed in a time-scheduled manner. In an alternative embodiment, the push and/or pull may be performed based on a threshold number of advertisement impressions served by the content site. The advantage achieved by pushing information relating to the availability of ads for a particular content site, geographic, and demographic closer to the content site is that it allows targeted ad server to handle requests that result in a higher percentage of targeted advertisements served.

Further, ad selection node 140 is capable of passing other information to and from other nodes of telecommunication system 110. For example, information regarding ad impressions, click-throughs, printing of coupons, or other details related to serving of ads may be passed immediately or asynchronously to any other nodes.

Right of First Refusal

Figure 31:
FIGS. 31-36 illustrate a variety of the business arrangements between servers of the ad selection node and the content provider node of the FIG. 1 telecommunication system.

FIGS. 31-35 illustrates a variety of the business arrangements and combinations of services that may be involved in the function of targeted ad server 141a (FIG. 3), content server 131a (FIG. 2) and third party ad server ("TASP") 131b (FIG. 2). For example, FIG. 31 illustrates an embodiment in which targeted ad server 141a may Own or operate some form of content server 131a. In such an embodiment, the content, and all ad serving is handled through the targeted ad server.

Figure 32:
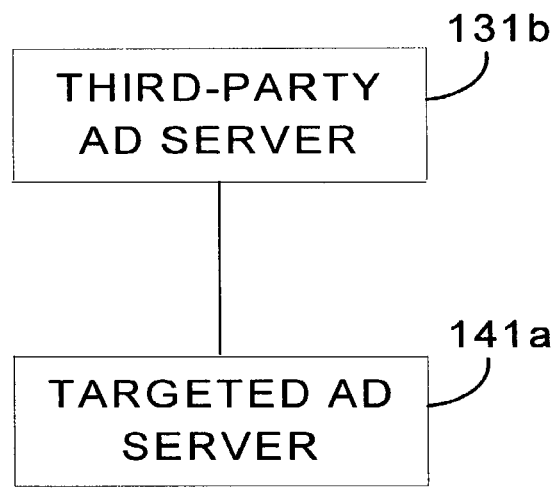

In another embodiment as illustrated in FIG. 32, targeted ad server 141a may again own or operate some form of content server 131a, but in this embodiment a relationship exists with TPAS 131b. The content site owned or operated by targeted ad server 141a may pass a request for an ad to the portion of targeted ad server 141a that determines whether a targeted ad exists in its inventory for the given network request. The determination process to be discussed in greater detail later. Based on the determination, targeted ad server 141a may serve an ad from its inventory or pass the request on to TPAS 131b.

Figure 33:
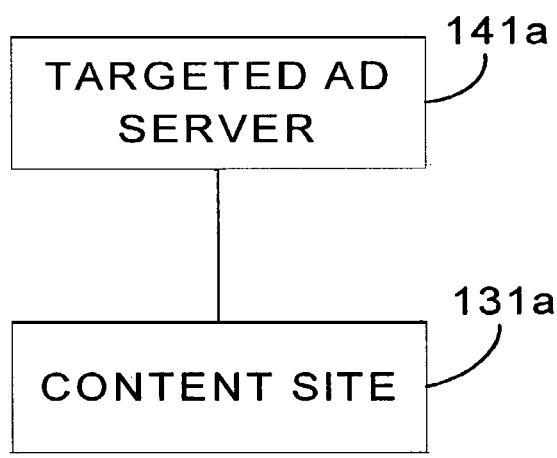

FIG. 33 illustrates a first embodiment that includes a separate content server 131a. This embodiment is essentially similar to FIG. 31, but the content server 131a is not owned or operated by targeted ad server 141a.

Figure 34:
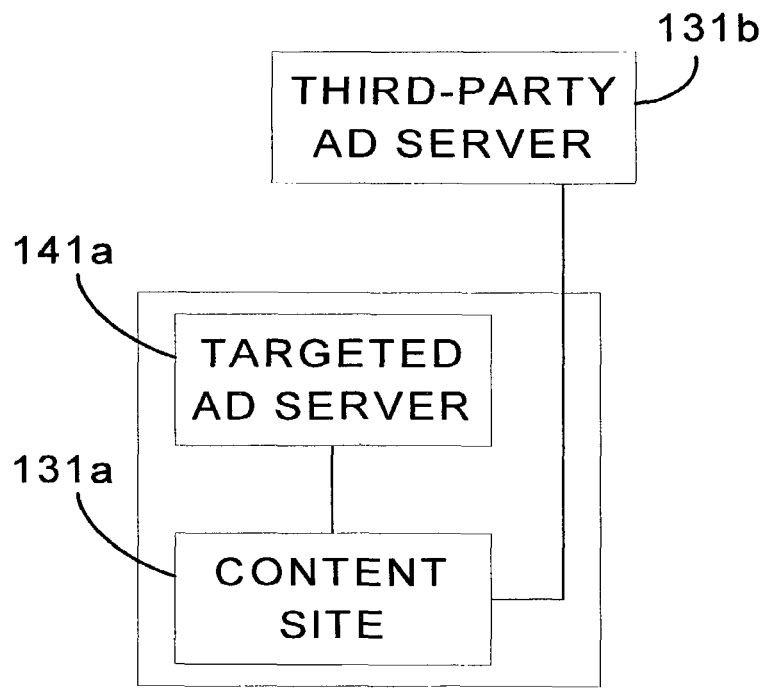

FIG. 34 illustrates an embodiment in which content server 131a has a relationship with targeted ad server 141a and TPAS 131b. In this embodiment, the content server 131a might be a web site including at least one web page that includes code requesting an advertisement from targeted ad server 141a. Every request for an ad may be passed to targeted ad server 141a, or the requests may be on some periodic, rotational, or statistically calculated basis. Upon receiving the request, targeted ad server 141a determines whether a targeted ad exists in its inventory for the given network request. Based on this determination, targeted ad server 141a may serve an ad from its inventory or pass the request on to a page hosted on content server 131a defining a default ad to serve, or passing the request directly to TPAS 131b as specified by content server 131a.

Figure 35:
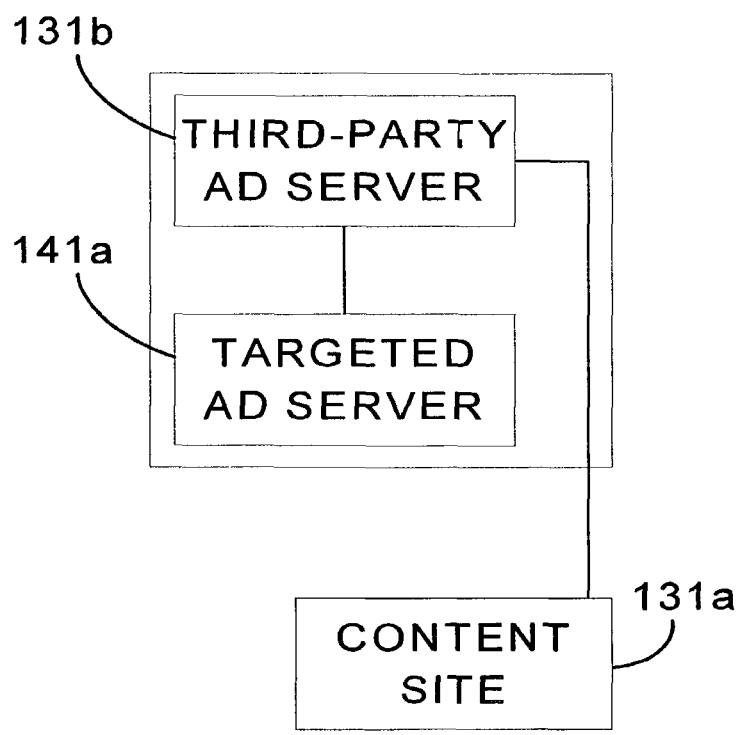

FIG. 35 illustrates another embodiment, this time wherein TPAS 131b and targeted ad server 141a have a relationship. In this embodiment, content server 131a may be unaware of the existence of targeted ad server 141a. Its relationship may be with TPAS 131b. Content server 131a requests an ad from TPAS 131b. The request to TPAS 131b may actually in effect be a request to targeted ad server 115. This might be achieved by masking the direct request to the targeted ad server by using a domain name of TPAS 131b pointing to a server running targeted ad server 141a. Alternatively, TPAS 131b may receive the ad request, call targeted ad server 141a, and serve an ad from one of the two servers based on the availability of a targeted ad. Again, every request may be passed to targeted ad server 141a, or they may be passed on some periodic, rotational, or statistically calculated basis.

Figure 36:
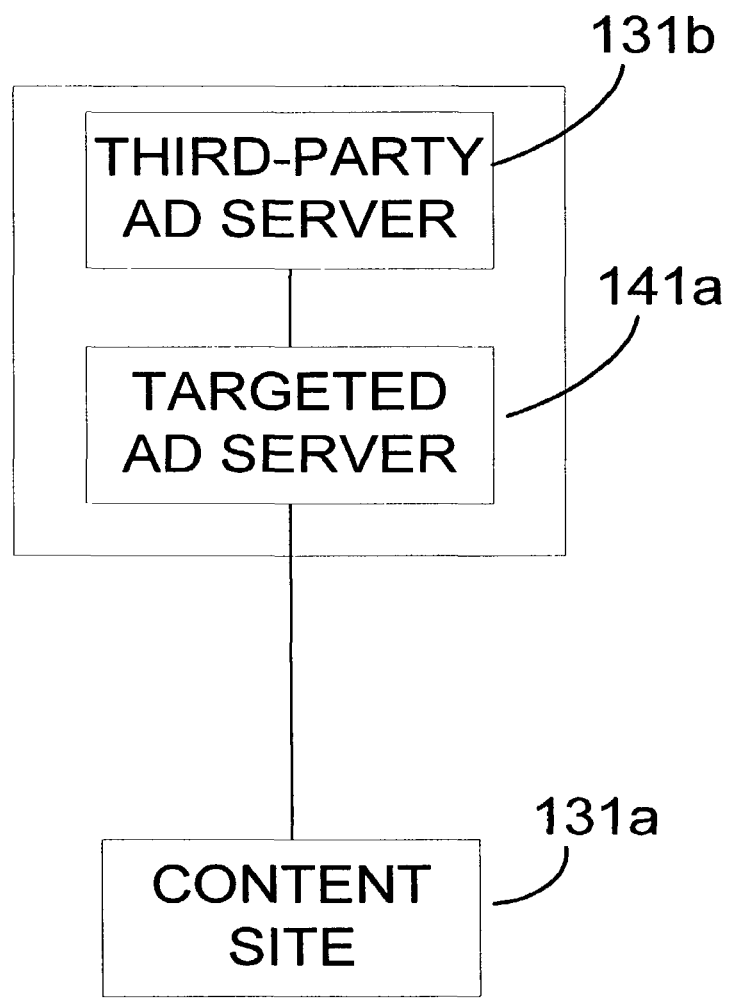

FIG. 36 illustrates an embodiment very similar to FIG. 35, but in this case content server 131a has a relationship with targeted ad server 141a, and content server 131a may be unaware of the relationship that exists between targeted ad server 141a and TPAS 131b. In this embodiment, targeted ad server 141a receives the ad requests first. Again using the example of an ad served With web content, content server 131a might include code requesting an ad from targeted ad server 141a. Targeted ad server 141a then determines whether an appropriate ad exists in its inventory, and based on this determination it serves either a targeted ad or forwards the request to TPAS 131b.

Some content sites use content management systems, or other software to manage ad serving in-house. In one embodiment, targeted ad server 141a may work in conjunction with the producer of the content management system to provide means to more easily enable managing default ads when employing the targeted ad system. Such means might include automatically supplying a URL for a default request, supplying a back door page or program to receive information such as click-through registering for hits as they occur, or other such conveniences.

The embodiments shown in FIGS. 31-36 illustrate targeted ad server 141a as a concept and product that may be described as a right-of-first-refusal ad server (RFi\S). For the purposes of this application RFRAS is defined as an ad server that, based on some rule set, makes a determination as to Whether it should serve a targeted ad or pass on the opportunity. In one embodiment targeted ad server 141a is an RFRAS, and in this case may be referred to as RFRAS 141A.

RFRAS 141A exists to facilitate the cooperative uses of the advertiser, agent of the advertiser, content server 131a, and TPAS 131b. By acting as an intermediary, RFRAS 141A allows each entity to continue to focus on core competencies. In other words, the advertiser may now be offered network advertising, interfaces for interacting with the creation and definition of network advertising, all in a targeted manner previously unavailable for network advertising. Agent of the advertiser, in the case that they are a traditional publication, may continue to focus their ad sales on a geographic area relevant to their standard advertising clients. Minimally, they are provided with an additional outlet to sell advertisements for. Content server 131a may benefit from higher revenues related to the higher revenues anticipated for the sale of targeted advertising. Content server 131a may also see intangible benefits related to more a more satisfied user, as the advertising messages presented to user may be more relevant. Allowing content server 131a to continue to use their existing ad serving solution in the event that there is no ad available on RFRAS 141A may ensure that there is no loss involved in employing the RFRAS solution. TPAS may continue to focus on selling and providing general advertisements, or advertisements focused in a similar or different manner than those on RFRAS 141A.

Depending on the type of device and network user employs, RFi\S 141A may use two primary methods to serve targeted ads. In the one case, user may request content from content server 131a, in the other case user may choose to receive broadcast information from content server 131a.

In an embodiment wherein content provider node 130 dynamically generates its content, much of the logic described as being performed in ad selection node 140 may be may be pushed to the content provider. In the case of providing web content, and in the case that the content is not dynamically generated, an iframe allows ad selection node 140 to reserve our position in the page to serve an ad. By serving up another iframe as the content provided by ad selection node 140, the control of that ad position is effectively passed on to another server. Using this method, any content site using standard html may employ the RFRAS system of ad selection node 140.

In one embodiment the request for an ad received by the targeted ad server may include instructions relating to what default ad service should be called in the event no ad is available, or at least may include parameters to be passed to the default ad service.

Demographic Determination Process

The ad selection node 140 and the content provider node 130 may be designed and configured in any form that may lead to the serving of an ad. This may be done by a request to a common gateway interface (CGI) script, java servlet, or any other means known in the art. One embodiment may include a page request to an ad service servlet that may pass the request on to an internal ad serving program. The request to ad selection node 140 and the content provider node 130 may include the IP address of the user node 120, and this information may be passed on to ad serving program. Ad serving program may pass the IP address to user identification node 150 and may receive geographic location information back from user identification node 150. One embodiment of the present invention provides for multiple alternative means of establishing the location of an end user node. In one embodiment, a cookie may be dropped associated with the ad server that holds zip code, city, state, or any other standard or custom designation of location. The cookie may also hold some confidence level associated with how strongly the system may assume that the given location is accurate. In one embodiment, the end user may designate the location of an end user node specifically, or the location may be specified by some service holding end user information such as, for example, Hailstorm, which is currently under commercial development by Microsoft. In one embodiment, after the location of an end user node has been established, by whatever means chosen, the location information may be stored in temporary memory on the ad server for a period of time. This temporary storage may be associated with the individual user by IP address, and may be released after a configurable period of inactivity from that IP address. In one embodiment, the location information may be stored in a database associated with ad serving program, whether that information was collected from a geolocation service like Quova, Inc. or Hailstorm, from the end user herself, or by any other means known in the art. In one embodiment, any number of the above techniques may be employed together, or individually. When multiple means are used, the ad serving program may use any system to select which means to used or in what order they are checked. In one embodiment the ad serving program may first check for an in memory session associated with the end user node. If no location is ascertainable by this means the program may check an internal database holding previously established mappings between IP address and location. If again no location is ascertainable by this means the program may call the Quova, Inc. geolocation service. The geographic location may be passed by ad serving program in a request to ad selection node 140. Many pieces of information may be passed to ad selection node 140 including, but not limited to, the IP address of the user node that may have made the initial request from content provider node 130, information identifying content provider node 130 as an additional source of the request, geolocation information returned by user identification node 150, geolocation provided by content provider node 130, or by end user node 120.

Previously examples were given of code included on content provider node 130 that requests an ad from ad selection node 140. It should be recognized that even using such static code, many more pieces of information may be passed from content provider node 130 to ad selection node 140. Information passed along with the ad request might include the section of a site or the page of a site on which the ad is to be displayed. The information might include information held on the site regarding the user, this information gathered in a profile, collected from a form, or just an identifier used by the site to identify said user. The information might include URLs that may indicate the desired location for ad redirect in the event ad selection node 140 selects not to serve an ad, or may indicate the desired location for a call to indicate to content provider node 130 that the user interacted with a served ad (submitted a form, clicked a banner, printed a coupon, etc.). These pieces of information are only exemplary, and others may occur to one skilled in the art.

The passing of information from content provider node 130 to ad selection node 140 may be achieved using query string variables, variables sent using the post method, or using a different means of communications such as an XML data transfer or request. Alternatively, other protocols or means of communication over network 110 or out-of-band communication may be employed to transfer information relating to the user.

If a complete table of IP Address to geographic locations is maintained as the primary means of determining the geographic location (i.e. ad selection node 140 looks up this information from the table on every impression), the geographic locations associated with the IP Address may be updated using a variety of means. If using Quova, or a similar service, the update may be based on the threshold returned, if a certain period of time has passed since the information was established, or may be pushed or pulled when the initial source or some other source has a potentially more accurate and updated location associated With one of the stored values.

Reporting Process

As a value added, the ad selection node 140 may communicate to the content provider node 130 the geographic location, or other user information stored on the targeted ad server 141*a*. This may be done immediately on reception of the request, may contain some key to indicate to the web site which of their users it is, and may be communicated over public networks, private networks, or private session (VPN).

In one embodiment, telecommunication system 100 may also provide a data service to participating consumer web sites. Data from the USCB or some other source may be incorporated with advertisement impression and location information. Together this packaged data may give consumer web sites an indication of their impression distribution by location, and by demographic data associated with those locations. This information may be given or sold to the consumer web sites participating in telecommunication system 100.

Billing Process

One embodiment of the current invention provides a method for dividing the revenue earned through advertisement delivery. In one embodiment the revenue earned may vary based upon advertisement type, the location into which the advertisement is served, and the advertiser, publication or media company that sold the advertisement. In one embodiment, an advertisement may not be sold into a primary area by a publication, media company, or advertiser that does not hold the primary status in that area. In one embodiment, an advertisement may be sold into a primary area by a publication, media company, or advertiser that does not hold the primary status in that area, but the company that purchased the advertisement may be charged a flat fee or percentage of the overall advertising revenue to serve into that primary area. In one embodiment, a database and software solution may automatically calculate any charges or credits relating to primary and secondary status.

The database and software solution may automatically generate billing statements for advertisers, publications and media companies registered with ad selection node 140.

Figure 30:
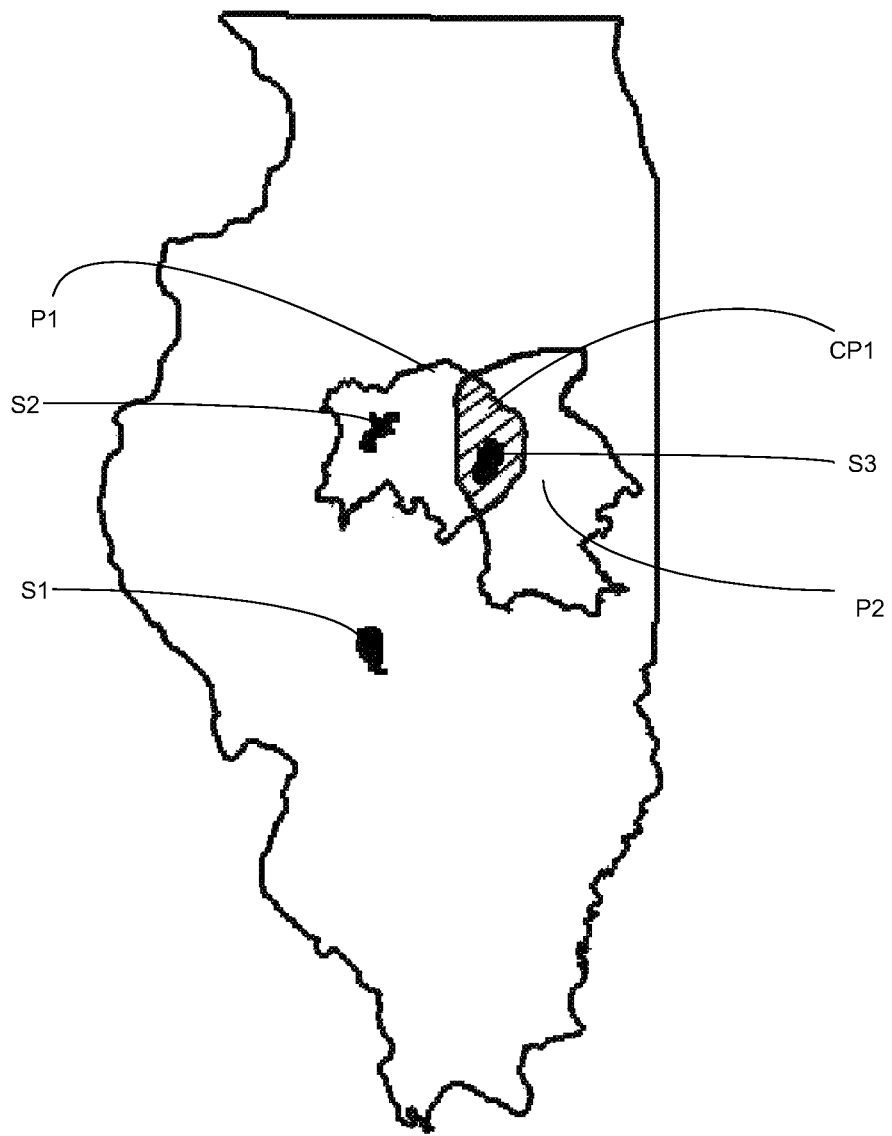
FIG. 30 illustrates fictitious advertising regions within the state of Illinois.

FIG. 30 is a map of the state of Illinois containing outlined areas of commercial influence for five fictitious advertisers or publications. One embodiment of the invention may provide publications with certain distribution advantages associated with advertisements served on the network 110, these advantages being referred to as holding primary status over an area. Those advertisers or publications that have been awarded such advantage may be referred to as primaries in recognition of their primary status. Those advertisers or publications not holding primary status over their area of influence may be referred to as secondaries. Area P1 and area P2 represent the areas of commercial influence for two primaries. Area CPI represents the overlapping areas of commercial influence for the primaries holding areas P1 and P2. Areas SI, S2, and S3 represent the areas of influence for three secondary advertisers or publications.

In one example, a billing statement for the advertiser or publication with area of influence P1 may include billing information for advertisements that were served in areas P1, P2 (the portion not in CPI), CPI, and SI. In one embodiment of this example, the advertiser or publication with area of influence P1 may receive full income for advertisements served in areas P1 and SI because those areas are within the advertiser's or publication's primary area or are not in a primary area at all. Areas P2 and CPI may be handled in multiple ways. In one embodiment, advertiser or publication with area of influence P1 would not be charged for serving into areas P2 or CPI solely because it is a primary. In one embodiment advertiser or publication with area of influence P1 may be charged for serving into area P2 because that is another advertiser or publication's primary area. Advertisements served into area CPI by advertiser or publication with area of influence P1 may be charged because it is within another advertiser's or publication's primary area, or may not be charged because it is still within the primary area of P1.

In another example, a billing statement for advertiser or publication with area of influence S1 may include billing information for advertisements served in areas P1, CP 1, and S1. In one embodiment advertiser or publication with area of influence S1 may serve within area S1 without incurring any charge. In one embodiment, the same flat fee or percentage may be charged to advertiser or publication with area of influence SI for serving into areas P1 or CP 1 because at least one advertiser or publication holds primary status over each area. In one embodiment, a double charge may be placed on advertisements served into area CP1 because it is within both primary area P1 and primary area P2.

In another example, a billing statement for advertiser or publication with area of influence S2 may include billing information for advertisements served in areas P1 (not in S2), S2, and S1. In one embodiment, advertiser or publication with area of influence S2 may not be charged for serving into area S1 because it is not within a primary area. In one embodiment, advertiser or publication with area of influence S2 may be charged for serving into area P1 (not in S2) because it is within a primary area. In one embodiment, advertiser or publication with area of influence S2 may be charged for serving into area S2 because it is within primary area P1. In one embodiment, advertiser or publication with area of influence S2 may not be charged for serving into area S2 because it is within that advertiser or publication's area of influence.

In another example, a billing statement for advertiser or publication with area of influence S3 may include billing information for advertisements served in area S3. In one embodiment, advertiser or publication with area of influence S3 may not be charged for advertisements served into area S3 because it is within that advertiser or publication's area of influence. In one embodiment, advertiser or publication with area of influence S3 may be charged a flat fee or percentage for serving into area S3 because it is within at least one advertiser or publication's primary area. In one embodiment, advertiser or publication with area of influence S3 may be charged a double flat fee or percentage for serving into area S3 because it is within two advertiser or publication's primary areas.

The database and software solution may implement any of the above embodiments, any combination of the above embodiments, or other possible embodiments in calculating billing information for each advertiser or publication or media company. In one embodiment, a bill may include separate sections for categories such as: advertisements served into the advertiser or publication's primary area or a non-primary area, sold by that advertiser or publication; advertisements served into the advertiser or publication's primary area by another advertiser or publication; and advertisements served into another advertiser or publication's primary area.

While the above method of defining primary areas and the accounting methods associated with those primary areas has focused on publication and media companies, similar concepts may be applied in a variety of ways. Primary status over an area may be held by other companies, individuals or other entities that may claim a specifiable area of influence. Primary status may also be granted regardless of area of influence, but on a purchasable basis-set fee or auction based-or by some other means of determination. For example, one embodiment might allow a franchisee to hold primary status over the area in which they retail products or services. In another embodiment, primary status over an area may be held by a local government in their area of jurisdiction. Primary status over an area, as it may include a percentage of earnings for any ad broadcast into that area, may be viewed as a purchasable and/or tradable commodity, may be granted indefinitely or only over a specific time period, and may be granted on a transferable or non-transferable basis. The sale of primary status, on the basis of its potential future revenues, may also be used as an alternative means to raise capital, as opposed to selling equity in the ad serving company itself.

Additional Embodiments

Telecommunications system 100 as described above includes many various methods and uses of sending targeted ads. Further examples will now be described to detail some of the additional features and capabilities of such as system.

In one embodiment, multiple advertising package opportunities may be available to an advertiser on ad selection node 140. While there are many different options, four possible scenarios are as follows:

First, advertisers who distribute and/or provide their goods or services exclusively from a single geographic location within an individual Metropolitan Statistical Area (MSA), and seek to advertise such goods and services exclusively within said MSA, ad selection node 140 may provide a method by which the advertiser may advertise such Client's goods or services, and/or promotions and the like relating to such goods or services, on web sites signed up within the advertising network when such web sites are visited by persons physically located within such MSA exclusively.

By way of example, advertisers with passenger airlines as clients, such as United, American or Delta, who offer their air transport services to the population of an entire MSA from a single location, such as General Mitchell International Airport in Milwaukee, \;v1, could conduct a promotion(s) on the airline's behalf through said method which may publicize the sale of an airfare from Milwaukee to a remote destination, such as Phoenix.

Second, advertisers who distribute and/or provide their goods or services from more than one geographic location within an individual MSA, and seek to advertise such goods and services exclusively within said MSA, ad selection node 140 may provide a method by which the advertiser may advertise such Client's goods or services, through intra-MSA location-specific or intra-MSA location-agnostic promotions, and/or promotions and the like relating to such goods or services, on web sites signed up Within the advertising network when such web sites are: (1) visited by persons physically located within such MSA exclusively; or (2) visited by persons physically located within a select distance from one or more of said advertiser's geographic locations.

By way of example, advertising agencies with fast food restaurants as clients, such as McDonald's, Burger King or Wendy's, who offer their food products to the populations of entire MSAs through multiple locations, such as McDonald's of Evanston, Ill., McDonald's of Wilmette and McDonald's of Winnetka, could conduct location-specific promotions on the restaurant's behalf through said method, which could publicize, for example, a "Buy One Get One Free Hamburger—only at McDonald's of Winnetka" available exclusively at the McDonald's of Winnetka location.

Alternatively, the advertising agency could conduct a location-agnostic promotion, such as "Buy One Get One Free Hamburger—at any participating Chicago-area McDonald's", whereby said promotion could be advertised on the web sites of the advertising network to the entire MSA viewing area.

Third, advertisers who distribute and/or provide their goods or services exclusively from a single geographic location within an individual Metropolitan Statistical Area (MSA), and seek to advertise throughout multiple MSAs, ad selection node 140 may provide a method by which the advertiser may advertise such Client's goods or services, and/or promotions and the like relating to such goods or services, on web sites signed up within the advertising network when such web sites are visited by persons physically located throughout multiple MSAs.

By way of example, advertisers with passenger airlines as clients, such as United, American or Delta, who offer their air transport services to the populations of multiple MSAs from single locations within each individual MSA, such as General Mitchell International Airport in the Milwaukee, Wis., MSA and O'Hare International Airport in the Chicago, Ill., MSA could conduct a promotion(s) on the airline's behalf through said method which would publicize that all United flights will provide gratuitous in-flight meals from May 1 through September 1, irrespective of where the flight originates or arrives.

Fourth, advertisers who distribute and/or provide their goods or services from more than one geographic location within an individual MSA, and seek to advertise throughout multiple MSAs, ad selection node 140 may provide a method by which the advertiser may advertise such Client's goods or services, through inter-MSA location-specific or inter-MSA location-agnostic promotions, and/or promotions and the like relating to such goods or services, on web sites signed up within the advertising network when such web sites are: (1) visited by persons physically located throughout one of the multiple MSAs; or (2) visited by persons physically located within a select distance from one or more of said advertiser's geographic locations across multiple MSAs.

By way of example, advertising agencies with fast food restaurants as clients, such as McDonald's, Burger King or Wendy's, who offer their food products to the populations of entire MSAs through multiple locations, such as McDonald's of Evanston, Ill., McDonald's of Wilmette and McDonald's of Winnetka, could conduct MSA-agnostic promotions on the restaurant's behalf through said method, which could publicize, for example, a "Free Beenie Baby w/Every Purchase" available exclusively for a limited time at any participating McDonald's in the Midwest, or other participating locations.

Targeted Ad \;v'Rapper System

Using the same technologies, as discussed above, but by rearranging the roles of the various nodes, targeted advertisements may be supplied in a different manner.

As previously discussed, code may be supplied to a content site allowing it to take part in the RFRAS system. Example code supplied to the content site was given as:

```
<iframe height=60 src="http://ads.dizpersion.com/adservice.aspx?sid=9&at=9"
width=468 frameborder=O marginwidth=O marginheight=O hspace=O vspace=O scrolling="no"
bordercolor="#OOOOOO "><img src="/images/default.gif"></iframe>
```

Or another example was given as:

```
<script src="http://diz.com/adservice?S= 1&A=1">
```

In each instance a unique identifier is supplied with the code (sid=9 and S=1) that may be associated with the particular site hosting the code. In addition to determining what ads in the RFRAS system may be served on that site, the unique identification of the site may also be required to determine what default ad is to be served. Another method of supplying advertisements using similar technologies may be described as a targeted ad wrapper server (TAWS) system. In a TAWS system, additional flexibility may be provided to the advertiser by allowing them to serve on any content site of their choosing. The TAWS system again uses code distributed to web sites, but in this case the unique identifier is for one or more specific ad campaigns.

Figure 37:
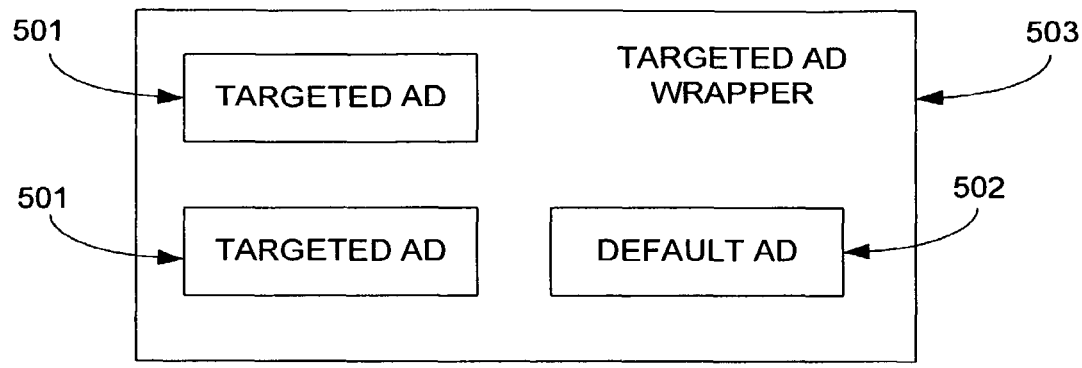
FIG. 37 illustrates a targeted ad•wrapper.

For example, FIG. 37 illustrates a targeted ad wrapper 503. A targeted ad \1>Tapper may be described as a distributable, packaged RFRAS system. A RFRA.S system serving targeted ads must have a default ad arrangement with each web site. Without prior arrangements with each web site participating in the RFRAS system, the RFRAS system can not perform in its preferred mode. Regardless of how a targeted advertising campaign is technically achieved, as long as an ad must be served there must be a default ad to serve in the case that the ad request does not fit with the one or more targeted ads in the campaign. So whereas the RFRAS system requires an arrangement with web sites to handle the default ad, a TAWS system includes the default in the ad wrapper itself.

Targeted ad wrapper 503 comprises one or more targeted ads 501 and one or more default ads 502, which are recognized by an identifier unique to that combination of ads. This is similar to the site identifier in the RFRAS system. The code identifying that particular combination of targeted and default ads may be distributed to any content site, regardless of whether it is participating in a RFRAS system or not. This allows the one or more advertisers, or representatives of the one or more advertisers, to deal with any content site, or ad inventory aggregator, with which they are able to negotiate an ad inventory purchase.

More concretely, if a credit card company wished to advertise NFL (NFL a trademark of the National Football League of New York, N.Y.) branded credit cards, they may wish to geographically target ads to highlight the home team of each franchise city. The credit card company may, for example, create an ad wrapper that specifies a targeted ad for a Bears logo card (Bears logo a property of the Chicago Bears of Chicago, Ill.) for the Chicago metropolitan area, an Eagles logo card (Eagles logo a property of the Philadelphia Eagles of Philadelphia, Pa.) for the Philadelphia metropolitan area, etc., and a default advertisement displaying a variety of logos and cards for non-franchisee markets. In order to achieve this, the ad creative materials representing the targeted ads 501 are associated with the desired geographical locations-in a manner as previously described- and then included with these targeted ads, a default ad 502 is supplied and stored in DB4 of ad selection node 140. The credit card company may then distribute code similar to that hosted by the content site in a RFRAS system. In this manner a TAWS system advertisement allows an advertiser to package together targeted and non-targeted advertisements, and to distribute the result to any content site of its choosing.

Figure 38:
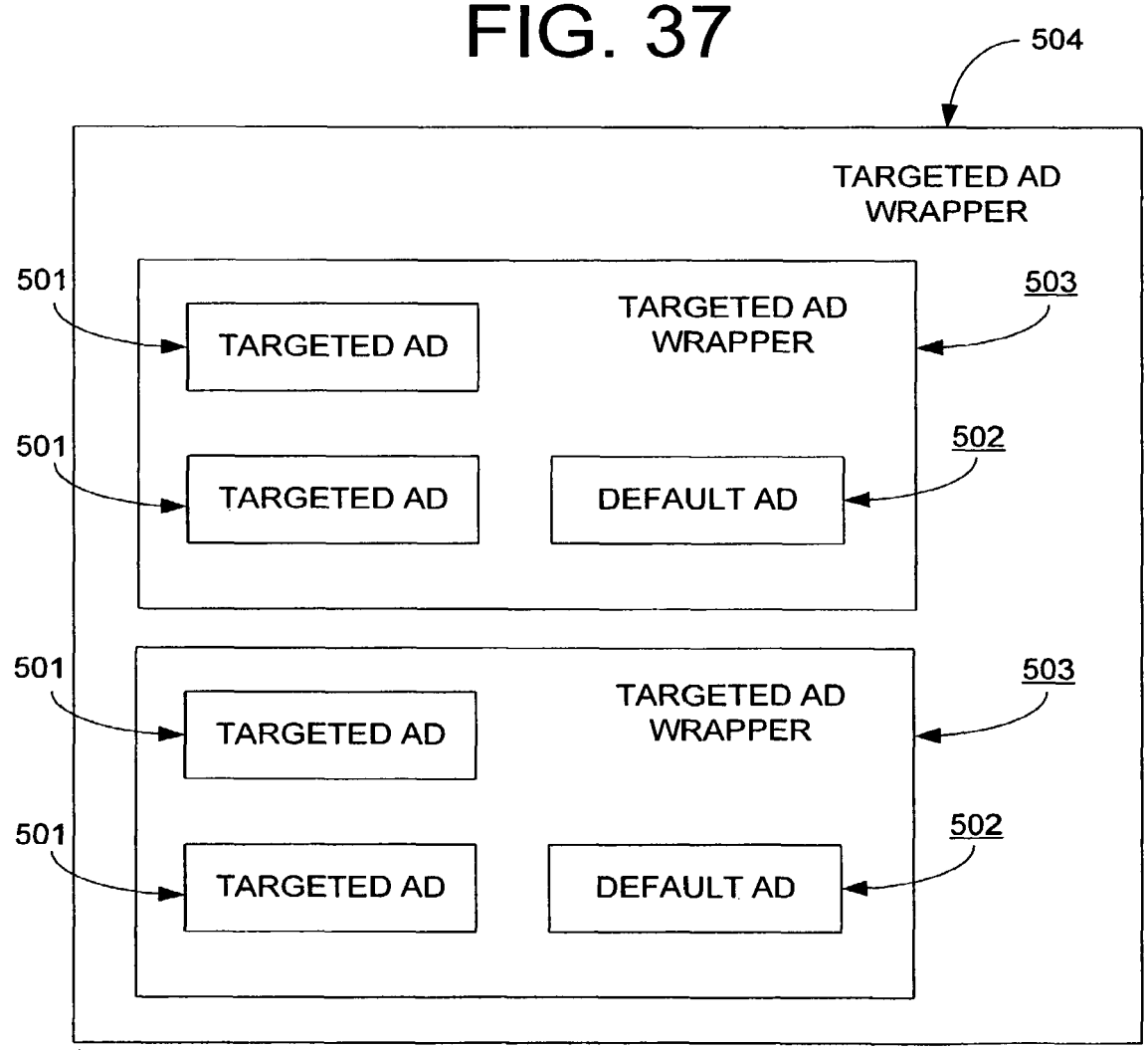
FIG. 38 illustrates a multiple layer targeted ad wrapper.

In another embodiment, a TAWS system v.mpped ad wraps together multiple wrapped ads, as is shown in FIG. 38. This may be achieved in several ways. In one embodiment, an outer-targeted ad wrapper 504 may encapsulate multiple targeted ad wrappers 503. Which targeted ad wrapper 503, held within outer-targeted ad wrapper 504, is served may be determined using, for example, a round-robin selection process or any ad selection algorithm known in the art. In one embodiment, one of the targeted ad wrappers 503 must be defined as the default. In this manner the outer-targeted ad wrapper 504 would be able to function in a manner almost identical to the targeted ad wrapper 503. The TAWS system may in that case check the location associated with the impression to be served, and if none of the targeted ad wrappers 503, other than the default targeted ad \\>Tapper, correspond to a given area, then the default targeted ad wrapper may be served.

There is no limit to how many ads or wrappers may be placed in a wrapper or how many layers deep that \vTapper may go. The technological implementation may be handled in various ways. For example, each targeted ad wrapper may be maintained as an independent unit, represented by code that would display that wrap only. Serving an ad would then be a process of stepping through the layers of the 'NTapper as each level of code is displayed in an iframe, or some similar manner. Alternative to this recursive approach, when an outer-targeted ad \\Tapper 504 is defined, the geographies covered by targeted advertisements, their statistical weightings (if they exist), the defaults, and all other logistics of the ads contained in the outer wrapper may be pre-calculated by DB4 of ad selection node 140. Targeted ad wrappers may be highly complex in their composition, containing multiple default ads, multiple ad campaigns for a single company, or even multiple campaigns for multiple companies.

Figure 39:
FIGS. 39-41 illustrate one embodiment of a method for displaying the contents of a targeted ad wrapper.
Figure 40:
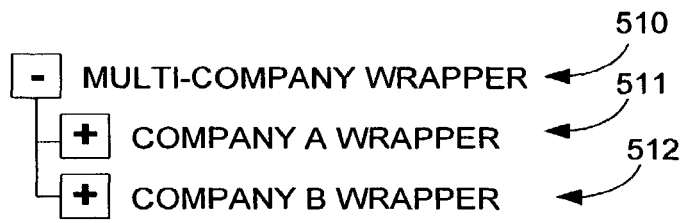
Figure 41:
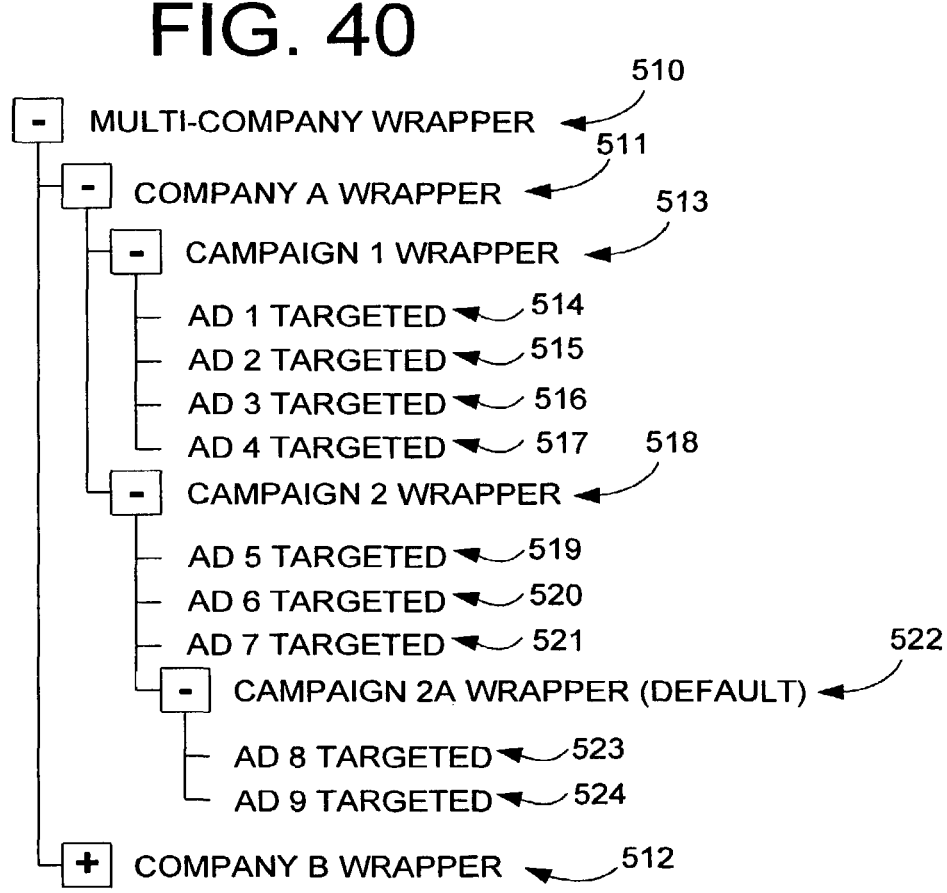

Various interfaces may be provided to an advertiser or representative of an advertiser to facilitate the creation and view the contents of a targeted ad wrapper. An example of one such interface may be seen in FIGS. 39-41. FIG. 39 illustrates one example of how a targeted ad wrapper may be represented. A plus sign link and wrapper title represents the highest-level wrapper, Multi-Company Wrapper 510. If a user wished to view the contents of Multi-Company Wrapper 510 they may click on the plus sign or title and see an expanded view as displayed in FIG. 40. Here it is apparent that Multi-Company Wrapper 510 is composed of Company A Wrapper 511 and Company B Wrapper 512. Further expanding Company A Wrapper 511 in a similar manner might result in a display such as that shown in FIG. 41. In this example Company A Wrapper holds two top-level ad campaigns 513 and 518, contained within are targeted ads, default ads, and a separate campaign 522 under campaign 518.

Figure 42:
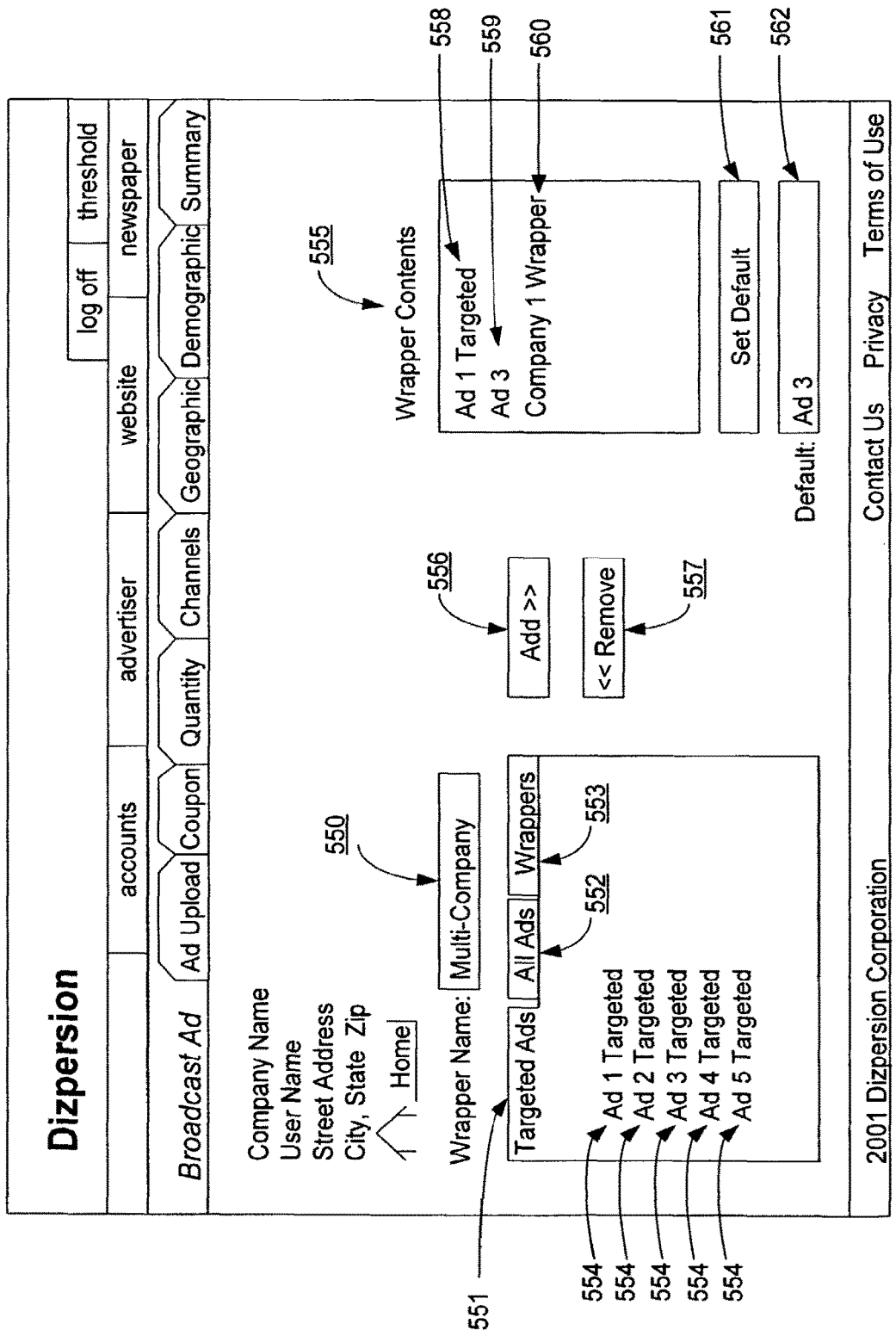
FIG. 42 illustrates one embodiment of a targeted ad wrapper creation page.

Another interface may be created such as that illustrated in FIG. 42. Interface 420 may be used in conjunction with the interfaces described in FIGS. 6-12. After an ad has been entered into the system, an advertiser may choose to create an ad wrapper. For convenience sake a name may be provided in a text box 550. The advertiser may be presented with their existing ads and wrappers categorized and presented in separate tabs such as targeted ads tab 551, all ads tab 552, and wrappers tab 553. In this illustration the targeted ads tab 551 is selected and multiple targeted ads 554 are displayed. In one embodiment, the advertiser may select one or more of the multiple targeted ads 554 and then click an add button 556. The selected ads or wrappers may then be displayed in the list of wrapper contents 555. In this illustration the targeted ad wrapper named "Multi-Company" is currently being defined, and it includes ads and wrappers 558-560. Ads and wrappers may be selected in the list of wrapper contents 555 and then removed by clicking remove button 557. In order to select the default ad, an ad or wrapper in wrapper contents may be selected and set default button 561 may be clicked. The currently selected default may be displayed as shown in default display box 562. Alternatively, the default ad may be displayed in a different color, font, or labeled by some other symbol or indicator where it is displayed in the list ohwapper contents 555.

Other conveniences may be provided by means of the interface. For example, hovering over the title of a targeted ad wrapper may pop open a box displaying its contents. Alternatively a "view" hyperlink may be provided to display the same.

The code distributed to web sites for a targeted ad wrapper directs the ad request to ad selection node 140. As control over ad selection and display is maintained at this central and singular node, and not distributed to the web site, the contents of an ad wrapper may be established and locked prior to an ad run or they may be edited during the ad run. In one embodiment, an advertiser may create an ad and specify that it may be served to any geographic location. This is a generic ad request, and the requesting advertiser may be termed a generic advertiser. As a generic ad now exists in the system, targeted ads may be wrapped with it using the TAWS system. The TAWS system may provide information relating to the available space for targeted ads to the advertiser that made the generic ad request or to any other advertiser. This availability information may include the web site designation for the default ad request, in other words indicating on which sites the default ad and other ads in the wrapper may be displayed on. The availability information may also include geo-target availability. Geo-target availability may be based on historical statistical data from one or more sources; this will be discussed in greater detail later. In one embodiment child advertisers of the generic advertiser may be, for example, the only parties allowed to see the availability information. A child advertiser may be, for example, a division of the company that ordered the generic ad run, a marketing branch, an individual product, service or location for that company, or any other sectioned or associated individual or business entity related to the generic advertiser.

Based on the availability information, an advertiser may request a targeted ad be included in the ad wrapper. The target information may include geographic, demographic, and time-based targeting.

Providing availability information may be done in a variety of ways with a variety of accuracy and convenience levels. Availability information may indicate only that ads may be run. It may further indicate the sites on which the ads may be rim. Further still, estimations may be provided for the number of ad impressions that will fit certain targeting profiles. For example, if an ad wrapper has been run on a site, certain statistical projections may be made for future ad wrappers based on the information recorded. This historical statistical data might include traffic levels for a site and traffic information including time of day, geographic location, and any other relevant data collected from each ad impression. Specifically, a targeted ad request might include geo-target information requesting that the ad be served into New York City only. If during a previous ad campaign, using the same web site designation, 25% of the traffic came from New York City, the following equation may be used to calculate availability information:

(number of generic ads+number of possible target ads)*0.25=number of possible target ads If the generic ad nm included a request for 300 impressions, it is reasonable to include 100 impressions for New York City in the targeted wrap and expect that close to that number might be served. Other means of statistical analysis and projection, including but not limited to the use of standard deviations and regression analysis, are known to those of ordinary skill in the art. So in this case, the availability information may specify 100 impressions for New York City. The accuracy of the statistical model used to present availability information will vary, among other things, with the amount of data available for modeling. Sites make experience spikes in traffic or unusual patterns in geographic, demographic, or time of day based on anything from scheduled events to breaking news to technical difficulties on competing sites. The more historical statistical data that is used, and the greater number of predictable events that are taken into account in modeling expectations, the more accurate the availability information will be.

After availability information has been provided and targeted ads requested, a media buy output may be determined. The media buy output is information indicating what number of ad impressions should be purchased on what web sites.

The TAWS system may be employed by and its contents arranged in a number of ways. For example, a national-level party or political interest group, such as the Democratic National Party, could make an ad inventory purchase. The details of this purchase must include both quantity and web site designation. Web site designation again comprises a web site or group of categorized web sites on which the ad, and any ads wrapped with it, will be shown. The default ad supplied in the ad wrapper may be, for example, an ad encouraging people to "get out and vote," further labeled, "sponsored by the Republican Party." Then, within that wrapper any number of ad copies may be included for individual candidates, each ad copy including target ad nm input specifying only the geography of their constituencies. It is with noting that the contents of an ad wrapper need not be completely established or considered locked at the point of creation or distribution to a content site. New ads may be added, ad copies may be edited, ads may be removed, new ads may be set as the default and any other aspect may in fact be changed. Once the ad inventory purchase has been made and its associated generic ad run commenced, no new code needs to be sent to the content site as all changes are made on the TAWS system. If the generic ad nm is to cover more than one content site, the target information for the targeted ads may include specific designation for which of those sites the ad should be run on. One or more interfaces may be created to assist organizations such as political parties in allowing the further distribution of the ad inventory within an ad •vrapper. For example, the organization may be able to provide login accounts to each campaign allowing them to access ad definition and reporting pages such as those previously described. These accounts would then simply include the defined ad within an ad wrapper for the parent organization.

A similar system could be employed for companies such as franchises and conglomerates that may wish to provide interfaces to their subsidiaries. To call on a previous example, McDonalds® might set up a targeted ad v.rrapper and then allow each regional market and/or franchisee to access the system through individual login accounts. Again, generic McDonalds® ads would be displayed except in geographic markets in which the regional management or franchisees have specified their own ads.

In the case of a business conglomerate, there is a multitude of options and opportunities presented by the TAWS system. Companies such as, for example, Proctor and Gamble® already make a regular habit of varying advertising messages by geography. By employing a TAWS system, a company such as Proctor and Gamble® might achieve lower advertising costs by aggregating online media buys across product lines. Also, a company could mimic offline advertising methods such as testing price elasticity over different geographic locations, varying the product messages by location, practicing product differentiation Where necessary, and running localized product introductions. Similar capabilities are available in the RFRAS system, but using a TAWS system each individual company may maintain control over the entirety of the media buying process.

Many different criteria and methods for targeting advertisements with the TAWS system have been discussed, with varying levels of desirability and value to advertisers. Little has been said of purchase and payment methods for generic and targeted ads, but there are numerous possibilities. For any systems described herein ad price may be set per impression, vary based on the level of targeting, may be priced through an auction process, or any other method of ad pricing known in the art.

Subject and Key Word Targeting

Figure 43:
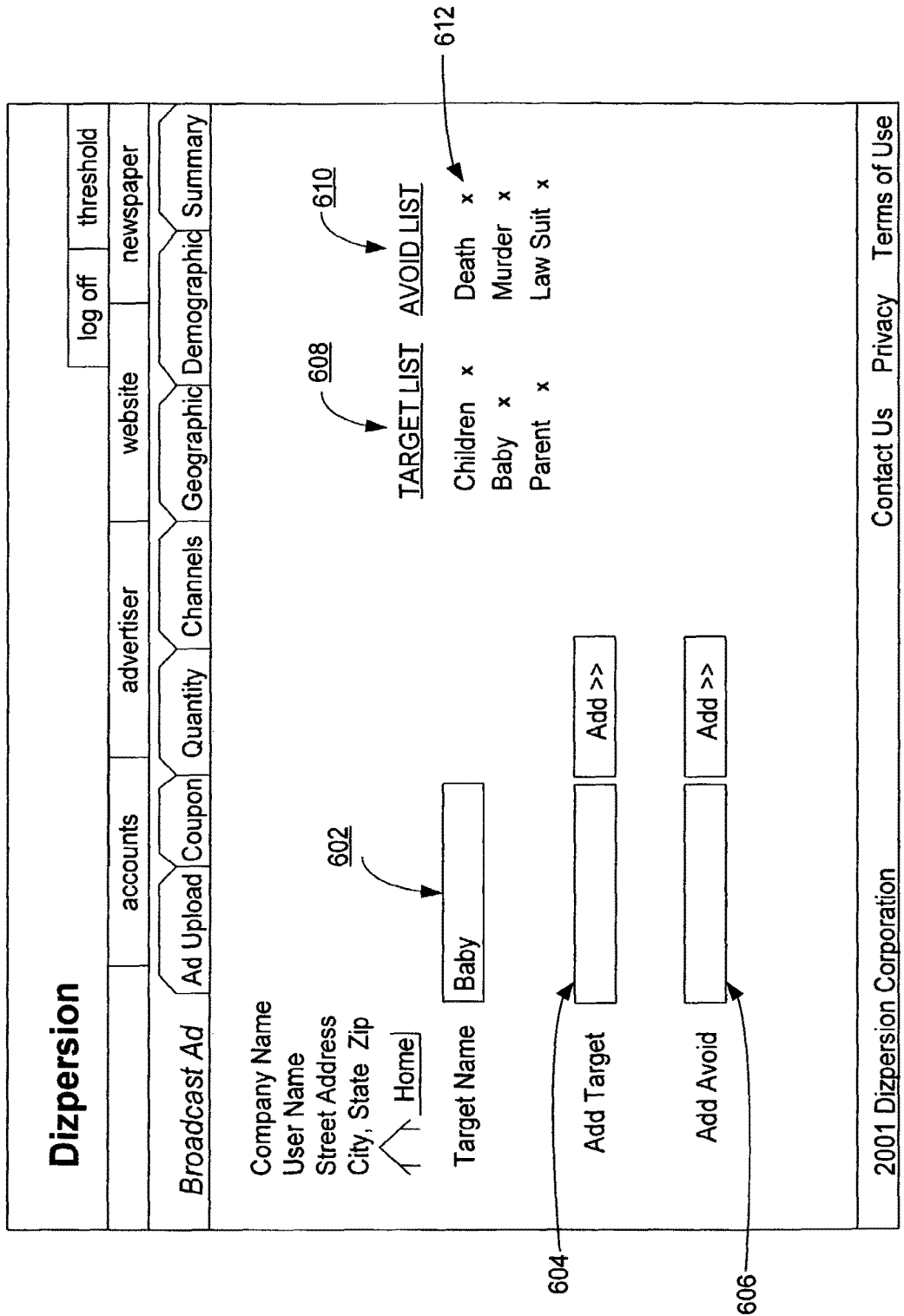
FIG. 43 illustrates one embodiment of a keyword definition page.

The subject matter surrounding and context in which an advertisement is received can be as important as geographic targeting, demographic targeting, or any other sort of target information. FIG. 43 illustrates an interface 600 for creating a subject identifier, based on keywords. First, for future ease of use and identification, the user may supply a target name 602. Input boxes 604 and 606 may be provided for the entry of target keywords and banned keywords. When a keyword to target or avoid is selected and added by the user, it is displayed in the appropriate keyword list, target list 608 or avoid list 610, at the right. Each entry in these lists may also have an associated delete link 612. When clicked, delete link 612 removes the entry from the list. In another embodiment, the user may be presented with a predetermined list of subject-based keywords. Instead of allowing the user to add any keyword to the target list and avoid list, they may in this embodiment be limited to the predetermined list. These keywords or subjects may be termed target references, banned references, or collectively termed keyword references.

There are four general methods of assigning and associating subjects to the page on which an ad will appear. The most accurate methods, but most time consuming and least scalable, require human interaction. In one embodiment, the burden of human interaction may be placed upon the web site on which the ad will be displayed. In another embodiment, the burden of human interaction may be placed upon the ad server company. In another ID embodiment, the burden of human interaction may be placed on the end advertiser. In another embodiment, the ad server may automatically process the subject of the page.

In the embodiment wherein the human interaction takes place at the web site, when a new page is going up, or when the contents of a page change, the ad request embedded on the page may be manipulated to reflect the new page subject matter. For example, alphanumeric values may be added to the query string of the ad request URL, such as "http://w\\'\.ad-server.com/adrequest.jsp?subject=C2,C3". A list of valid alphanumeric values may be supplied to the web site, and might include such values as C2 representing that the subject of the page is "babies," C3 representing "parenting," and LI representing "divorce." In this embodiment, the interface 600 may include these values and alphanumeric codes as the predetermined list. Other information may be sent is this manner as well. For example, a code may be, for example, supplied to represent the author of the article on the page or the position of the advertisement on the page.

In the embodiment wherein the human interaction takes place at the ad server company, the ad request is associated With the page on which it originated. This may be supplied in full or in part in the request for the advertisement, such as "http://\vww.ad-server.com/adrequest.aspx?requestpage=http://w\\'\.website.com/page.html" For each new request page received at the ad server, a person may go to that page and assign the codes to future requests received from that page. In this embodiment, it must be taken into account that pages may keep the same URL, but change content. Therefore, it may be useful to review the assigned codes on a periodic basis, or when it is indicated that content has been updated.

The embodiment wherein the human interaction takes place at the end advertiser is quite similar. In this embodiment the ad server system may be either RFRAS or TAWS. Each advertiser that has defined ads that may be served may be given the ability to review each new page and assign codes. Alternatively, the advertiser may have an interface that allows them to specify first whether they wish to serve or not on the page, and second which ad copy they would like to serve. Further details and embodiments relating to advertiser selected pages is discussed in more detail below, see FIG. 46.

Figure 44:
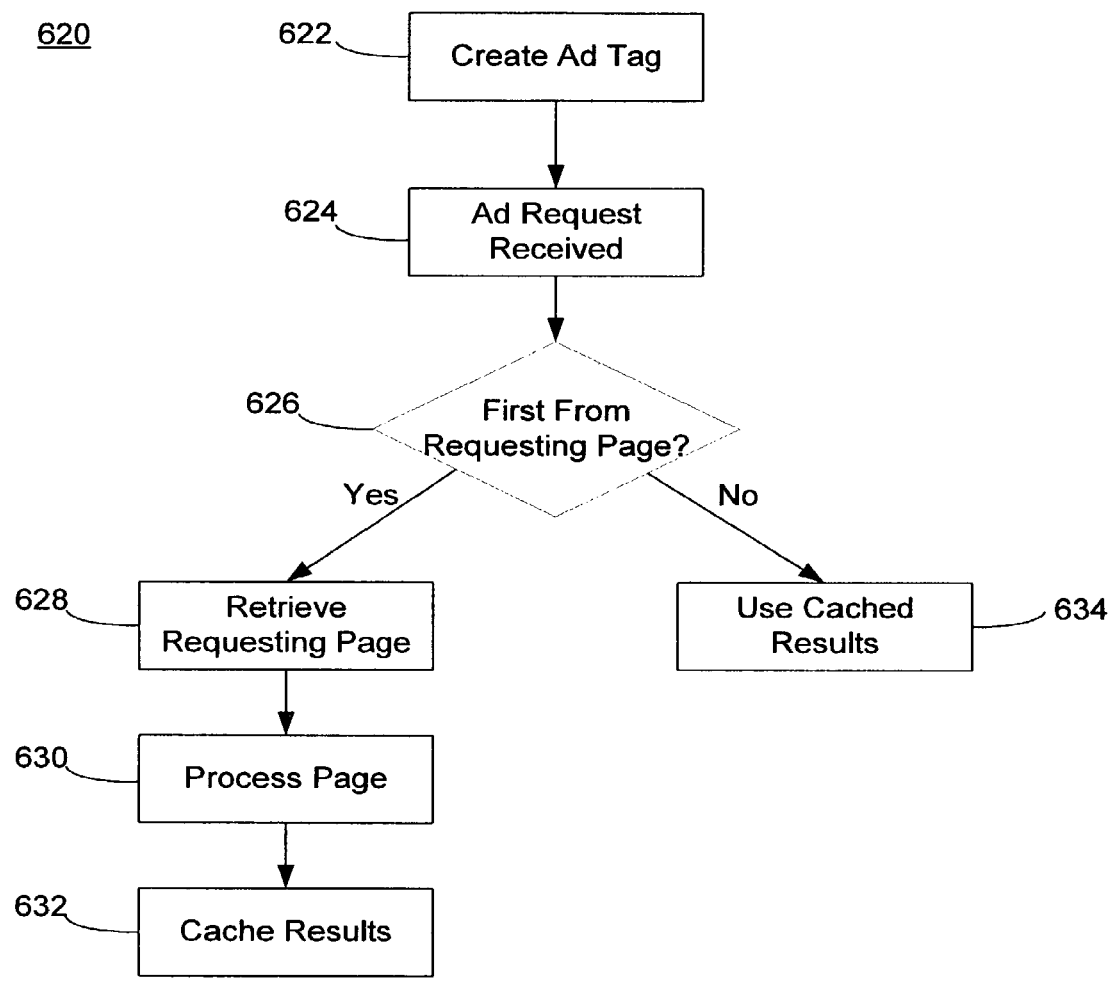
FIG. 44 illustrates a flow chart of a first embodiment for targeting ads to a content page by keyword.

FIG. 44 illustrates the embodiment wherein the ad server may automatically process the subject of the requesting page. First, an ad tag is created 622 that includes the page on which it will originate its request. When the page on which the tag is hosted is viewed, an ad request is received 624 at the ad selection node 140. At the ad selection node it is determined whether this is the first time a request is being received from the requesting page 626. As was previously noted, content may change in a page, so the determination of whether this is the first request from the requesting page may take into account a periodic resetting. After a set period of time, the ad server may indicate this is the first request from the page even if the page has been requested before, thereby giving the opportunity to reprocess the subject of the page. If this is the first time a request has been received from the requesting page, the ad server retrieves the content of the requesting page 628.

The content retrieved from the requesting page is then processed 630. Content may be processed in a \vide variety of ways. One simple approach would be to simply index the text of the content and consider each word to be a keyword. Many commercial and proprietary searching, indexing, and cataloging means are known in the art, and any of these may be employed to process the content of the requesting page. The results of the processing are cached in a database at ad selection node 140. The database associates the requesting page with the processed results, allowing these results to be used for subsequent ad requests from the requesting page 634.

In one embodiment, ad selection node 140 may cache a copy of the requesting page 628. This may be performed for review by advertisers. In another embodiment, the caching may be performed to provide a visual display of page-level availability information for an existing ad wrapper. With this cached information available to advertisers, satisfaction or approval information may be collected indicating approval or disapproval of the subject and keyword targeting system. In one embodiment, the payment to a web site for used ad inventory may be based in part on the approval information. In another embodiment, approval information may be required prior to the ad being served.

Advertiser Selection of Placement

Figure 45:
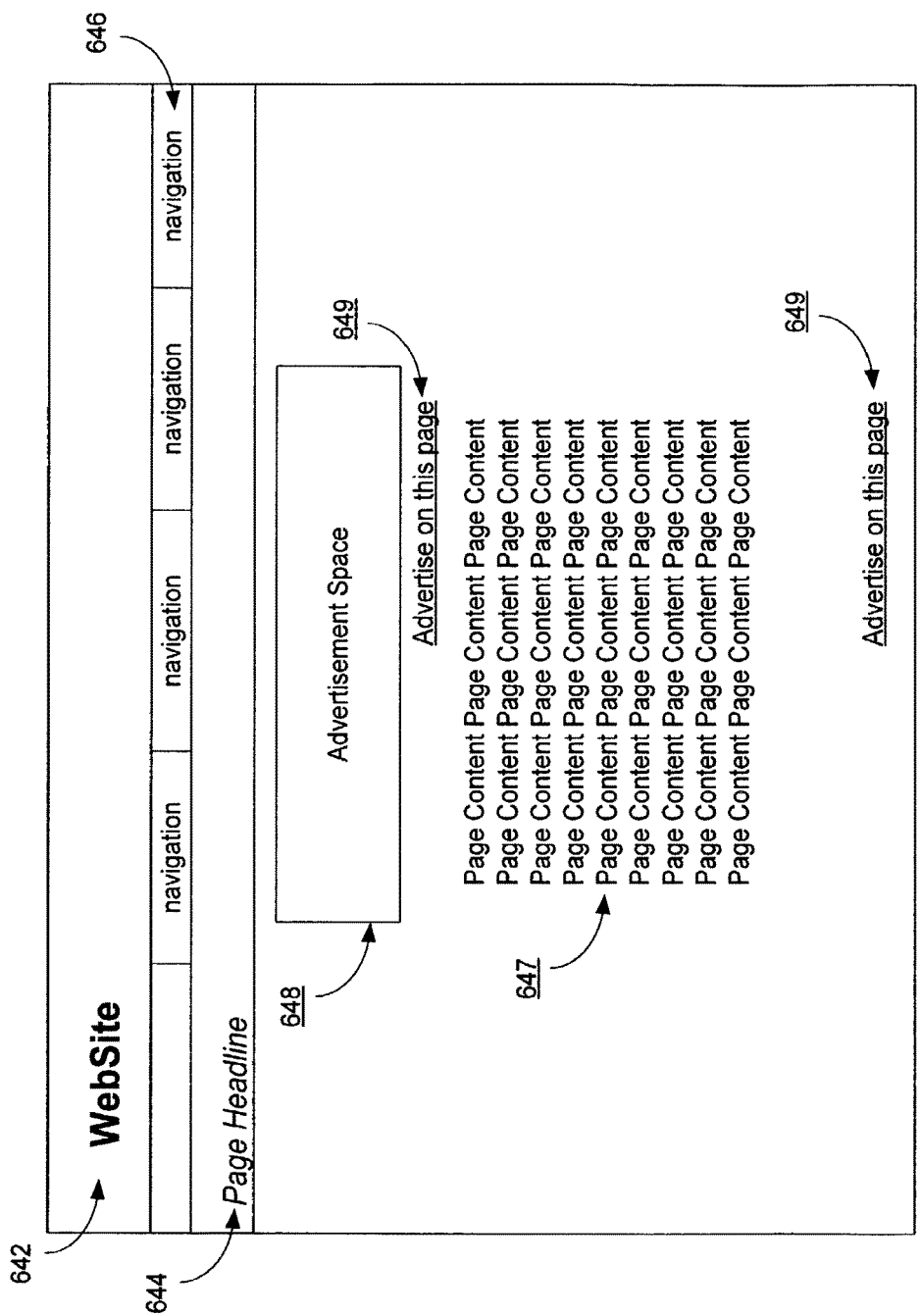
FIG. 45 illustrates one embodiment of a web page on a standard web site.
Figure 46:
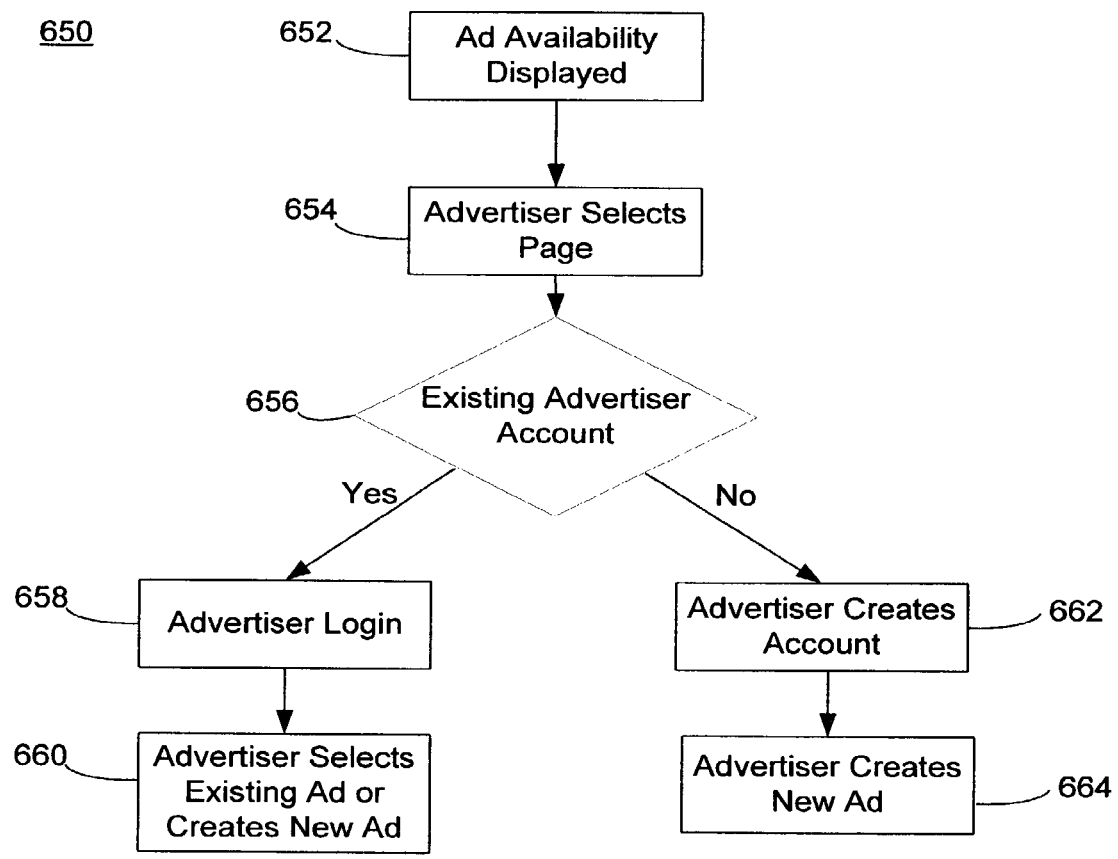
FIG. 46 illustrates a flow chart of one embodiment of a process by which an individual creates or selects a page specific advertisement.

FIG. 45 illustrates a web page on a standard web site as shown at 640. The web page 640 may contain one or more of the elements shown including a title 642, navigation elements 646, page content 647, or a headline 644. For the purposes of this embodiment, the two necessary elements are advertisement space 648, and page specific invitation to advertise link 649. Any individual viewing web page 640 may, for example, Wish to advertise a product or service, or broadcast a desired commercial, personal or political message in the space available for advertising, as represented by advertisement space 648. Advertisement space 648 may be in the form of an area dedicated to a banner, tower, or some other form of advertisement included in the page layout, or may be in the form of an interstitial advertisement or pop-up ad triggered by web page 640. FIG. 46 illustrates one embodiment of the process by which the individual creates or selects a page specific advertisement.

A page specific invitation to advertise link 649 provides the individual viewing that specific web page with the opportunity to fill the advertisement space 648, thereby advertising the ad availability 652. The page specific imritation to advertise link 649 may be in the form of a text hyperlink, a button, or any other means of directing the individual to a different web resource known in the art.

In one embodiment is a relationship exists between the request to advertise and the specific web page on which the request originates. A unique identifying key associates the ad that is to be specified for display with the specific web page. In one embodiment, this may be achieved through the use of a randomly generated global unique identifier (GUID) that is created for each new web page 640. In another embodiment, the universal resource identifier (URI) for web page 640 is used. Use of an URI allows the use of a preexisting unique identifier. The GUID or URI must be included in the request to advertise via the page specific invitation to advertise link 649.

The individual makes a page specific request to advertise 654. As the ad server processing the page specific ad requests may display ads on many pages of a site or many pages on many sites, and as the individual may wish to advertise on another page or site in the network, an account can be maintained for each individual that is an advertiser, or potential advertiser, on the network. Maintaining an account allows the advertiser to avoid entering certain information on a repeated basis such as personal identification information, billing information, and even specific ad details. In order to determine whether the individual has an existing advertiser account 656, a login screen may be presented after the advertiser selects the page on which they want to advertise 654. If an account exists, the advertiser logs in 658. As an existing advertiser, there may already be defined advertisements associated with the account. The logged in advertiser may then select an existing ad or create a new ad 660 to be displayed on the selected web page 640. If no account exists, account information may be entered and a new account created 662. A new advertisement is then created by the new advertiser 664. The ad may be created and include any of the targeting properties described in the RFRAS system and TAWS above.

As multiple advertisers may find advertisement space 648 on the same specific web page 640 attractive, providing an auction for the advertising space provides one possible model to handle pricing. In one embodiment, each new advertiser that indicates interest in advertising on a specific web page is presented with an incrementally higher CPM. In one embodiment, if they choose to accept the higher CPM, each advertiser that has been displaced from that advertising space is notified that the space is available at a higher CPM.

In one embodiment a profile is maintained for each advertiser account. Information held in the profile may include, but is not limited to, area of business, specific web sites selected for advertising, UR is selected for advertising, subject or keywords in the content at each selected URI (information obtained using the scanning process described previously), a list of subject and keywords selected for targeting specific ads, and a list of subject and keywords selected for targeting ads in general.

When a new web page is added to the ad server network, this addition may, in one embodiment, trigger recommendations to an existing account based on the profile collected for this account. For example, if the profile for a car manufacturer indicates that they have regularly advertised on a specific web site, when a new article is posted on this web site the system may alert them off this addition. In another similar example, if the profile for a car manufacturer indicates that they have advertised on pages where a competitor's brand name and car model type is displayed, if a new page exhibiting these criteria is added to the ad server network they may be alerted of this addition.

In one embodiment, the collected profiles are not viewed in isolation, but in comparison with other profiles using Bayesian or non-Bayesian statistical models. For example, if the profiles for two law firms indicated similar areas of business, or if the two firms had historically selected similar sites and web pages on which to advertise, the ad server might alert one when the other selects a page on which to advertise. In one embodiment, the ad server providing the page specific ad placement is a RFRAS. In one embodiment, the ad displayed on the specifically selected page is a targeted ad wrapper.

The present invention may be embodied in other specific forms without departing from its spirit or essential characteristics. The described embodiments are to be considered in all respects only as illustrative and not restrictive.

The invention claimed is:

1. A method for targeting advertising over a network, comprising:
   requesting content at a user node from a content server;
   sending the content from the content server to the user node, the content including an ad request;
   sending the ad request from the user node to a right of first refusal ad server;
   determining a demographic corresponding to the user node;
   determining in response to the ad request whether an ad in inventory at the right of first refusal ad server is appropriate to the determined demographic; and
   when no ad in the inventory at the right of first refusal ad server is appropriate to the determined demographic:
   identifying the content server at the right of first refusal ad server based on the ad request;
   determining a default ad server based on the identified content server, the default ad server being independent, separate, and distinct from the right of first refusal ad server;
   sending a pass request from the right of first refusal ad server to the default ad server;
   forwarding the ad request from the content server to the default ad server in response to the pass request; and
   serving a default ad service ad from the default ad server to the user node in response to the forwarded ad request.

2. The method of claim 1, further comprising delivering an appropriate ad to the user node from the right of first refusal ad server when an ad in the inventory at the right of first refusal ad server is appropriate to the determined demographic.

3. The method of claim 1, wherein the determining a demographic comprises determining a location associated with the user node.

4. The method of claim 1, wherein the pass request comprises demographic identifying information associated with the determined demographic.

5. A system for providing targeted ads over a network, comprising:

a user node;

a content server in communication with the user node via a network;

a right of first refusal ad server in communication with the user node and the content server via the network; and a default ad server in communication with the user node, the content server, and the right of first refusal ad server via a network, the default ad server being independent, separate, and distinct from the right of first refusal ad server;

wherein the user node, the content server, the right of first refusal ad server, and the default ad server are operable in combination to:

request content at the user node from the content server;

send the content from the content server to the user node, the content including an ad request;

send the ad request from the user node to the right of first refusal ad server;

determine a demographic corresponding to the user node at the right of first refusal ad server;

determine in response to the ad request whether an ad in inventory at the right of first refusal ad server is appropriate to the determined demographic; and wherein when no ad in the inventory at the right of first refusal ad server is appropriate to the determined demographic:

identify the content server at the right of first refusal ad server based on the ad request;

determine a default ad server based on the identified content server, the default ad server being independent, separate, and distinct from the right of first refusal ad server;

send a pass request from the right of first refusal ad server to the default ad server;

forward the ad request from the content server to the default ad server in response to the pass request; and serve a default ad service ad from the default ad server to the user node in response to the forwarded ad request.

6. The system of claim 5, further comprising delivering an appropriate ad to the user node from the right of first refusal ad server when an ad in the inventory at the right of first refusal ad server is appropriate to the determined demographic.

7. The system of claim 5, wherein a demographic comprises being operable to determine a location associated with the user node.

8. The system of claim 5, wherein the pass request comprises demographic identifying information associated with the determined demographic.

9. A non-transitory computer readable storage medium comprising computer executable instructions which, when executed by a processor, cause the processor to perform a method of targeting advertising over a network, comprising:

requesting content at a user node from a content server;

sending the content from the content server to the user node, the content including an ad request;

sending the ad request from the user node to a right of first refusal ad server;

determining a demographic corresponding to the user node;

determining in response to the ad request whether an ad in inventory at the right of first refusal ad server is appropriate to the determined demographic; and when no ad in the inventory at the right of first refusal ad server is appropriate to the determined demographic:

identifying the content server at the right of first refusal ad server based on the ad request;

determining a default ad server based on the identified content server, the default ad server being independent, separate, and distinct from the right of first refusal ad server;

sending a pass request from the right of first refusal ad server to the default ad server;

forwarding the ad request from the content server to the default ad server in response to the pass request; and serving a default ad service ad from the default ad server to the user node in response to the forwarded ad request.

10. The non-transitory computer readable storage medium of claim 9, further comprising delivering an appropriate ad to the user node from the right of first refusal ad server when an ad in the inventory at the right of first refusal ad server is appropriate to the determined demographic.

11. The non-transitory computer readable storage medium of claim 9, wherein the determining a demographic comprises determining a location associated with the user node.

12. The non-transitory computer readable storage medium of claim 9, wherein the pass request comprises demographic identifying information associated with the determined demographic.

\* \* \* \* \*